United States Patent
An et al.

(10) Patent No.: US 10,721,535 B2
(45) Date of Patent: *Jul. 21, 2020

(54) BROADCASTING SIGNAL TRANSMISSION DEVICE, BROADCASTING SIGNAL RECEPTION DEVICE, BROADCASTING SIGNAL TRANSMISSION METHOD, AND BROADCASTING SIGNAL RECEPTION METHOD

(71) Applicant: LG ELECTRONICS INC., Seoul (KR)

(72) Inventors: Seungjoo An, Seoul (KR); Seungryul Yang, Seoul (KR); Woosuk Ko, Seoul (KR); Jinwon Lee, Seoul (KR); Kyoungsoo Moon, Seoul (KR); Sungryong Hong, Seoul (KR); Minsung Kwak, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/447,432

(22) Filed: Jun. 20, 2019

(65) Prior Publication Data

US 2019/0306582 A1 Oct. 3, 2019

Related U.S. Application Data

(63) Continuation of application No. 15/324,189, filed as application No. PCT/KR2015/006917 on Jul. 6, 2015, now Pat. No. 10,477,276.

(Continued)

(51) Int. Cl.
*H04N 21/482* (2011.01)
*H04N 21/43* (2011.01)
(Continued)

(52) U.S. Cl.
CPC ....... *H04N 21/482* (2013.01); *H04L 27/2627* (2013.01); *H04L 63/0853* (2013.01);
(Continued)

(58) Field of Classification Search
CPC .......... H04N 21/236; H04N 21/23605; H04N 21/2383; H04N 21/26283; H04N 21/4108;
(Continued)

(56) References Cited

U.S. PATENT DOCUMENTS

2002/0059602 A1  5/2002  Macrae et al.
2006/0253874 A1  11/2006 Stark et al.
(Continued)

FOREIGN PATENT DOCUMENTS

KR   10-2006-0124205 A   12/2006
KR   10-2007-0081872 A   8/2007
(Continued)

*Primary Examiner* — Nicholas T Corbo
(74) *Attorney, Agent, or Firm* — Birch, Stewart, Kolasch & Birch, LLP

(57) ABSTRACT

A method of transmitting broadcast data by a broadcast receiver includes connecting the broadcast receiver with a companion device; receiving a request for Electronic Service Guide (ESG) data from the companion device; and transmitting the broadcast data including partial or full ESG information of the ESG data to the companion device based on a type of the request. The ESG data includes a content fragment including an extension element including a component element, and the component element including at least one of a video component element describing a role of a video component, an audio component element describing a role of an audio component, a closed caption component element describing a role of a closed caption component, or an application component element describing a role of an
(Continued)

application component, and a capability element for the at least one of the video component or the audio component.

18 Claims, 59 Drawing Sheets

Related U.S. Application Data

(60) Provisional application No. 62/027,795, filed on Jul. 23, 2014, provisional application No. 62/022,213, filed on Jul. 9, 2014.

(51) Int. Cl.
| | |
|---|---|
| *H04N 21/45* | (2011.01) |
| *H04N 21/236* | (2011.01) |
| *H04N 21/41* | (2011.01) |
| *H04N 21/426* | (2011.01) |
| *H04N 21/262* | (2011.01) |
| *H04L 27/26* | (2006.01) |
| *H04L 29/06* | (2006.01) |
| *H04N 21/2383* | (2011.01) |
| *H04N 21/61* | (2011.01) |
| *H04N 21/63* | (2011.01) |

(52) U.S. Cl.
CPC ....... *H04L 63/0876* (2013.01); *H04N 21/236* (2013.01); *H04N 21/2383* (2013.01); *H04N 21/23605* (2013.01); *H04N 21/26283* (2013.01); *H04N 21/4108* (2013.01); *H04N 21/4126* (2013.01); *H04N 21/42684* (2013.01); *H04N 21/43* (2013.01); *H04N 21/45* (2013.01); *H04N 21/6112* (2013.01); *H04N 21/632* (2013.01)

(58) Field of Classification Search
CPC ......... H04N 21/4126; H04N 21/42684; H04N 21/43; H04N 21/45; H04N 21/482; H04N 21/6112; H04N 21/632; H04L 27/2627; H04L 63/0853; H04L 63/0876
See application file for complete search history.

(56) References Cited

U.S. PATENT DOCUMENTS

| | | | |
|---|---|---|---|
| 2009/0253416 A1* | 10/2009 | Lee | ........................ H04H 60/72 455/414.1 |
| 2009/0254481 A1* | 10/2009 | Lee | .................... H04N 7/17318 705/51 |
| 2012/0331508 A1* | 12/2012 | Vare | .................... H04L 65/4076 725/50 |
| 2013/0047180 A1 | 2/2013 | Moon et al. | |
| 2014/0129232 A1 | 5/2014 | Jones et al. | |
| 2016/0261665 A1* | 9/2016 | Stockhammer | ....... H04L 65/604 |

FOREIGN PATENT DOCUMENTS

| | | |
|---|---|---|
| KR | 10-2009-0065095 A | 6/2009 |
| KR | 10-2009-0131292 A | 12/2009 |
| KR | 10-2013-0020874 A | 3/2013 |

* cited by examiner

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 12

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3 | |
|     FRU_PHY_PROFILE | 3 |
|     FRU_FRAME_LENGTH | 2 |
|     FRU_GI_FRACTION | 3 |
|     RESERVED | 4 |
| end | |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 13

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
| | |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - i : NUM_AUX | |
|         AUX_STREAM_TYPE | 4 |
|         AUX_PRIVATE_CONF | 28 |
|     end | |
| end | |

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID | 6 |
| | DP_START | 15 (or 13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG == 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

FIG. 20
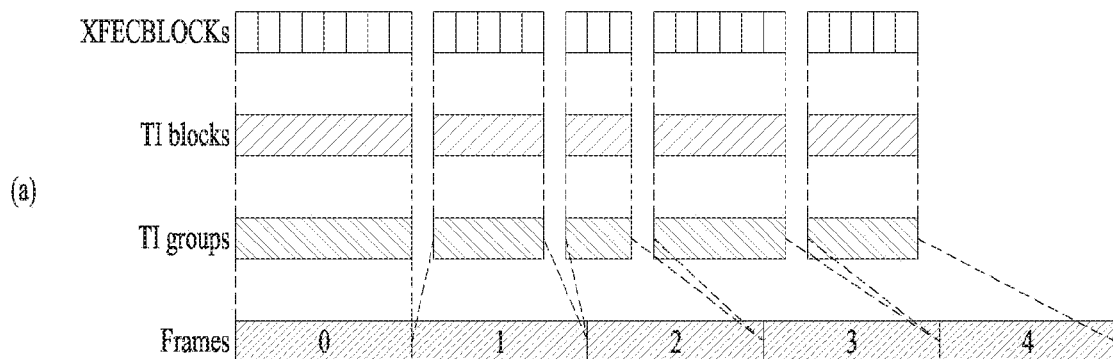
(a)
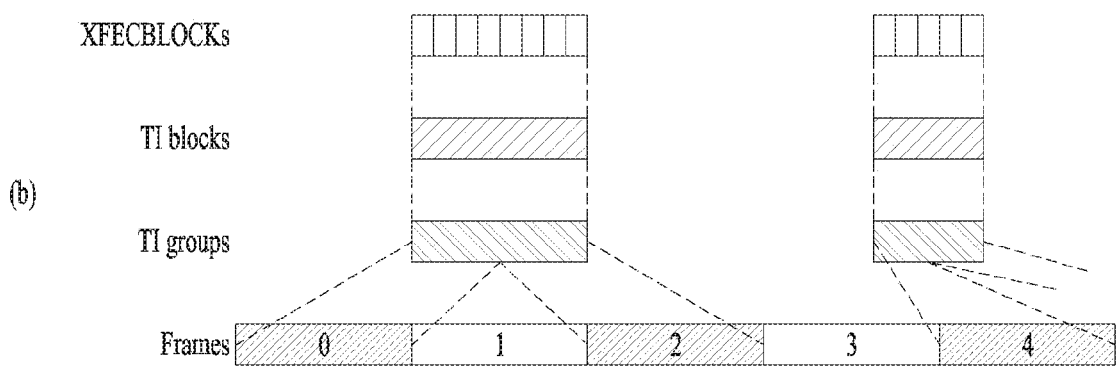
(b)
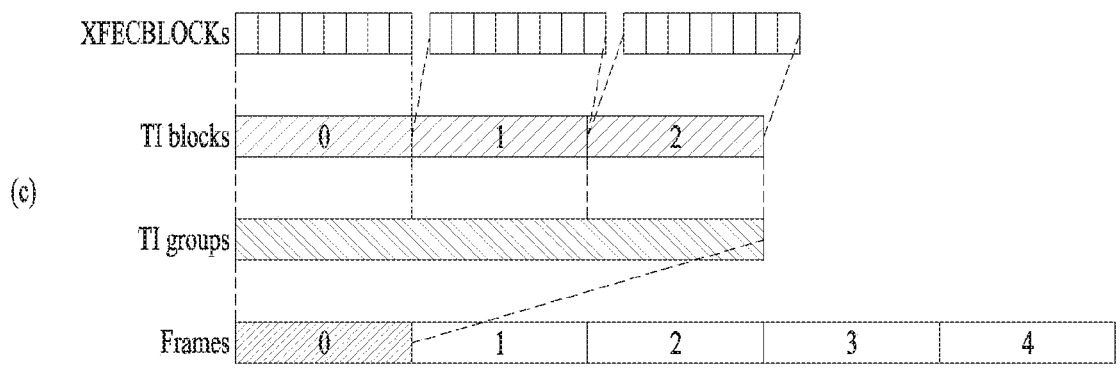
(c)

FIG. 21
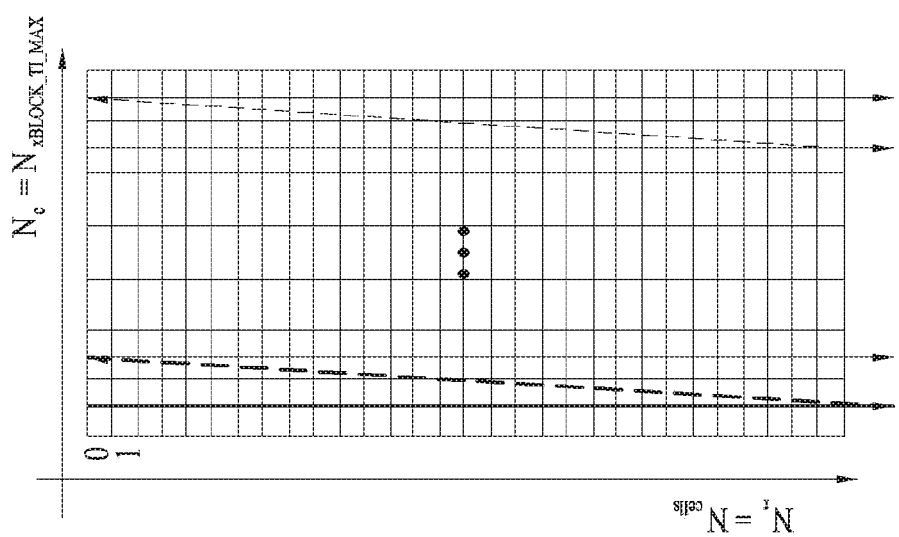
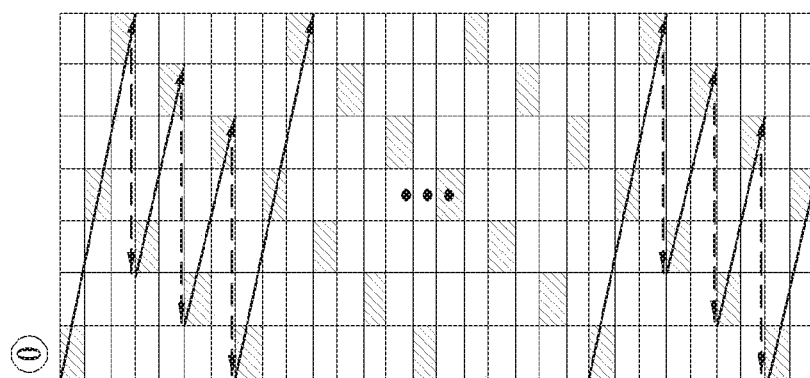
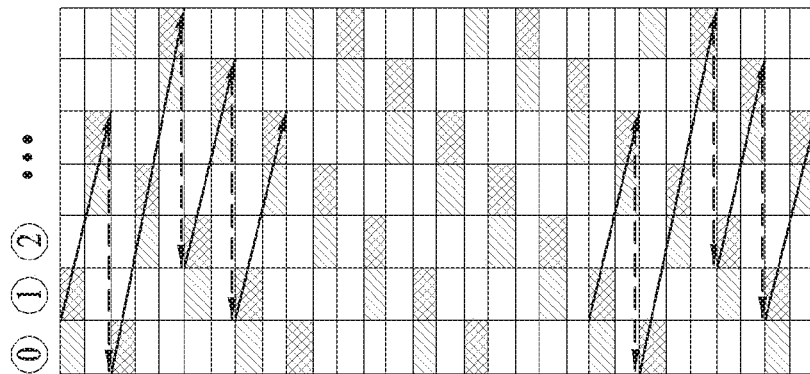

FIG. 23
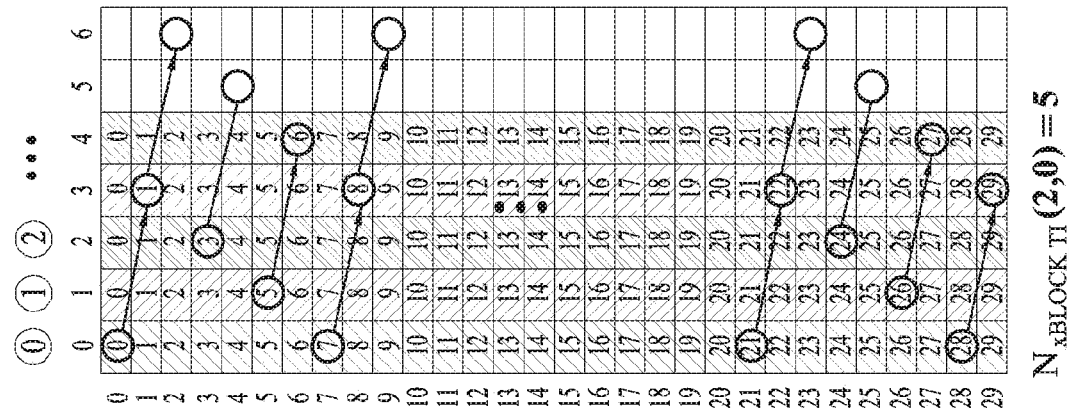
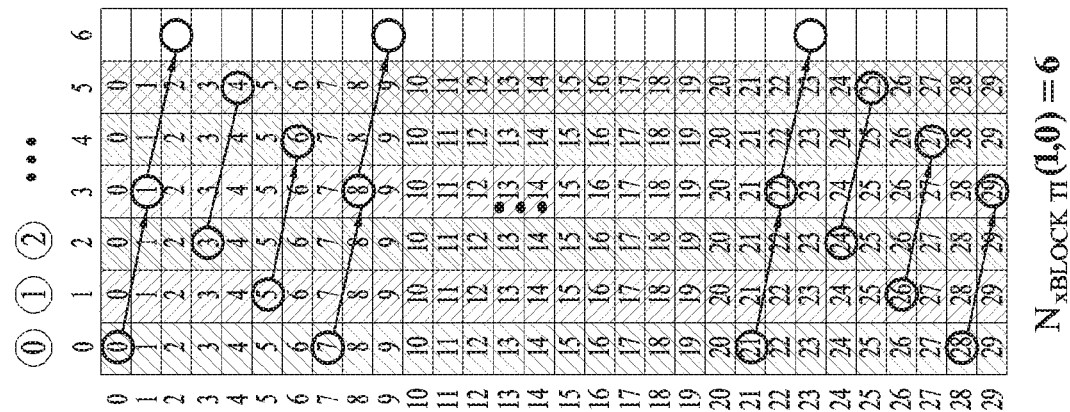
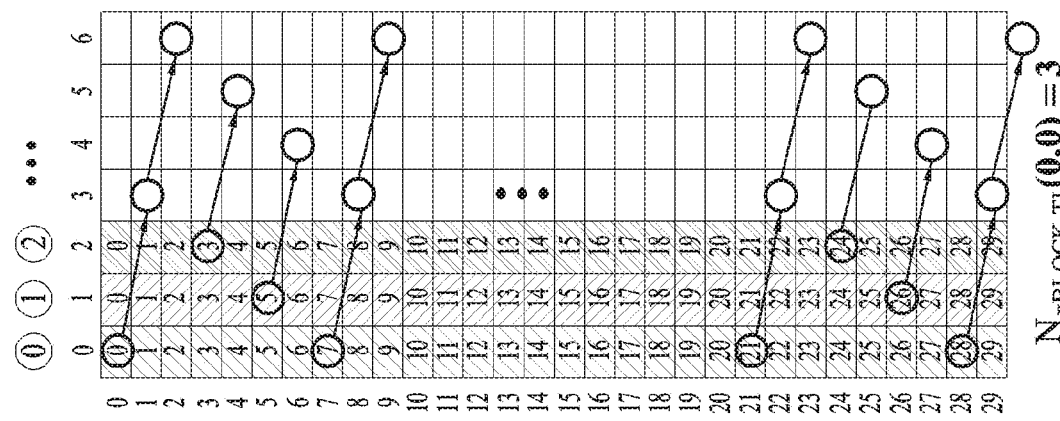

FIG. 24

FIG. 25
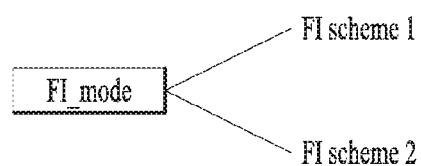
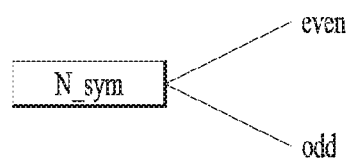
FIG. 26
| | | FI_mode | |
|---|---|---|---|
| | | 0 | 1 |
| N_sym | even | FI scheme #1 | FI scheme #1 |
| | odd | FI scheme #1 | FI scheme #2 |

FIG. 27

|  |  | FI_mode | |
|---|---|---|---|
|  |  | 0 | 1 |
| N_sym | even | off | off |
|  | odd | on | off |

FIG. 28 t50010 — $O_{m,l} = [x_{m,l,0}, \ldots, x_{m,l,p}, \ldots, x_{m,l,N_{data}-1}]$  $l = 0, \ldots, N_{sym}-1$ t50020 — $P_{m,l} = [v_{m,l,0}, \ldots, v_{m,l,N_{data}-1}]$  $l = 0, \ldots, N_{sym}-1$

FIG. 29 t51010 — $v_{m,l,H_l(p)} = x_{m,l,p}$  $l = 0, 1, \ldots, N_{sym}-1$  $p = 0, 1, \ldots, N_{data}-1,$ t51020 — $v_{m,l,p} = x_{m,l,H_l(p)}$  $l = 0, 1, \ldots, N_{sym}-1$  $p = 0, 1, \ldots, N_{data}-1,$

FIG. 37 for $0 \leq k \leq N_{cells}N'_{BLOCKTI} - 1$ $\quad r_k = \mathrm{mod}(k, N_{cells})$, $\quad t_k = \mathrm{mod}(S_T \times r_k, N'_{BLOCKTI})$, $\quad c_k = \mathrm{mod}(t_{j,k} + \left\lfloor \dfrac{k}{N_{cells}} \right\rfloor, N'_{BLOCKTI})$, $\quad \pi(k) = N_{cells}c_k + r_k$ end where $S_T$ is defined as $S_T = \dfrac{N'_{BLOCKTI} - 1}{2} + 1$ for $\begin{cases} N'_{BLOCKTI} = N_{BLOCKTI} + 1, & \text{if } N_{BLOCKTI} \bmod 2 = 0 \\ N'_{BLOCKTI} = N_{BLOCKTI}, & \text{if } N_{BLOCKTI} \bmod 2 = 1 \end{cases}$ $\pi(k)$: the k-th address for reading memory data
$S_T$: shift value for use in interleaving (constant value)

FIG. 39 for $0 \leq k \leq N_{cells} N'_{BLOCK\_TI\_MAX} - 1$ $r_k = \mod(k, N_{cells})$, $t_k = \mod(S_T \times r_k, N'_{BLOCK\_TI\_MAX})$, $c_k = \mod(t_k + \left\lfloor \dfrac{k}{N_{cells}} \right\rfloor, N'_{BLOCK\_TI\_MAX})$, $V(k) = N_{cells} c_k + r_k$, if $V(k) \geq N_{cells} N_{BLOCK\_TI\_Diff}$ — Skip virtual FEC blocks
 $\pi(C_{cnt}) = \theta(k)$,
 $C_{cnt} = C_{cnt} + 1$,
end end where $C_{cnt} = 0$, $S_T = \dfrac{N'_{BLOCK\_TI\_MAX} - 1}{2} + 1$ for $\begin{cases} N'_{BLOCK\_TI\_MAX} = N_{BLOCK\_TI\_MAX} + 1, & \text{if } N_{BLOCK\_TI\_MAX} \mod 2 = 0 \\ N'_{BLOCK\_TI\_MAX} = N_{BLOCK\_TI\_MAX}, & \text{if } N_{BLOCK\_TI\_MAX} \mod 2 = 1 \end{cases}$ $N_{BLOCK\_TI\_Diff} = N'_{BLOCK\_TI\_MAX} - N_{BLOCK\_TI}$

| | 0 | 1 | 2 | 3 | 4 |
|---|---|---|---|---|---|
| 0 | 1 | 13 | 25 | 7 | 19 |
| 1 | 3 | 15 | 27 | 9 | 21 |
| 2 | 4 | 16 | 28 | 10 | 22 |
| 3 | 5 | 17 | 29 | 11 | 23 |
| 4 | 6 | 18 | 0 | 12 | 24 |
| 5 | 8 | 20 | 2 | 14 | 26 |
| 6 | 10 | 22 | 4 | 16 | 28 |
| 7 | 11 | 23 | 5 | 17 | 29 |
| 8 | 12 | 24 | 6 | 18 | 0 |
| 9 | 13 | 25 | 7 | 19 | 1 |
| 10 | 15 | 27 | 9 | 21 | 3 |
| 11 | 17 | 29 | 11 | 23 | 5 |
| 12 | 18 | 0 | 12 | 24 | 6 |
| 13 | 19 | 1 | 13 | 25 | 7 |
| 14 | 20 | 2 | 14 | 26 | 8 |
| 15 | 22 | 4 | 16 | 28 | 10 |
| 16 | 24 | 6 | 18 | 0 | 12 |
| 17 | 25 | 7 | 19 | 1 | 13 |
| 18 | 26 | 8 | 20 | 2 | 14 |
| 19 | 27 | 9 | 21 | 3 | 15 |
| 20 | 29 | 11 | 23 | 5 | 17 |
| 21 | 1 | 13 | 25 | 7 | 19 |
| 22 | 2 | 14 | 26 | 8 | 20 |
| 23 | 3 | 15 | 27 | 9 | 21 |
| 24 | 4 | 16 | 28 | 10 | 22 |
| 25 | 6 | 18 | 0 | 12 | 24 |
| 26 | 8 | 20 | 2 | 14 | 26 |
| 27 | 9 | 21 | 3 | 15 | 27 |
| 28 | 10 | 22 | 4 | 16 | 28 |
| 29 | 11 | 23 | 5 | 17 | 29 |

$N_{BLOCK\_T1,0}=5$

| | 0 | 1 | 2 | 3 | 4 | 5 |
|---|---|---|---|---|---|---|
| 0 | 1 | 6 | 11 | 16 | 21 | 26 |
| 1 | 2 | 7 | 12 | 17 | 22 | 27 |
| 2 | 3 | 8 | 13 | 18 | 23 | 28 |
| 3 | 4 | 9 | 14 | 19 | 24 | 29 |
| 4 | 5 | 10 | 15 | 20 | 25 | 0 |
| 5 | 6 | 11 | 16 | 21 | 26 | 1 |
| 6 | 8 | 13 | 18 | 23 | 28 | 3 |
| 7 | 9 | 14 | 19 | 24 | 29 | 4 |
| 8 | 10 | 15 | 20 | 25 | 0 | 5 |
| 9 | 11 | 16 | 21 | 26 | 1 | 6 |
| 10 | 12 | 17 | 22 | 27 | 2 | 7 |
| 11 | 13 | 18 | 23 | 28 | 3 | 8 |
| 12 | 15 | 20 | 25 | 0 | 5 | 10 |
| 13 | 16 | 21 | 26 | 1 | 6 | 11 |
| 14 | 17 | 22 | 27 | 2 | 7 | 12 |
| 15 | 18 | 23 | 28 | 3 | 8 | 13 |
| 16 | 19 | 24 | 29 | 4 | 9 | 14 |
| 17 | 20 | 25 | 0 | 5 | 10 | 15 |
| 18 | 22 | 27 | 2 | 7 | 12 | 17 |
| 19 | 23 | 28 | 3 | 8 | 13 | 18 |
| 20 | 24 | 29 | 4 | 9 | 14 | 19 |
| 21 | 25 | 0 | 5 | 10 | 15 | 20 |
| 22 | 26 | 1 | 6 | 11 | 16 | 21 |
| 23 | 27 | 2 | 7 | 12 | 17 | 22 |
| 24 | 29 | 4 | 9 | 14 | 19 | 24 |
| 25 | 0 | 5 | 10 | 15 | 20 | 25 |
| 26 | 1 | 6 | 11 | 16 | 21 | 26 |
| 27 | 2 | 7 | 12 | 17 | 22 | 27 |
| 28 | 3 | 8 | 13 | 18 | 23 | 28 |
| 29 | 4 | 9 | 14 | 19 | 24 | 29 |

$N_{BLOCK\_T1,0}=6$

FIG. 47 for $0 \leq k \leq N_{cells}N'_{BLOCKTI\_MAX}-1$
  $r_k = \mathrm{mod}(k, N_{cells})$,
  $t_k = \mathrm{mod}(S_R \times r_k, N'_{BLOCKTI\_MAX})$,
  $c_k = \mathrm{mod}(t_k + \left\lfloor \dfrac{k}{N_{cells}} \right\rfloor, N'_{BLOCKTI\_MAX})$,
  $V(k) = N_{cells}c_k + r_k$,
  if $V(k) \geq N_{cells}N_{BLOCKTI\_Diff}$      Skip virtual FEC blocks
    $\pi(C_{cnt}) = \theta(k)$,
    $C_{cnt} = C_{cnt}+1$,
  end
end
where
$C_{cnt} = 0$,
$S_R = N'_{BLOCKTI\_MAX} - S_T$,
$N_{BLOCKTI\_Diff} = N'_{BLOCKTI\_MAX} - N_{BLOCKTI}$

FIG. 53

| Service | Service Type | Service ID |
|---|---|---|
| ESG | atsc3.0ESG:1 | urn:atsc.org:serviceId:atsc3.0ESG |

FIG. 54

```
<?xml version="1.0" encoding="UTF-8"?>
<ESGData
xmlns="urn: atsc. serviceId: atsc3 . OESG"
xsi: schemaLocacion="urn. atsc.org : serviceId: atsc3 . OESG"
``` t54010
```
<Service id = "atsc.org/ esg/ service/1" version-"1">
    <Name>Home Shopping</Name>
    <Description> Home Shopping Linear Service</Descripcion>
    <ServiceType>14</ServiceType>
    <ServiceType>15</ServiceType>
    ...
</Service>
``` t54020
```
<Schedule id="atsc.org/ esg/scheduie/1" version="1">
    <ServiceReference idRef ="atsc.org/ esg/ service/1">
    </ServiceReference>
    ...
</Schedule>
<Content id="atsc.org/content/1" version="1">
    ...
``` t54030
```
    <ComponentReference idRef = "atsc.org/ esg/component/1">
    </ComponentReference>
    ...
</Content>
``` t54040
```
<Component id="atsc.org/esg/component/1" version="1">
    <ComponentType>1</ComponentType>
    <ComponentType>6</ComponentType>
    ...
    <ComponentData ConrentType="Video">
        ...
</Component>
```

```
...
<InteractivityData>
...
</InteractivityData>
</ESGData>
```

FIG. 55

```
<ESGData
xmlns="urn: atsc. serviceId: atsc3 . OESG"
xsi: schemaLocacion="urn. atsc.org : serviceId: atsc3 . OESG"
    <Service id = "atsc.org/ esg/ service/1" version-"1">
        <Name>Home Shopping</Name>
        <Description> Home Shopping Linear Service</Descripcion>
        <ServiceType>14</ServiceType>
        <ServiceType>15</ServiceType>
        ...
    </Service>
    <Schedule id="atsc.org/ esg/service/2" version="1">
    ...
    </Schedule>
    <Content id="atsc.org/content/1" version="1">
        <ServiceReference idRef = "atsc.org/ esg/ service/1">
        </ServiceReference>
        ...
    </Schedule>
    <Content id = "atsc.org/ esg/ service/1" version="1">
        ...
        <ServiceReference idRef = <"atsc.org/ esg/ service/1">
        </ServiceReference>
        <PrivateExt>
        <Component>
t55010      <ComponentType>1</ComponentType>
            <ComponentType>1</ComponentType>
            <StarTime/>
            <EndTime/>
            <Language/>
            <Length/>
            <ParentalRating/>
            <DeviceCapability>4</DeviceCapability>
            <DeviceCapability>8</DeviceCapability>
            <TargetDevice>1</TargetDevice>
        </Component>
        <Component>
            <ComponentType>2</ComponentType>
            <ComponentRole>6</ComponentRole>
            <StartTime/>
            <EndTime/>
            <Language>KOR</Language>
            <Length/>
            <ParentalRating/>
            <DeviceCapability>11</DeviceCapability>
            <TargetDevice>1</TargetDevice>
        </Component>
    </PrivateExt>
    ...
    </Content>
    ...
</ESGData>
```

FIG. 57

```
<?xml version="1.0" encoding="UTF-8"?>
<LastChangedESGData
xmlns="urn: atsc . org:serviceId: atsc3 . OESG"
xsi: schemaLocacion="urn. atsc.org : serviceId: atsc3 . OESG"
``` t57010
```
    <Addtion>
        <Service id="atsc.org/esg/service/3" version="1">
        ...
        </Service>
        <Service id="atsc.org/esg/service/4" version="1">
        <Name>ABC</Name>
            ...
        </Service>
    </Addtion>
``` t57020
```
    <Modification>
        <Schedule id="atsc.org/esg/service/3" version="1">
        ...
        </Schedule>
    </Modification>
``` t57030
```
    <Deletion>
        <Content id="atsc.org/content/1" version="1">
        ...
        </Content>
        <Content id="atsc.org/content/2" version="1">
        ...
        </Content>
    </Deletion>
</LastChangedESGData>
```

BROADCASTING SIGNAL TRANSMISSION DEVICE, BROADCASTING SIGNAL RECEPTION DEVICE, BROADCASTING SIGNAL TRANSMISSION METHOD, AND BROADCASTING SIGNAL RECEPTION METHOD

CROSS-REFERENCE TO RELATED APPLICATIONS

This Application is a Continuation of co-pending U.S. patent application Ser. No. 15/324,189 filed on Jan. 5, 2017, which is the National Phase of PCT International Application No. PCT/KR2015/006917 filed on Jul. 6, 2015, which claims the priority benefit under 35 U.S.C. § 119(e) to U.S. Provisional Application Nos. 62/027,795 filed on Jul. 23, 2014 and 62/022,213 filed on Jul. 9, 2014, all of which are hereby expressly incorporated by reference into the present application.

BACKGROUND OF THE INVENTION

Field of the Invention

The present invention relates to a broadcast signal transmitting device, a broadcast signal receiving device, and a broadcast transceiving method.

Discussion of the Related Art

As analog broadcast signal transmission is terminated, various technologies for transmitting and receiving a digital broadcast signal have been developed. A digital broadcast signal is capable of containing a larger amount of video/audio data than an analog broadcast signal and further containing various types of additional data as well as video/audio data.

SUMMARY OF THE INVENTION

That is, a digital broadcast system may provide a high definition (HD) image, multi channel audio, and various additional services. However, for digital broadcast, network flexibility obtained by considering data transmission efficiency for a large amount of data transmission, robustness of a transceiving network, and a mobile receiving apparatus needs to be enhanced.

The object of the present invention can be achieved by providing a method of providing a broadcast service by a broadcast receiver, the method including pairing a network interface unit with a companion device, and receiving electronic service guide (ESG) by a receiving unit, wherein the ESG includes ESG data about at least one broadcast service.

The ESG data may be service type information, schedule information, related content information, or related component information of the at least one broadcast service.

The method may further include transmitting information on modified content of the ESG to the companion device, wherein the information on modified content may include added, modified, or deleted ESG data of the received ESG compared with pre-stored ESG data.

The method may further include transmitting an ID list of broadcast services included in the ESG to the companion device, receiving a request for ESG data related to specific broadcast services identified according to at least one ID of the ID list, from the companion device, and transmitting the requested ESG data related to specific broadcast services to the companion device.

The method may further include receiving a request for an ID of a currently watched broadcast service from the companion device and transmitting the requested ID of the currently watched broadcast service to the companion device, receiving a request for ESG data related to the currently watched service, and transmitting the requested ESG data related to the currently watched service to the companion device.

The method may further include receiving a search field indicating a specific field of the ESG data and a target value of the specific field, from the companion device, selecting ESG data having the target value of the specific field indicated by the search field by a control unit, and transmitting the selected ESG data to the companion device.

The method may further include receiving authentication information of the companion device from the companion device, the authentication information including device ID information of the companion device, checking whether the companion device is authenticated using the authentication information by an authentication module, and when the companion device is checked to be authenticated, transmitting device ID information of a broadcast receiver to the companion device.

The transmitting of the ID list to the companion device may include receiving a request for the ID list from the companion device, the request for the ID list including authentication information of the companion device, checking whether the companion device is authenticated using the authentication information by an authentication module, and when the companion device is checked to be authenticated, transmitting the ID list and device ID information of a broadcast receiver to the companion device.

The method may further include receiving a request for change in a currently watched broadcast service from the companion device, the request for change in the broadcast service being based on the received ESG data, and changing a broadcast service watched in a broadcast receiver according to the request for change in the broadcast service by a control unit.

In another aspect of the present invention, provided herein is a broadcast receiver for providing a broadcast service, including a network interface unit configured to be paired with a companion device, and a receiving unit configured to receive electronic service guide (ESG), wherein the ESG may include ESG data about at least one broadcast service.

The ESG data may be service type information, schedule information, related content information, or related component information of the at least one broadcast service.

The network interface unit may transmit information on modified content of the ESG to the companion device, and the information on modified content may include added, modified, or deleted ESG data of the received ESG compared with pre-stored ESG data.

The network interface unit may transmit an ID list of broadcast services included in the ESG to the companion device, receive a request for ESG data related to specific broadcast services identified according to at least one ID of the ID list, from the companion device, and transmit the requested ESG data related to specific broadcast services to the companion device.

The network interface unit may receive a request for an ID of a currently watched broadcast service from the companion device, transmit the requested ID of the currently watched broadcast service to the companion device, receive a request for ESG data related to the currently watched service, and transmit the requested ESG data related to the currently watched service to the companion device.

The network interface unit may transmit a search field indicating a specific field of the ESG data and a target value of the specific field, from the companion device, the broadcast receiver may further include a control unit configured to select ESG data having the target value of the specific field indicated by the search field, and the network interface unit may transmit the selected ESG data to the companion device.

The network interface unit may receive authentication information of the companion device from the companion device, the authentication information including device ID information of the companion device, the broadcast receiver may further include an authentication module configured to check whether the companion device is authenticated using the authentication information, and the network interface unit may transmit device ID information of the broadcast receiver to the companion device when the companion device is checked to be authenticated.

The network interface unit may receive a request for the ID list from the companion device, the request for the ID list including authentication information of the companion device, the broadcast receiver may further include an authentication module configured to check whether the companion device is authenticated using the authentication information, and the network interface unit transmits the ID list and device ID information of the broadcast receiver to the companion device when the companion device is checked to be authenticated.

The network interface unit may receive a request for change in a currently watched broadcast service from the companion device, the request for change in the broadcast service being based on the received ESG data, and the broadcast receiver may further include a control unit configured to change a broadcast service watched in the broadcast receiver according to the request for change in the broadcast service.

As is apparent from the above description, the embodiments of the present invention can process data according to service characteristics to control QoS (Quality of Service) for each service or service component, thereby providing various broadcast services.

The embodiments of the present invention can achieve transmission flexibility by transmitting various broadcast services through the same radio frequency (RF) signal bandwidth.

The embodiments of the present invention can improve data transmission efficiency and increase robustness of transmission/reception (Tx/Rx) of broadcast signals using a MIMO (Multiple Input Multiple Output) system.

The embodiments of the present invention can provide a method and apparatus, which are configured to receive digital broadcast signals without errors even with mobile reception equipment or in an indoor environment, for transmitting and receiving broadcast signals.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 12 illustrates PLS1 data according to an embodiment of the present invention.

FIG. 13 illustrates PLS2 data according to an embodiment of the present invention.

FIG. 20 illustrates a time interleaving according to an embodiment of the present invention.

FIG. 21 illustrates the basic operation of a twisted row-column block interleaver according to an embodiment of the present invention.

FIG. 23 illustrates a diagonal-wise reading pattern of a twisted row-column block interleaver according to an embodiment of the present invention.

FIG. 24 illustrates interleaved XFECBLOCKs from each interleaving array according to an embodiment of the present invention.

FIG. 25 illustrates signaling for single-memory deinterleaving irrespective of the number of symbols in a frame according to an embodiment of the present invention.

FIG. 26 illustrates FI schemes of FSS in signaling for single-memory deinterleaving irrespective of the number of symbols in a frame according to an embodiment of the present invention.

FIG. 27 illustrates operation of a reset mode in signaling for single-memory deinterleaving irrespective of the number of symbols in a frame according to an embodiment of the present invention.

FIG. 28 illustrates equations indicating input and output of the frequency interleaver in signaling for single-memory deinterleaving irrespective of the number of symbols in a frame according to an embodiment of the present invention.

FIG. 29 illustrates equations of a logical operation mechanism of frequency interleaving based on FI scheme #1 and FI scheme #2 in signaling for single-memory deinterleaving irrespective of the number of symbols in a frame according to an embodiment of the present invention.

FIG. 37 shows equations representing block interleaving according to an embodiment of the present invention.

FIG. 39 shows equations representing reading operation after insertion of virtual FEC blocks according to an embodiment of the present invention.

FIG. 42 illustrates writing operation according to an embodiment of the present invention.

FIG. 43 illustrates reading operation according to an embodiment of the present invention.

FIG. 44 illustrates a result of skip operation in reading operation according to an embodiment of the present invention.

FIG. 45 shows a writing process of time deinterleaving according to an embodiment of the present invention.

FIG. 46 illustrates a writing process of time deinterleaving according to another embodiment of the present invention.

FIG. 47 shows equations representing reading operation of time deinterleaving according to another embodiment of the present invention.

FIG. 53 is a diagram illustrating a service for exchanging electronic service guide (ESG) between a broadcast receiver and companion devices according to an embodiment of the present invention.

FIG. 54 is a diagram illustrating an ESGData state variable according to an embodiment of the present invention.

FIG. 55 is a diagram illustrating an ESGData state variable according to another embodiment of the present invention.

FIG. 57 is a diagram illustrating LastChangedESGData state variable according to an embodiment of the present invention.

DETAILED DESCRIPTION OF THE EMBODIMENTS

Figure 1:
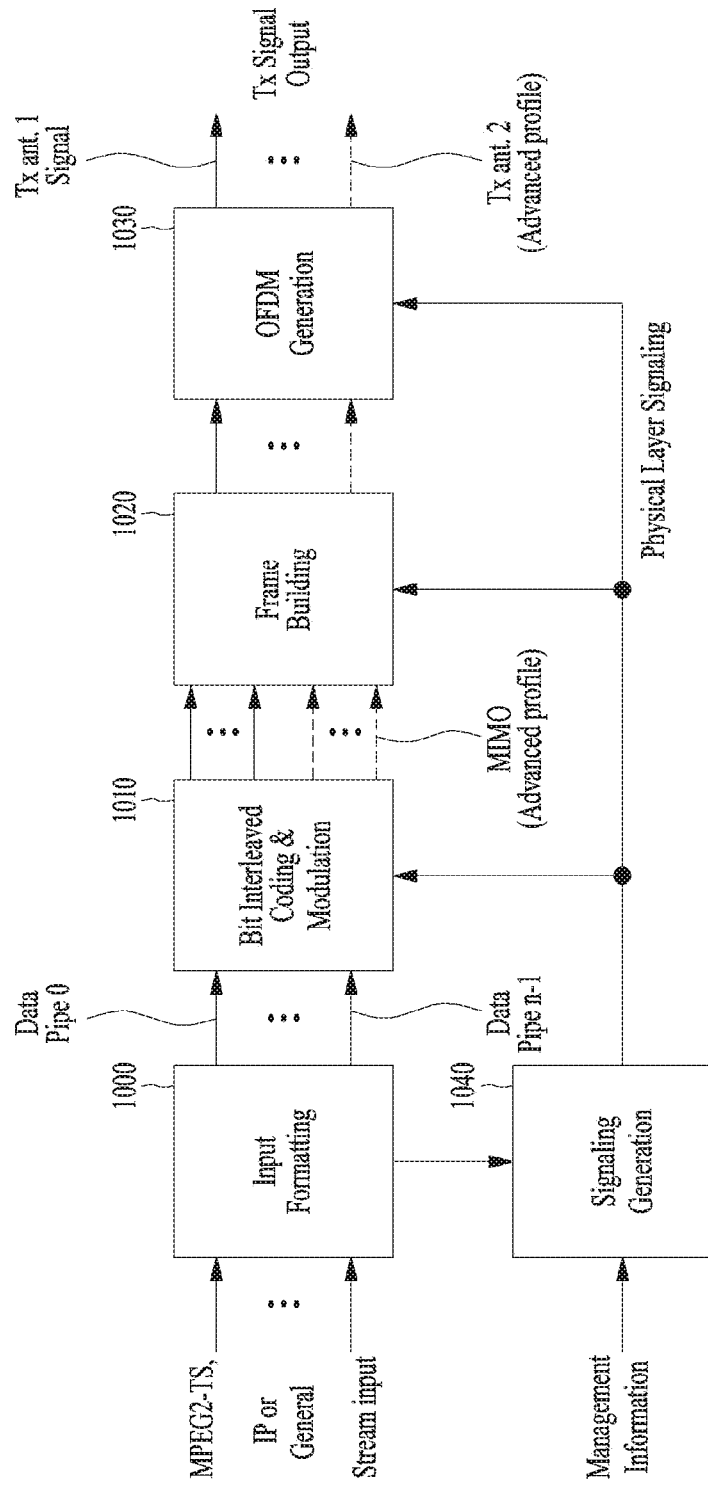
FIG. 1 illustrates a structure of an apparatus for transmitting broadcast signals for future broadcast services according to an embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc.

While MISO or MIMO uses two antennas in the following for convenience of description, the present invention is applicable to systems using two or more antennas. The present invention may defines three physical layer (PL) profiles—base, handheld and advanced profiles—each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | ≤$2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception.

In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer.

The following terms and definitions may apply to the present invention. The following terms and definitions can be changed according to design.

auxiliary stream: sequence of cells carrying data of as yet undefined modulation and coding, which may be used for future extensions or as required by broadcasters or network operators.

base data pipe: data pipe that carries service signaling data.

baseband frame (or BBFRAME): set of Kbch bits which form the input to one FEC encoding process (BCH and LDPC encoding).

cell: modulation value that is carried by one carrier of the OFDM transmission.

coded block: LDPC-encoded block of PLS1 data or one of the LDPC-encoded blocks of PLS2 data.

data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol).

DP_ID: this 8-bit field identifies uniquely a DP within the system identified by the SYSTEM_ID.

dummy cell: cell carrying a pseudo-random value used to fill the remaining capacity not used for PLS signaling, DPs or auxiliary streams.

emergency alert channel: part of a frame that carries EAS information data.

frame: physical layer time slot that starts with a preamble and ends with a frame edge symbol.

frame repetition unit: a set of frames belonging to same or different physical layer profile including a FEF, which is repeated eight times in a super-frame.

fast information channel: a logical channel in a frame that carries the mapping information between a service and the corresponding base DP.

FECBLOCK: set of LDPC-encoded bits of a DP data.

FFT size: nominal FFT size used for a particular mode, equal to the active symbol period Ts expressed in cycles of the elementary period T.

frame signaling symbol: OFDM symbol with higher pilot density used at the start of a frame in certain combinations of FFT size, guard interval and scattered pilot pattern, which carries a part of the PLS data.

frame edge symbol: OFDM symbol with higher pilot density used at the end of a frame in certain combinations of FFT size, guard interval and scattered pilot pattern.

frame-group: the set of all the frames having the same PHY profile type in a super-frame.

future extension frame: physical layer time slot within the super-frame that could be used for future extension, which starts with a preamble.

Futurecast UTB system: proposed physical layer broadcasting system, of which the input is one or more MPEG2-TS or IP or general stream(s) and of which the output is an RF signal.

input stream: A stream of data for an ensemble of services delivered to the end users by the system.

normal data symbol: data symbol excluding the frame signaling symbol and the frame edge symbol.

PHY profile: subset of all configurations that a corresponding receiver should implement.

PLS: physical layer signaling data consisting of PLS1 and PLS2.

PLS1: a first set of PLS data carried in the FSS symbols having a fixed size, coding and modulation, which carries basic information about the system as well as the parameters needed to decode the PLS2.

NOTE: PLS1 data remains constant for the duration of a frame-group.

PLS2: a second set of PLS data transmitted in the FSS symbol, which carries more detailed PLS data about the system and the DPs.

PLS2 dynamic data: PLS2 data that may dynamically change frame-by-frame.

PLS2 static data: PLS2 data that remains static for the duration of a frame-group.

preamble signaling data: signaling data carried by the preamble symbol and used to identify the basic mode of the system.

preamble symbol: fixed-length pilot symbol that carries basic PLS data and is located in the beginning of a frame.

NOTE: The preamble symbol is mainly used for fast initial band scan to detect the system signal, its timing, frequency offset, and FFT-size.

reserved for future use: not defined by the present document but may be defined in future.

super-frame: set of eight frame repetition units.

time interleaving block (TI block): set of cells within which time interleaving is carried out, corresponding to one use of the time interleaver memory.

TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion.

Type 2 DP: DP of a frame where all DPs are mapped into the frame in FDM fashion.

XFECBLOCK: set of Ncells cells carrying all the bits of one LDPC FECBLOCK.

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame building block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
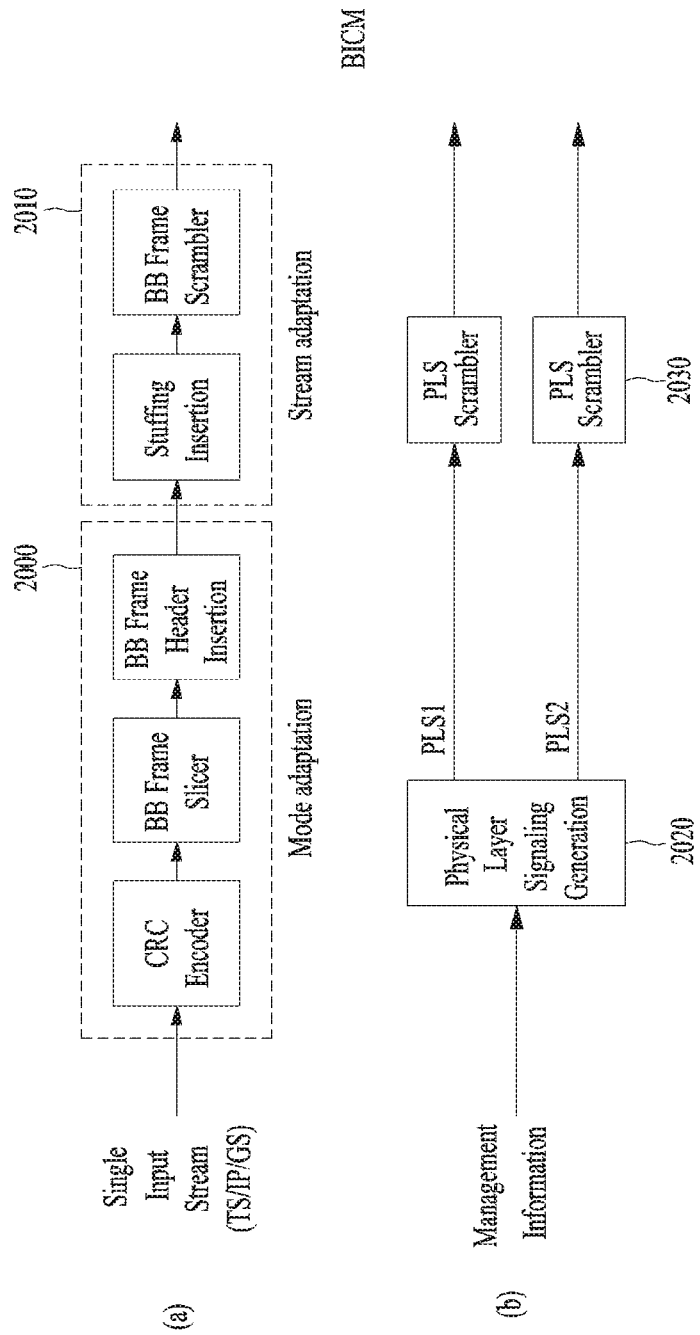
FIG. 2 illustrates an input formatting block according to one embodiment of the present invention.
Figure 3:
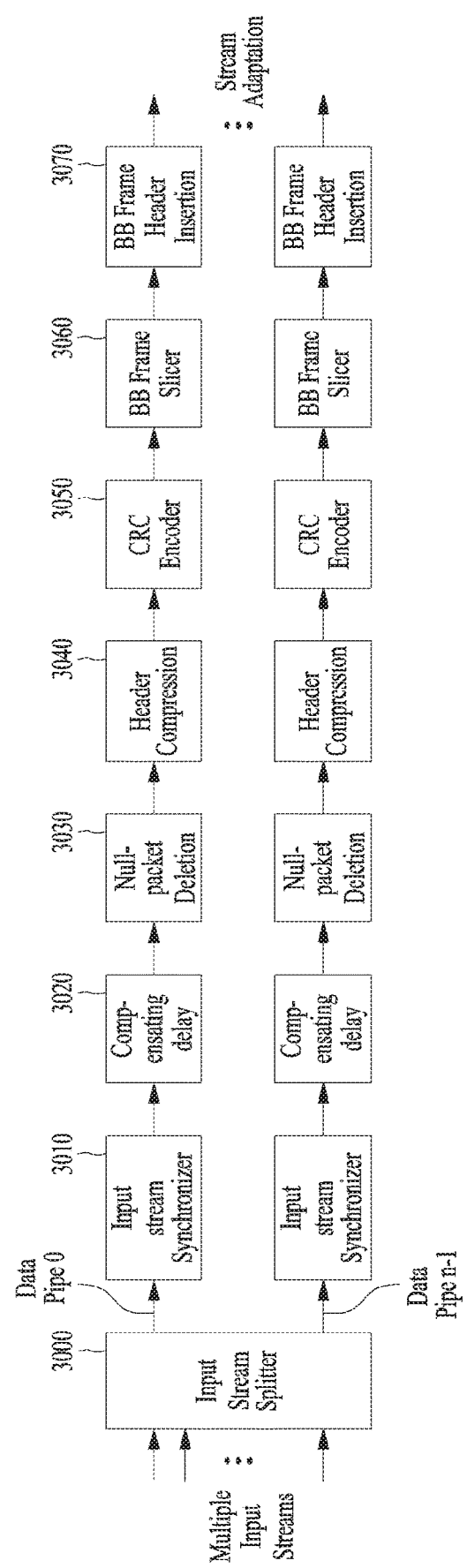
FIG. 3 illustrates an input formatting block according to another embodiment of the present invention.
Figure 4:
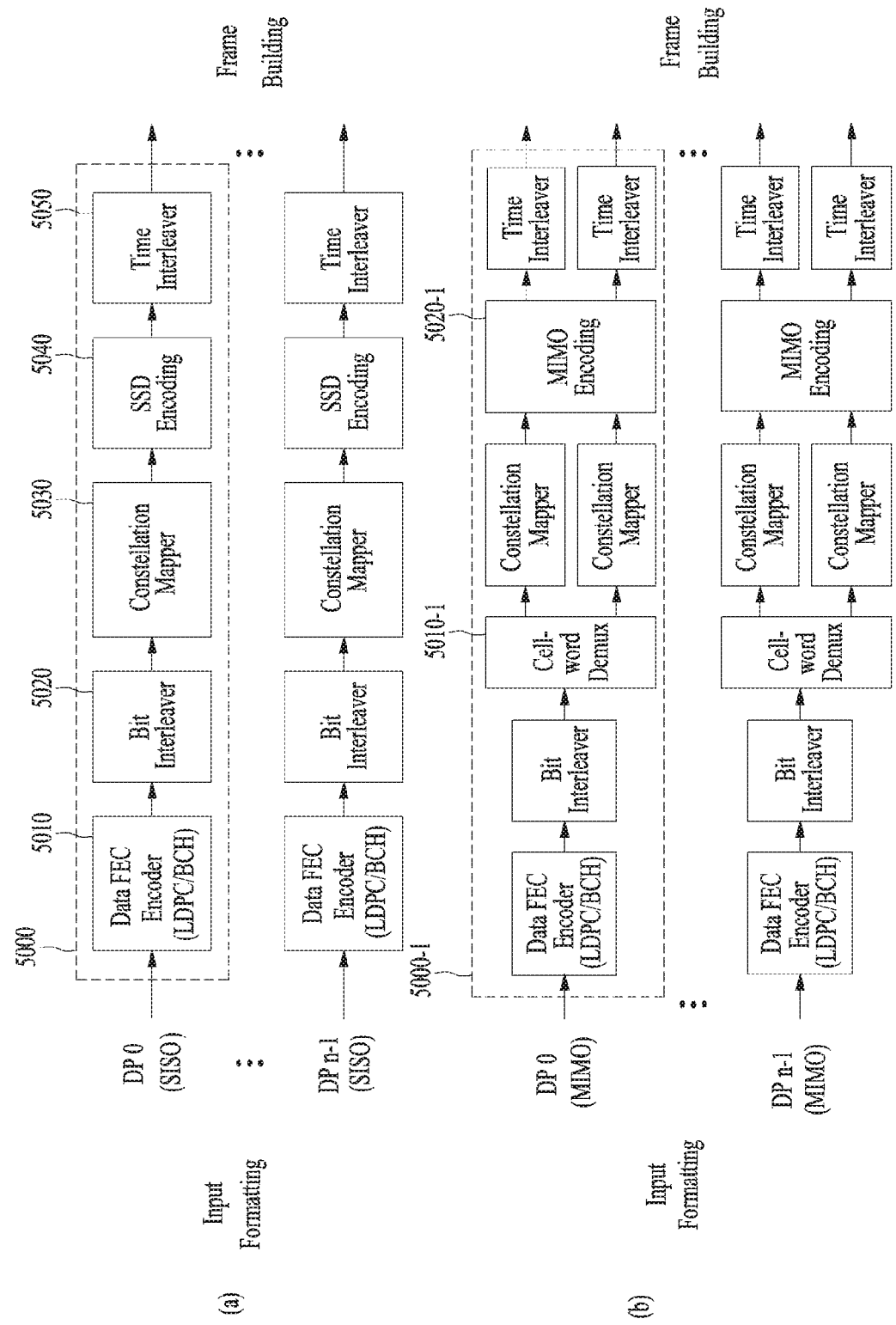
FIG. 4 illustrates a BICM block according to an embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler. The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feedback shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream. The above-described blocks may be omitted or replaced by blocks having similar or identical functions.

FIG. 4 illustrates a BICM block according to an embodiment of the present invention.

The BICM block illustrated in FIG. 4 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, e1. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver.

However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ (e1,i and e2,i) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 5:
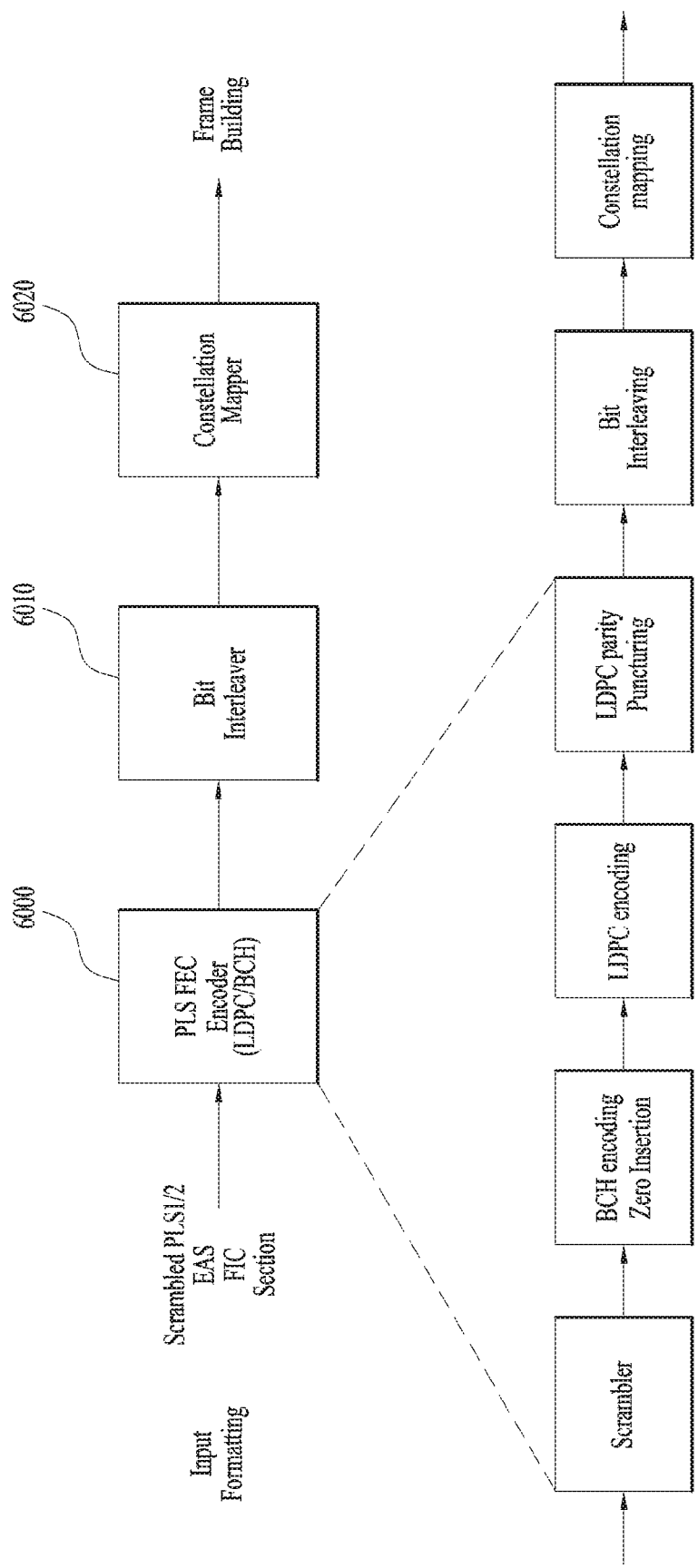
FIG. 5 illustrates a BICM block according to another embodiment of the present invention.

FIG. 5 illustrates a BICM block according to another embodiment of the present invention.

The BICM block illustrated in FIG. 6 corresponds to an embodiment of the BICM block 1010 described with reference to FIG. 1.

FIG. 5 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Figure 6:
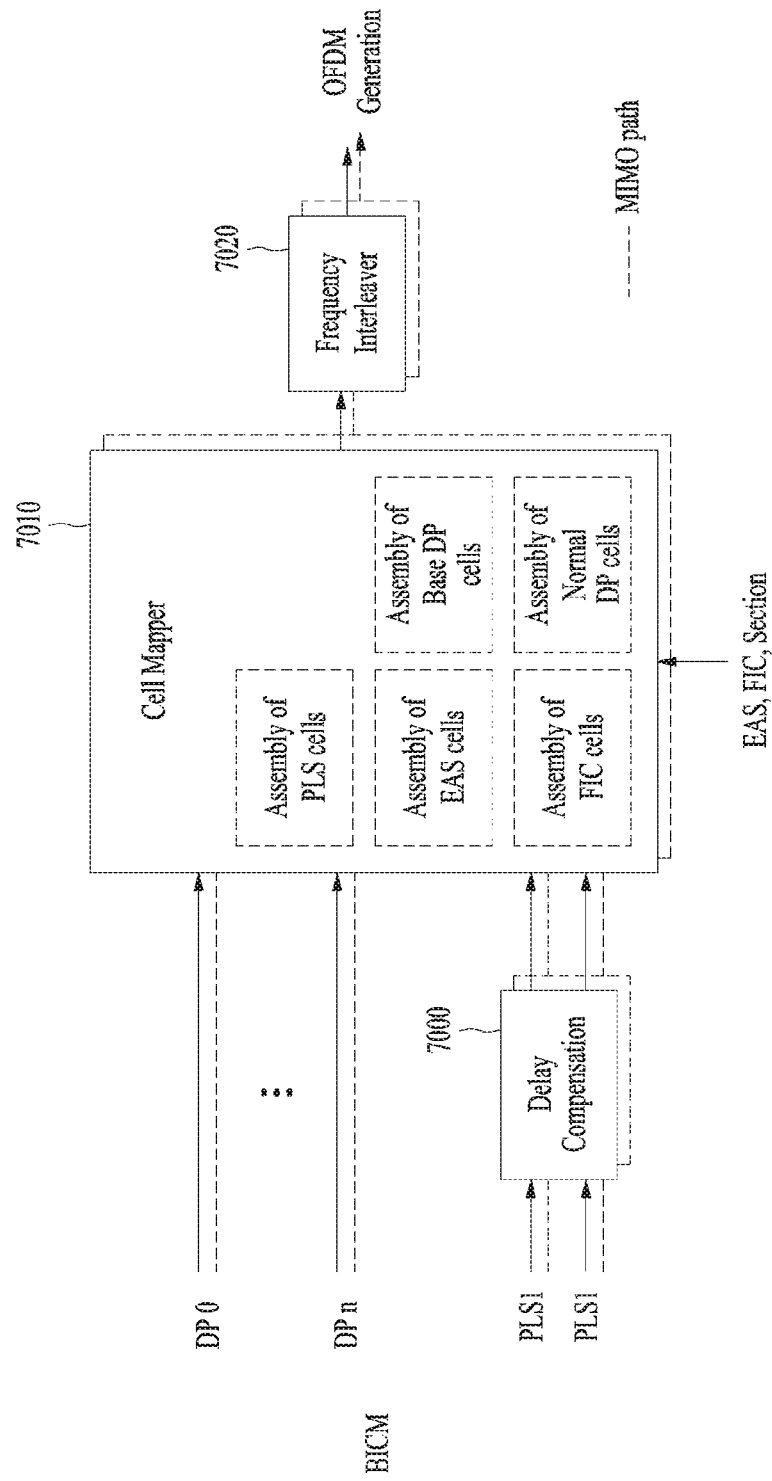
FIG. 6 illustrates a frame building block according to one embodiment of the present invention.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS ½ data, EAC and FIC section.

The scrambler can scramble PLS1 data and PLS2 data before BCH encoding and shortened and punctured LDPC encoding.

The BCH encoding/zero insertion block can perform outer encoding on the scrambled PLS ½ data using the shortened BCH code for PLS protection and insert zero bits after the BCH encoding. For PLS1 data only, the output bits of the zero insertion may be permitted before LDPC encoding.

The LDPC encoding block can encode the output of the BCH encoding/zero insertion block using LDPC code. To generate a complete coded block, Cldpc, parity bits, Pldpc are encoded systematically from each zero-inserted PLS information block, Ildpc and appended after it.

$$C_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Equation 1]

The LDPC code parameters for PLS1 and PLS2 are as following table 4.

TABLE 4

| Signaling Type | $K_{sig}$ | $K_{bch}$ | $N_{bch\_parity}$ | $K_{ldpc}$ (=$N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

FIG. 6 illustrates a frame building block according to one embodiment of the present invention.

The frame building block illustrated in FIG. 6 corresponds to an embodiment of the frame building block 1020 described with reference to FIG. 1.

Referring to FIG. 6, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver 5050. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI(program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame.

The above-described blocks may be omitted or replaced by blocks having similar or identical functions.

Figure 7:
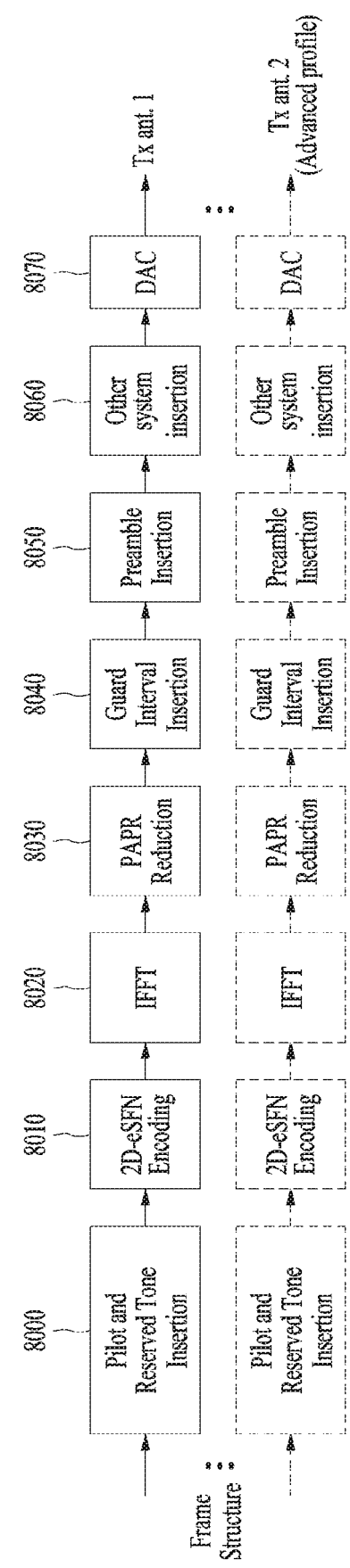
FIG. 7 illustrates an OFDM generation block according to an embodiment of the present invention.

FIG. 7 illustrates an OFDM generation block according to an embodiment of the present invention.

The OFDM generation block illustrated in FIG. 7 corresponds to an embodiment of the OFDM generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 7, the OFDM generation block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070.

The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc.

Figure 8:
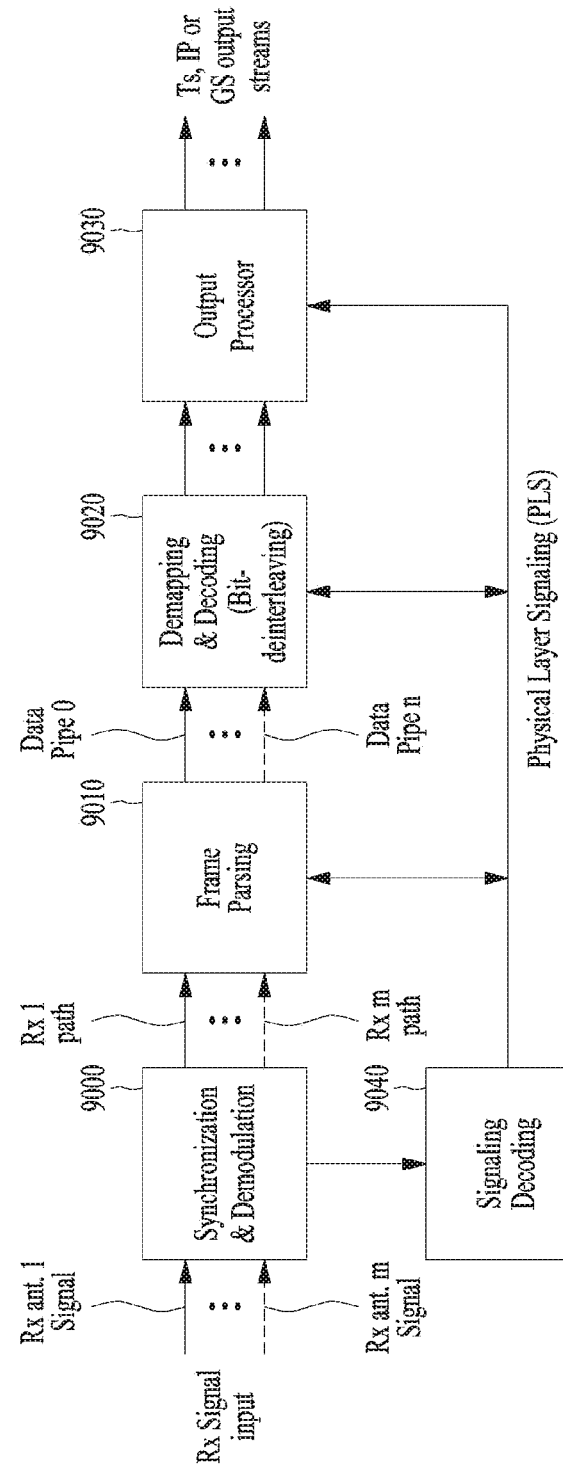
FIG. 8 illustrates a structure of an apparatus for receiving broadcast signals for future broadcast services according to an embodiment of the present invention.

FIG. 8 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9010 can parse input signal frames and extract data through which a service selected by a user is transmitted. If the apparatus for transmitting broadcast signals performs interleaving, the frame parsing module 9010 can carry out deinterleaving corresponding to a reverse procedure of interleaving. In this case, the positions of a signal and data that need to be extracted can be obtained by decoding data output from the signaling decoding module 9040 to restore scheduling information generated by the apparatus for transmitting broadcast signals.

The demapping & decoding module 9020 can convert the input signals into bit domain data and then deinterleave the same as necessary. The demapping & decoding module 9020 can perform demapping for mapping applied for transmission efficiency and correct an error generated on a transmission channel through decoding. In this case, the demapping & decoding module 9020 can obtain transmission parameters necessary for demapping and decoding by decoding the data output from the signaling decoding module 9040.

The output processor 9030 can perform reverse procedures of various compression/signal processing procedures which are applied by the apparatus for transmitting broadcast signals to improve transmission efficiency. In this case, the output processor 9030 can acquire necessary control information from data output from the signaling decoding module 9040. The output of the output processor 8300 corresponds to a signal input to the apparatus for transmitting broadcast signals and may be MPEG-TSs, IP streams (v4 or v6) and generic streams.

The signaling decoding module 9040 can obtain PLS information from the signal demodulated by the synchronization & demodulation module 9000. As described above, the frame parsing module 9010, demapping & decoding module 9020 and output processor 9030 can execute functions thereof using the data output from the signaling decoding module 9040.

Figure 9:
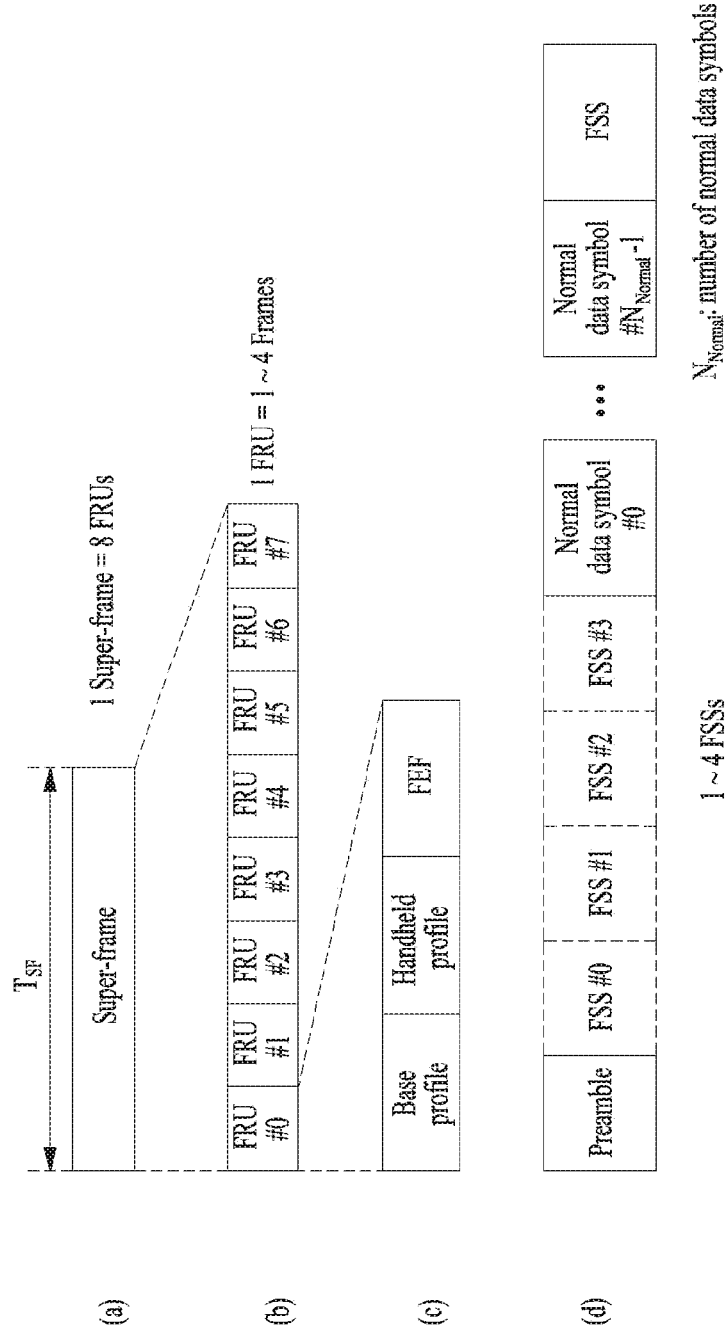
FIG. 9 illustrates a frame structure according to an embodiment of the present invention.

FIG. 9 illustrates a frame structure according to an embodiment of the present invention.

FIG. 9 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figures 10, 11:
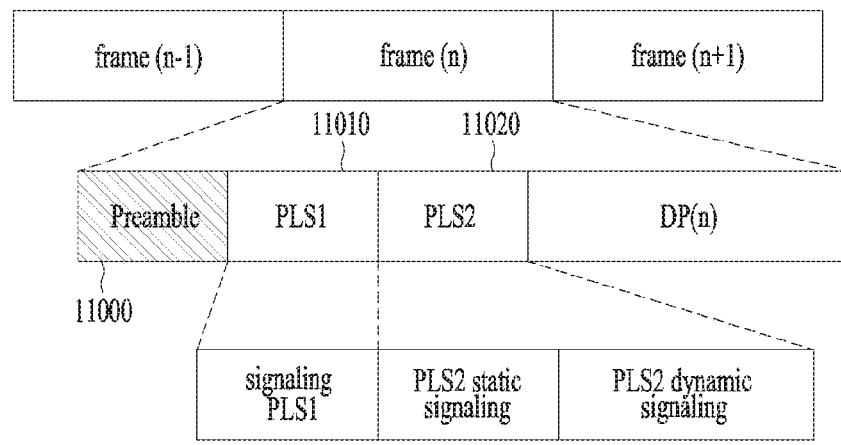
FIG. 10 illustrates a signaling hierarchy structure of the frame according to an embodiment of the present invention.
FIG. 11 illustrates preamble signaling data according to an embodiment of the present invention.

FIG. 10 illustrates a signaling hierarchy structure of the frame according to an embodiment of the present invention.

FIG. 10 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic transmission parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 11 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

| | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |

TABLE 8-continued

|  | Current PHY_PROFILE = '000' (base) | Current PHY_PROFILE = '001' (handheld) | Current PHY_PROFILE = '010' (advanced) | Current PHY_PROFILE = '111' (FEF) |
|---|---|---|---|---|
| FRU_CONFIGURE = XX1 | FEF present | FEF present | FEF present | Advanced profile present |

RESERVED: This 7-bit field is reserved for future use.

FIG. 12 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the (i+1)th (i is the loop index) frame of the associated FRU. This field uses the same signaling format as shown in the table 8.

FRU_FRAME_LENGTH: This 2-bit field indicates the length of the (i+1)th frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the (i+1)th frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

TABLE 11

| Value | PLS2_MODE |
|---|---|
| 000 | BPSK |
| 001 | QPSK |
| 010 | QAM-16 |
| 011 | NUQ-64 |
| 100~111 | Reserved |

PLS2_SIZE_CELL: This 15-bit field indicates Ctotal_partial_block, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates Ctotal_partial_block, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates Ctotal_full_block, The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
|---|---|
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2_NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 13 illustrates PLS2 data according to an embodiment of the present invention.

FIG. 13 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
|---|---|
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
| --- | --- |
| 00 | 16K LDPC |
| 01 | 64K LDPC |
| 10~11 | Reserved |

DP_COD: This 4-bit field indicates the code rate used by the associated DP. The code rate is signaled according to the below table 15.

TABLE 15

| Value | Code rate |
| --- | --- |
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
| --- | --- |
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
| --- | --- |
| 000 | FR-SM |
| 001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates PI, the number of the frames to which each TI group is mapped, and there is one TI-block per TI group (NTI=1). The allowed PI values with 2-bit field are defined in the below table 18.

If the DP_TI_TYPE is set to the value '0', this field indicates the number of TI-blocks NTI per TI group, and there is one TI group per frame (PI=1). The allowed PI values with 2-bit field are defined in the below table 18.

TABLE 18

| 2-bit field | $P_I$ | $N_{TI}$ |
| --- | --- | --- |
| 00 | 1 | 1 |
| 01 | 2 | 2 |
| 10 | 4 | 3 |
| 11 | 8 | 4 |

DP_FRAME_INTERVAL: This 2-bit field indicates the frame interval (IJUMP) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver 5050. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31.

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
| --- | --- |
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
| --- | --- |
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC MODE TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

Figures 14, 15:
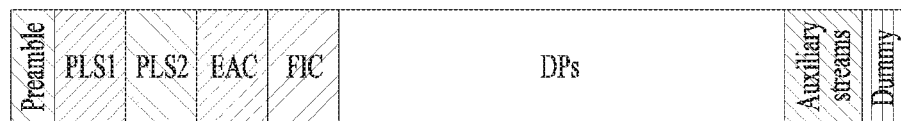
FIG. 14 illustrates PLS2 data according to another embodiment of the present invention.
FIG. 15 illustrates a logical structure of a frame according to an embodiment of the present invention.

FIG. 14 illustrates PLS2 data according to another embodiment of the present invention.

FIG. 14 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

| PHY profile | DP_START field size | |
|---|---|---|
| | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

FIG. 15 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 16:
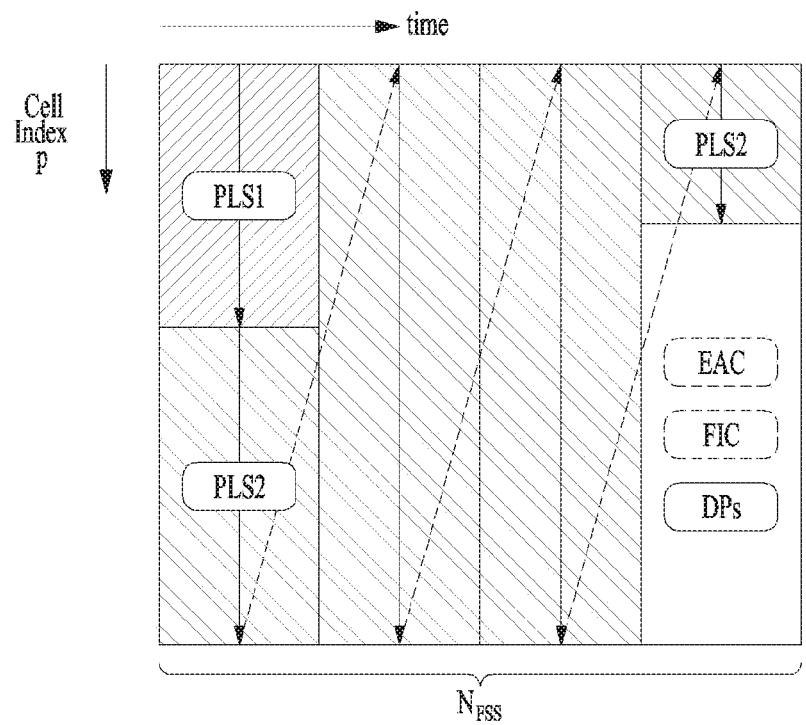
FIG. 16 illustrates PLS mapping according to an embodiment of the present invention.

FIG. 16 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) NFSS is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the NFSS FSS(s) in a top-down manner as shown in an example in FIG. 16. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 17:
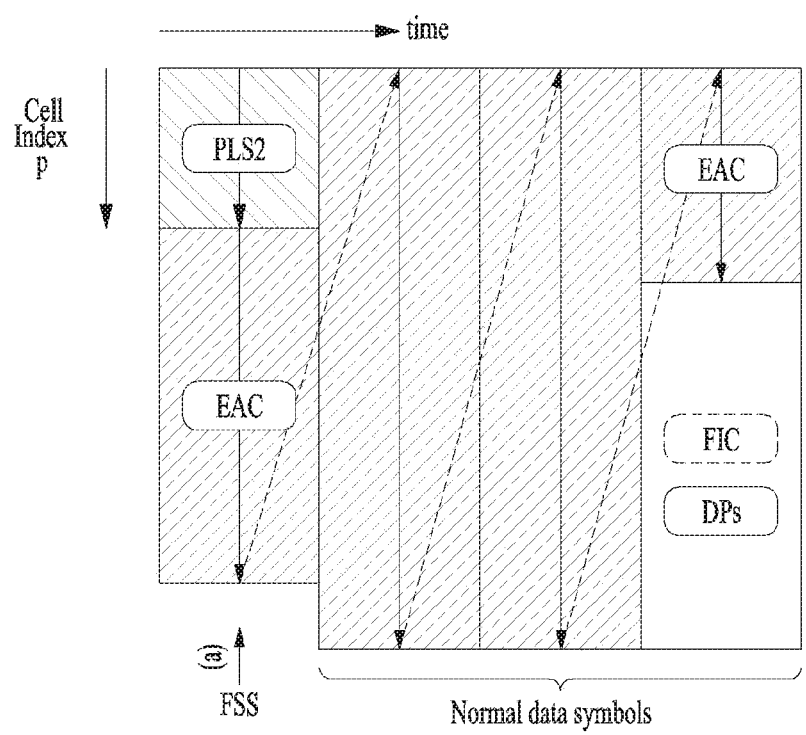
FIG. 17 illustrates EAC mapping according to an embodiment of the present invention.

FIG. 17 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 17. Depending on the EAS message size, EAC cells may occupy a few symbols, as shown in FIG. 17.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 18:
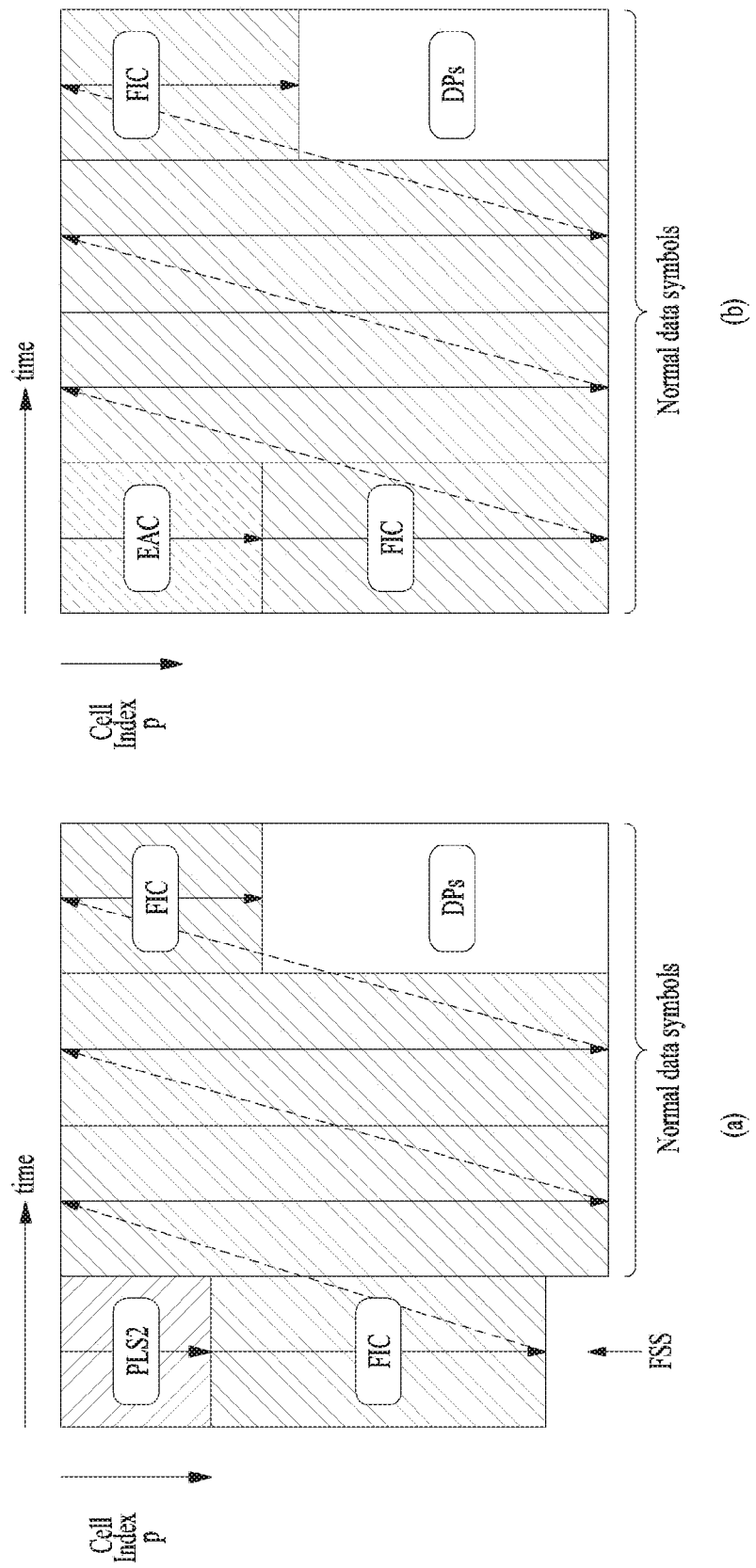
FIG. 18 illustrates FIC mapping according to an embodiment of the present invention.

FIG. 18 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 19:
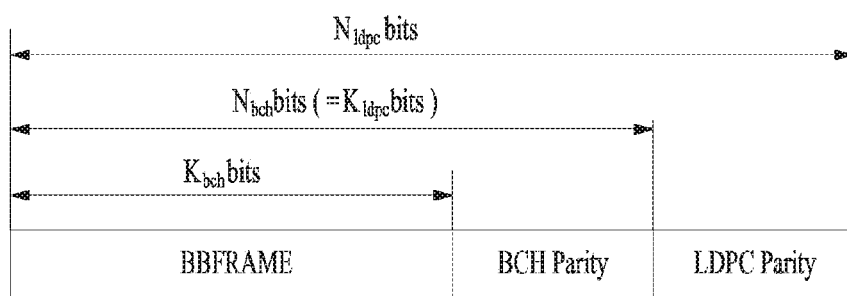
FIG. 19 illustrates an FEC structure according to an embodiment of the present invention.

FIG. 19 illustrates an FEC structure according to an embodiment of the present invention.

FIG. 19 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

Figure 22:
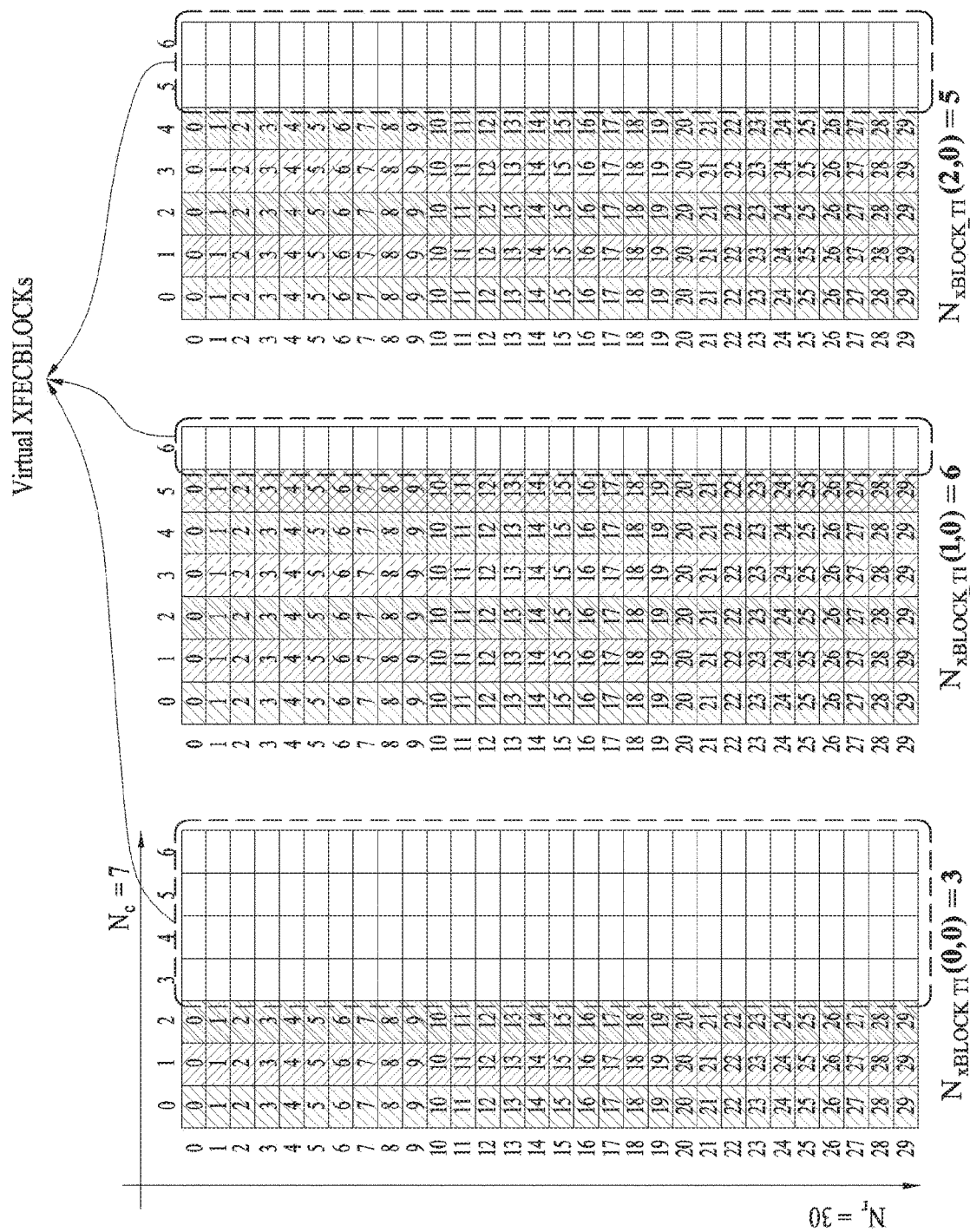
FIG. 22 illustrates an operation of a twisted row-column block interleaver according to another embodiment of the present invention.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch} - K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed Bldpc (FECBLOCK), Pldpc (parity bits) is encoded systematically from each Ildpc (BCH-encoded BBF), and appended to Ildpc. The completed Bldpc (FECBLOCK) are expressed as following equation.

$$B_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}] \quad [\text{Equation 2}]$$

The parameters for long FECBLOCK and short FECBLOCK are given in the above table 28 and 29, respectively.

The detailed procedure to calculate Nldpc−Kldpc parity bits for long FECBLOCK, is as follows:

1) Initialize the parity bits, $$p_0 = p_1 = p_2 = \ldots = p_{N_{ldpc}-K_{ldpc}-1} = 0 \quad [\text{Equation 3}]$$

2) Accumulate the first information bit—i0, at parity bit addresses specified in the first row of an addresses of parity check matrix. The details of addresses of parity check matrix will be described later. For example, for rate 13/15:

$$p_{983} = p_{932} \oplus i_0 \, p_{2815} = p_{2815} \oplus i_0$$

$$p_{4837} = p_{4837} \oplus i_0 \, p_{4989} = p_{4989} \oplus i_0$$

$$p_{6138} = p_{6138} \oplus i_0 \, p_{6458} = p_{6458} \oplus i_0$$

$$p_{6921} = p_{6921} \oplus i_0 \, p_{6974} = p_{6974} \oplus i_0$$

$$p_{7572} = p_{7572} \oplus i_0 \, p_{8260} = p_{8260} \oplus i_0$$

$$p_{8496} = p_{8496} \oplus i_0 \quad [\text{Equation 4}]$$

3) For the next 359 information bits, is, s=1, 2, . . . , 359 accumulate is at parity bit addresses using following equation.

$$\{x + (s \bmod 360) \times Q_{ldpc}\} \bmod (N_{ldpc} - K_{ldpc}) \quad [\text{Equation 5}]$$

where x denotes the address of the parity bit accumulator corresponding to the first bit i0, and Qldpc is a code rate dependent constant specified in the addresses of parity check matrix. Continuing with the example, Qldpc=24 for rate 13/15, so for information bit i1, the following operations are performed:

$$p_{1007} = p_{1007} \oplus i_1 \, p_{2839} = p_{2839} \oplus i_1$$

$$p_{1861} = p_{1861} \oplus i_1 \, p_{5013} = p_{5013} \oplus i_1$$

$$p_{6162} = p_{6162} \oplus i_1 \, p_{6482} = p_{6482} \oplus i_1$$

$p_{6945} = p_{6945} \oplus i_1 \ p_{6998} = p_{6998} \oplus i_1$ $p_{7596} = p_{7596} \oplus i_1 \ p_{8281} = p_{8281} \oplus i_1$ $p_{8520} = p_{8520} \oplus i_1$ [Equation 6]

4) For the 361st information bit i360, the addresses of the parity bit accumulators are given in the second row of the addresses of parity check matrix. In a similar manner the addresses of the parity bit accumulators for the following 359 information bits is, s=361, 362, . . . , 719 are obtained using the equation 6, where x denotes the address of the parity bit accumulator corresponding to the information bit i360, i.e., the entries in the second row of the addresses of parity check matrix.

5) In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1.

$p_i = p_i \oplus p_{i-1}, i=1,2, \ldots, N_{ldpc} - K_{ldpc} - 1$ [Equation 7]

where final content of pi, i=0,1, . . . Nldpc−Kldpc−1 is equal to the parity bit pi.

TABLE 30

| Code Rate | $Q_{ldpc}$ |
| --- | --- |
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with the LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
| --- | --- |
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

FIG. 20 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks NTI per TI group. For DP_TI_TYPE='1', this parameter is the number of frames PI spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames IJUMP between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFECBLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by NxBLOCK_Group (n) and is signaled as DP_NUM_BLOCK in the PLS2-DYN data. Note that NxBLOCK_Group(n) may vary from the minimum value of 0 to the maximum value NxBLOCK_Group_MAX (corresponding to DP_NUM_BLOCK_MAX) of which the largest value is 1023.

Each TI group is either mapped directly onto one frame or spread over PI frames. Each TI group is also divided into more than one TI blocks (NTI), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 32.

TABLE 32

| Modes | Descriptions |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1'($N_{TI}$ = 1). |

TABLE 32-continued

| Modes | Descriptions |
|---|---|
| Option-2 | Each TI group contains one TI block and is mapped to more than one frame. (b) shows an example, where one TI group is mapped to two frames, i.e., DP_TI_LENGTH = '2' ($P_I$ = 2) and DP_FRAME_INTERVAL ($I_{JUMP}$ = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = $N_{TI}$, while $P_I$ = 1. |

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}$ (n,s).

FIG. 21 illustrates the basic operation of a twisted row-column block interleaver according to an embodiment of the present invention.

FIG. 21 (a) shows a writing operation in the time interleaver and FIG. 21(b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, . . . , $N_rN_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows equation.

GENERATE($R_{n,s,i}$, $C_{n,s,i}$) =  [Equation 8]

{

$R_{n,s,i}$ = mod(i, $N_r$), $T_{n,s,i}$ = mod($S_{shift} \times R_{n,s,i}$, $N_c$), $C_{n,s,i} = \mathrm{mod}\left(T_{n,s,i} + \left\lfloor \frac{i}{N_r} \right\rfloor, N_c\right)$

} where $S_{shift}$ is a common shift value for the diagonal-wise reading process regardless of $N_{xBLOCK\_TI}$(n,s), and it is determined by $N_{xBLOCK\_TI\_MAX}$ given in the PLS2-STAT as follows equation.

$$\mathrm{for} \begin{cases} N'_{xBLOCK\_TI\_MAX} = & \mathrm{if}\ N_{xBLOCK\_TI\_MAX} \bmod 2 = 0 \\ N_{xBLOCK\_TI\_MAX} + 1, & \\ N'_{xBlock\_TI\_MAX} = & \mathrm{if}\ N_{xBLOCK\_TI\_MAX} \bmod 2 = 1 \\ N_{xBLOCK\_TI\_MAX}, & \end{cases}$$  [Equation 9]

-continued $$S_{shift} = \frac{N'_{xBLOCK\_TI\_MAX} - 1}{2}$$

As a result, the cell positions to be read are calculated by a coordinate as $z_{n,s,i} = N_r C_{n,s,i} + R_{n,s,i}$.

FIG. 22 illustrates an operation of a twisted row-column block interleaver according to another embodiment of the present invention.

More specifically, FIG. 22 illustrates the interleaving array in the TI memory for each TI group, including virtual XFECBLOCKs when $N_{xBLOCK\_TI}$(0,0)=3, $N_{xBLOCK\_TI}$(1,0)=6, $N_{xBLOCK\_TI}$(2,0)=5.

The variable number $N_{xBLOCK\_TI}$(n,s)=$N_r$ will be less than or equal to $N'_{xBLOCK\_TI\_MAX}$. Thus, in order to achieve a single-memory deinterleaving at the receiver side, regardless of $N_{xBLOCK\_TI}$(n,s), the interleaving array for use in a twisted row-column block interleaver is set to the size of $N_r \times N_c = N_{cells} \times N_{xBLOCK\_TI\_MAX}$ by inserting the virtual XFECBLOCKs into the TI memory and the reading process is accomplished as follow equation.

[Equation 10]

p = 0;
for i = 0; i < $N_{cells} N'_{xBLOCK\_TI\_MAX}$; i = i + 1
{GENERATE($R_{n,s,i}, C_{n,s,i}$);
$V_i = N_r C_{n,s,j} + R_{n,s,j}$
  if $V_i < N_{cells} N_{xBLOCK\_TI}$(n,s)
  {
    $Z_{n,s,p} = V_i$; p = p + 1;
  }
}

The number of TI groups is set to 3. The option of time interleaver is signaled in the PLS2-STAT data by DP_TI_TYPE='0', DP_FRAME_INTERVAL='1', and DP_TI_LENGTH='1', i.e.,NTI=1, IJUMP=1, and PI=1. The number of XFECBLOCKs, each of which has Ncells=30 cells, per TI group is signaled in the PLS2-DYN data by NxBLOCK_TI(0,0)=3, NxBLOCK_TI(1,0)=6, and NxBLOCK_TI(2,0)=5, respectively. The maximum number of XFECBLOCK is signaled in the PLS2-STAT data by NxBLOCK_Group_MAX, which leads to $\lfloor N_{xBLOCK\_Group\_MAX}/N_{TI} \rfloor = N_{xBLOCK\_TI\_MAX} = 6$.

FIG. 23 illustrates a diagonal-wise reading pattern of a twisted row-column block interleaver according to an embodiment of the present invention.

More specifically FIG. 23 shows a diagonal-wise reading pattern from each interleaving array with parameters of $N'_{xBLOCK\_TI\_MAX}=7$ and Sshift=(7−1)/2=3. Note that in the reading process shown as pseudocode above, if $V_i \geq N_{cells}$ $N_{xBLOCK\_TI}(n,s)$, the value of Vi is skipped and the next calculated value of Vi is used.

Figure 24:
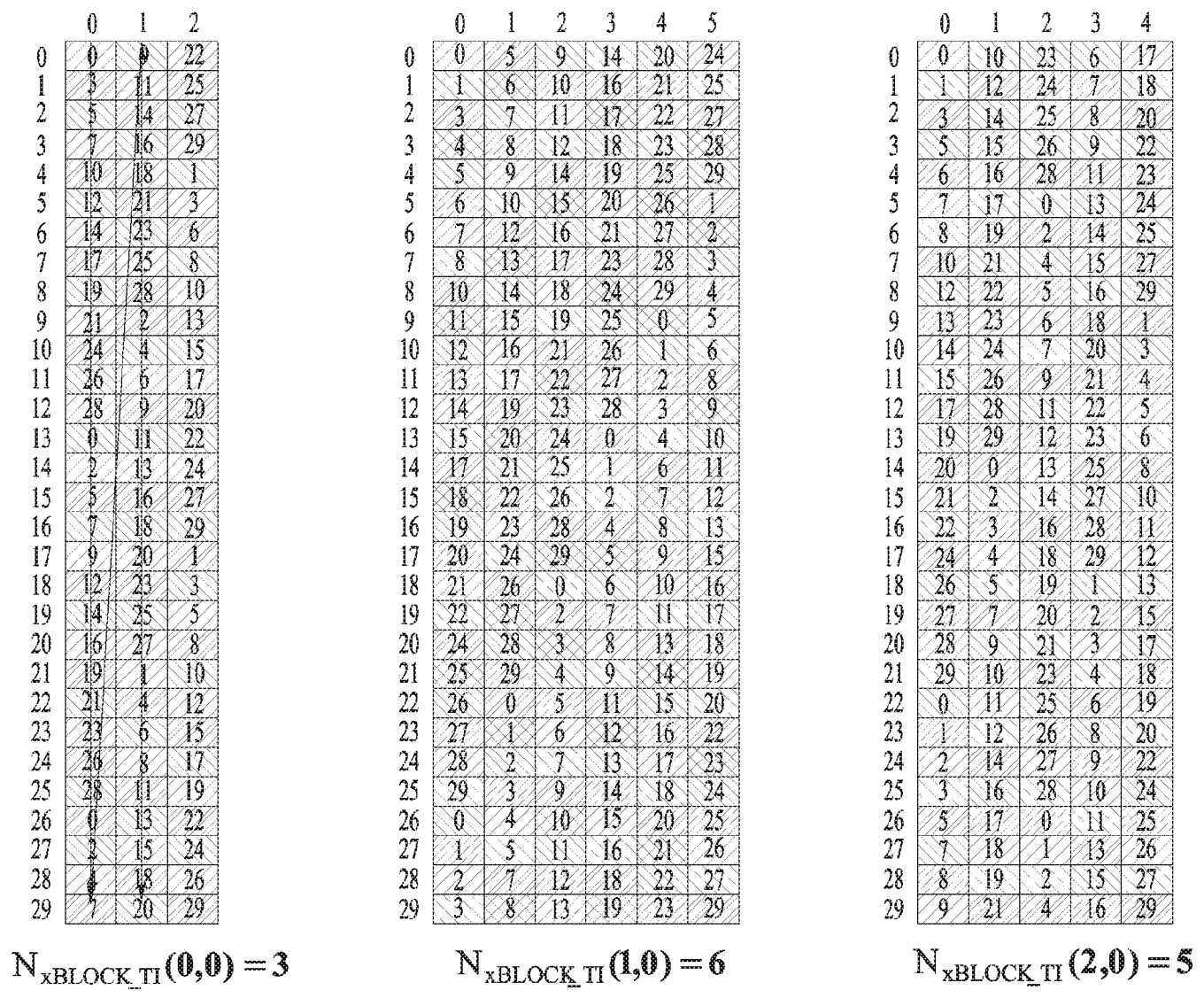

FIG. 24 illustrates interleaved XFECBLOCKs from each interleaving array according to an embodiment of the present invention.

FIG. 24 illustrates the interleaved XFECBLOCKs from each interleaving array with parameters of $N'_{xBLOCK\_TI\_MAX}=7$ and Sshift=3.

FIG. 25 illustrates signaling for single-memory deinterleaving irrespective of the number of symbols in a frame according to an embodiment of the present invention.

As described above, the frequency interleaver according to the present invention performs interleaving using different interleaving sequences in a plurality of OFDM symbols, but the frequency deinterleaver may perform single-memory deinterleaving on the received OFDM symbols.

The present invention proposes a method for performing single-memory deinterleaving by the frequency deinterleaver irrespective of whether the number of OFDM symbols in one frame is an even number or an odd number. To this end, the above-described architecture of the frequency interleaver may operate differently depending on whether the number of OFDM symbols is an even number or an odd number. Furthermore, signaling information related thereto may be additionally defined in the above-described preamble and/or the physical layer signal (PLS). As such, single-memory deinterleaving is not limited to a case in which the number of OFDM symbols is an even number, and may always be enabled.

Here, the PLS may be transmitted in a frame starting symbol (FSS) of every frame. Alternatively, according to another embodiment, the PLS may be transmitted in the first OFDM symbol. Otherwise, based on whether the PLS is present, signaling information corresponding to the PLS may be completely transmitted in the preamble. Or, signaling information corresponding to the preamble and/or the PLS may be transmitted in bootstrap information. The bootstrap information may be an information part located in front of the preamble.

Information about, for example, a processing operation used by the frequency interleaver of the transmitter may include an FI_mode field and an N_sym field.

The FI_mode field may be a 1-bit field which can be located in the preamble. The FI_mode field may indicate an interleaving scheme used in the FSS or the first OFDM symbol of every frame.

The interleaving scheme indicated as the FI_mode field may include FI scheme #1 and FI scheme #2.

FI scheme #1 can indicate that the frequency interleaver of the transmitter performs random writing operation and then linear reading operation on the FSS. This case may correspond to a case in which the FI_mode field value is 0. The random writing or linear reading operation may be performed in or from memory using a value generated by an arbitrary random sequence generator using, for example, a pseudo-random binary sequence (PRBS). Here, linear reading may refer to sequentially reading operation.

FI scheme #2 can indicate that the transmitter performs linear writing operation and then random reading operation on the FSS. This case may correspond to a case in which the FI_mode field value is 1. Likewise, the linear writing or random reading operation may be performed in or from memory using a value generated by an arbitrary random sequence generator using, for example, PRBS. Here, linear writing may refer to a sequentially writing operation.

In addition, the FI_mode field may indicate an interleaving scheme used in a frame edge symbol (FES) or the last OFDM symbol of every frame. The interleaving scheme applied to the FES may be indicated differently from the value of the N_sym field transmitted by the PLS. That is, the interleaving scheme indicated as the FI_mode field may differ depending on whether the number of OFDM symbols is an odd number or an even number. Mapping information between the two fields may be predefined as a table by the transmitter and the receiver.

The FI_mode field may be defined and transmitted in a part of the frame other than the preamble according to another embodiment.

The N_sym field may be a field which can be located in the PLS part. The number of bits of the N_sym field is variable according to embodiments. The N_sym field may indicate number of OFDM symbols included in one frame. As such, the receiver can acquire information about whether the number of OFDM symbols is an even number or an odd number.

Operation of the frequency deinterleaver corresponding to the frequency interleaver irrespective of the number of OFDM symbols in one frame is as described below. This frequency deinterleaver may perform single-memory deinterleaving by utilizing the proposed signaling fields irrespective of whether the number of OFDM symbols is an even number or an odd number.

Initially, the frequency deinterleaver may perform frequency deinterleaving on the FSS using information of the FI_mode field of the preamble because the frequency interleaving scheme used in the FSS is indicated as the FI_mode.

The frequency deinterleaver may perform frequency deinterleaving on the FES using signaling information of the FI_mode field and signaling information of the N_sym field of the PLS. In this case, the mapping information between the two fields may be acquired using the predefined table. A description of the predefined table will be given below.

Overall deinterleaving operation on the other symbols may be performed inversely from the interleaving operation of the transmitter. That is, on a pair of contiguously input OFDM symbols, the frequency deinterleaver may perform deinterleaving using one interleaving sequence. Here, the interleaving sequence may be an interleaving sequence used by the frequency interleaver for reading & writing. The frequency deinterleaver may perform reading & writing operation inversely using the interleaving sequence.

However, the frequency deinterleaver according to the present invention may not use a ping pong architecture using double memories. The frequency deinterleaver may perform deinterleaving on contiguously input OFDM symbols using a single memory. As such, the efficiency of using memory by the frequency deinterleaver may be increased.

FIG. 26 illustrates FI schemes of FSS in signaling for single-memory deinterleaving irrespective of the number of symbols in a frame according to an embodiment of the present invention.

An interleaving scheme applied to frequency interleaving operation may be determined using the above-described FI_mode field and the N_sym field.

In the case of FSS, when the number of OFDM symbols indicated as the N_sym field is an even number, FI scheme #1 may be performed on the FSS irrespective of the FI_mode field value.

When the number of OFDM symbols indicated as the N_sym field is an odd number, FI scheme #1 may be applied to the FSS if the FI mode field has a value of 0, and FI scheme #2 may be applied to the FSS if the FI_mode field has a value of 1. That is, when the number of OFDM symbols is an odd number, FI schemes #1 and #2 may be alternately applied to the FSS symbols for frequency interleaving.

FIG. 27 illustrates operation of a reset mode in signaling for single-memory deinterleaving irrespective of the number of symbols in a frame according to an embodiment of the present invention.

For frequency interleaving on FES, the above-described symbol offset generator may adopt a reset mode as a new concept. The reset mode may refer to a mode in which a symbol offset value generated by the symbol offset generator is '0'.

For frequency interleaving on FES, whether to use the reset mode may be determined using the above-described FI_mode field and the N_sym field.

When the number of OFDM symbols indicated as the N_sym field is an even number, the reset mode of the symbol offset generator may not operate (off) irrespective of the value of the FI_mode field.

When the number of OFDM symbols indicated as the N_sym field is an odd number, if the value of the FI_mode field is 0, the symbol offset generator may operate in the reset mode (on). Otherwise, if the value of the FI_mode field is 1, the reset mode of the symbol offset generator may not operate (off). That is, when the number of OFDM symbols is an odd number, the reset mode may be alternately turned on and off for frequency interleaving.

FIG. 28 illustrates equations indicating input and output of the frequency interleaver in signaling for single-memory deinterleaving irrespective of the number of symbols in a frame according to an embodiment of the present invention.

As described above, OFDM symbol pairs of memory bank-A and memory bank-B may be processed through the above-described interleaving operation. As described above, for interleaving, a variety of different interleaving seeds generated by cyclically shifting one main interleaving seed may be used. Here, the interleaving seed may also be called an interleaving sequence. Alternatively, the interleaving seed may also be called an interleaving address value, an address value, or an interleaving address. Here, the term "interleaving address value(s)" can be used for referring plural address values, or for referring a interleaving seed which is a singular. That is, depending on embodiments, interleaving address value(s) can mean H(p) itself, or each addresses belong to H(p).

Input of frequency interleaving to be interleaved within one OFDM symbol may be indicated as Om,1 (t50010). Here, data cells may be indicated as xm,1,0, . . . xm,1,Ndata−1. Meanwhile, p may indicate a cell index, l may indicate an OFDM symbol index, and m may indicate a frame index. That is, xm,l,p may indicate a p-th data cell of an l-th OFDM symbol of an m-th frame. Ndata may indicate the number of data cells. Nsym may indicate the number of symbols (frame signaling symbols, normal data symbols, or frame edge symbols).

Data cells which are interleaved based on the above-described operation may be indicated as Pm,1 (t50020). The interleaved data cells may be indicated as vm,1,0, . . . vm,1,Ndata−1. Meanwhile, p, l, and m may have the above-described index values.

FIG. 29 illustrates equations of a logical operation mechanism of frequency interleaving based on FI scheme #1 and FI scheme #2 in signaling for single-memory deinterleaving irrespective of the number of symbols in a frame according to an embodiment of the present invention.

A description is now given of frequency interleaving based on FI scheme #1. As described above, frequency interleaving may be performed using an interleaving sequence (interleaving address) of each memory bank.

Interleaving operation on an even symbol (j mod 2=0) may be mathematically expressed as given by equation t51010. On input data x, frequency interleaving may be performed using the interleaving sequence (interleaving address) to acquire output v. Here, p-th input data x may be permuted to be identical to H(p)-th output data v.

That is, on an even symbol (the first symbol), random writing operation may be performed using the interleaving sequence, and then linear reading operation for sequentially reading data may be performed. Here, the interleaving sequence (interleaving address) may be a value generated by an arbitrary random sequence generator using, for example, PRBS.

Interleaving operation on an odd symbol (j mod 2=1) may be mathematically expressed as given by equation t51020. On input data x, frequency interleaving may be performed using the interleaving sequence (interleaving address) to acquire output v. Here, H(p)-th input data x may be permuted to be identical to p-th output data v. That is, compared to the interleaving process performed on the even symbol, the interleaving sequence (interleaving address) may be applied inversely.

That is, on an odd symbol (the second symbol), a linear writing operation for sequentially writing data in memory may be performed, and then random reading operation for randomly reading the data using the interleaving sequence may be performed. Likewise, the interleaving sequence (interleaving address) may be a value generated by an arbitrary random sequence generator using, for example, PRBS.

A description is now given of frequency interleaving based on FI scheme #2.

In the case of frequency interleaving based on FI scheme #2, operation on an even/odd symbol may be performed inversely from the operation based on FI scheme #1.

That is, on the even symbol, linear writing operation may be performed and then random reading operation may be performed as given by equation t51020. In addition, on the odd symbol, random writing operation may be performed and then linear reading operation may be performed as given by equation t51010. A detailed description thereof is the same as that given above in relation to FI scheme #1.

The symbol index l may be indicated as 0, 1, . . . , $N_{sym}-1$, and the cell index p may be indicated as 0, 1, . . . , $N_{data}-1$. According to another embodiment, the frequency interleaving scheme on an even symbol and the frequency interleaving scheme on an odd symbol may be switched. In addition, according to another embodiment, the frequency interleaving scheme based on FI scheme #1 and the frequency interleaving scheme based on FI scheme #2 may be switched.

Figure 30:
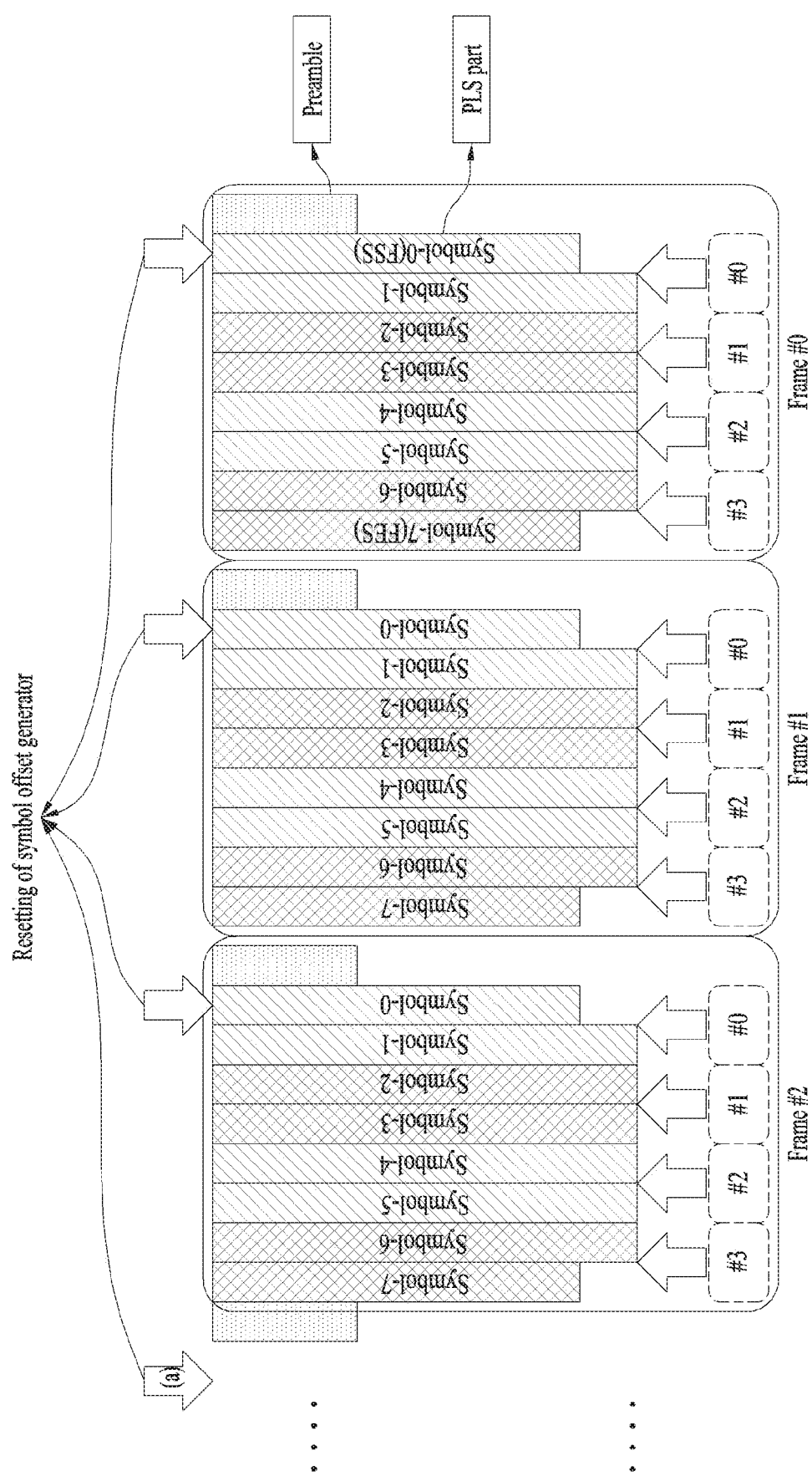
FIG. 30 illustrates an example in which the number of symbols is an even number in signaling for single-memory deinterleaving irrespective of the number of symbols in a frame according to an embodiment of the present invention.

FIG. 30 illustrates an example in which the number of symbols is an even number in signaling for single-memory deinterleaving irrespective of the number of symbols in a frame according to an embodiment of the present invention.

In the current embodiment, the N_sym field may indicate that the number of OFDM symbols in one frame is an even number. The current embodiment assumes that one frame includes one preamble and eight OFDM symbols. According to another embodiment, bootstrap information may be further included in front of the preamble. The bootstrap information is not illustrated.

In the current embodiment, one frame may include one FSS and one FES. Here, it is assumed that the FSS and the FES have the same length. In addition, since information of the N_sym field is transmitted in the PLS part, the frequency deinterleaver may acquire the corresponding information after decoding the FSS. Furthermore, the current embodiment assumes that the N_sym field is completely decoded before operation on the FES is performed.

In the FSS of each frame, the value of the symbol offset generator may be reset to 0. Accordingly, the first and second symbols may be processed using the same interleaving sequence. In addition, sequence #0 may be used for operation whenever each frame starts. After that, sequences #1 and #2 may be sequentially used for operation of the frequency interleaver/deinterleaver.

Figure 31:
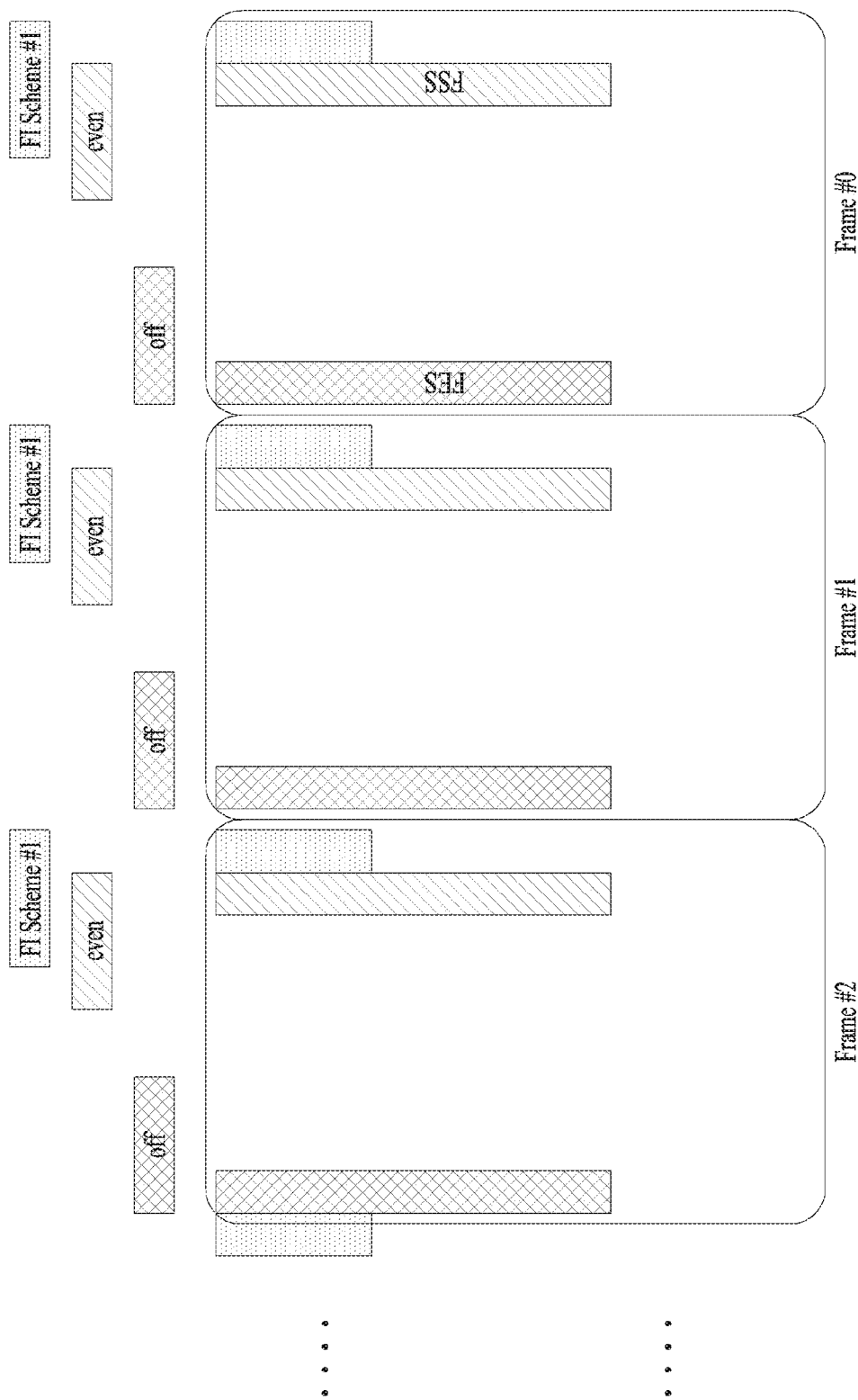
FIG. 31 illustrates an example in which the number of symbols is an even number in signaling for single-memory deinterleaving irrespective of the number of symbols in a frame according to an embodiment of the present invention.

FIG. 31 illustrates an example in which the number of symbols is an even number in signaling for single-memory deinterleaving irrespective of the number of symbols in a frame according to an embodiment of the present invention.

In the first frame, information about an interleaving scheme of the FSS may be acquired from the FI_mode field of the preamble. In the current embodiment, since the number of OFDM symbols is an even number, only FI scheme #1 may be used.

Then, the FSS may be decoded and thus N_sym information may be acquired. The N_sym information indicates that the number of symbols in the current frame is an even number. After that, the acquired FI_mode information and the N_sym information may be used when the frequency deinterleaver decodes the FES. Since the number of symbols is an even number, the symbol offset generator does not operate in the above-described reset mode. That is, the reset mode may be in an off state.

Subsequently, even in another frame, since an even number of OFDM symbols are included, the frequency deinterleaver may operate in the same manner. That is, the FI scheme to be used in the FSS is FI scheme #1, and the reset mode to be used in the FES may be in an off state.

Figure 32:
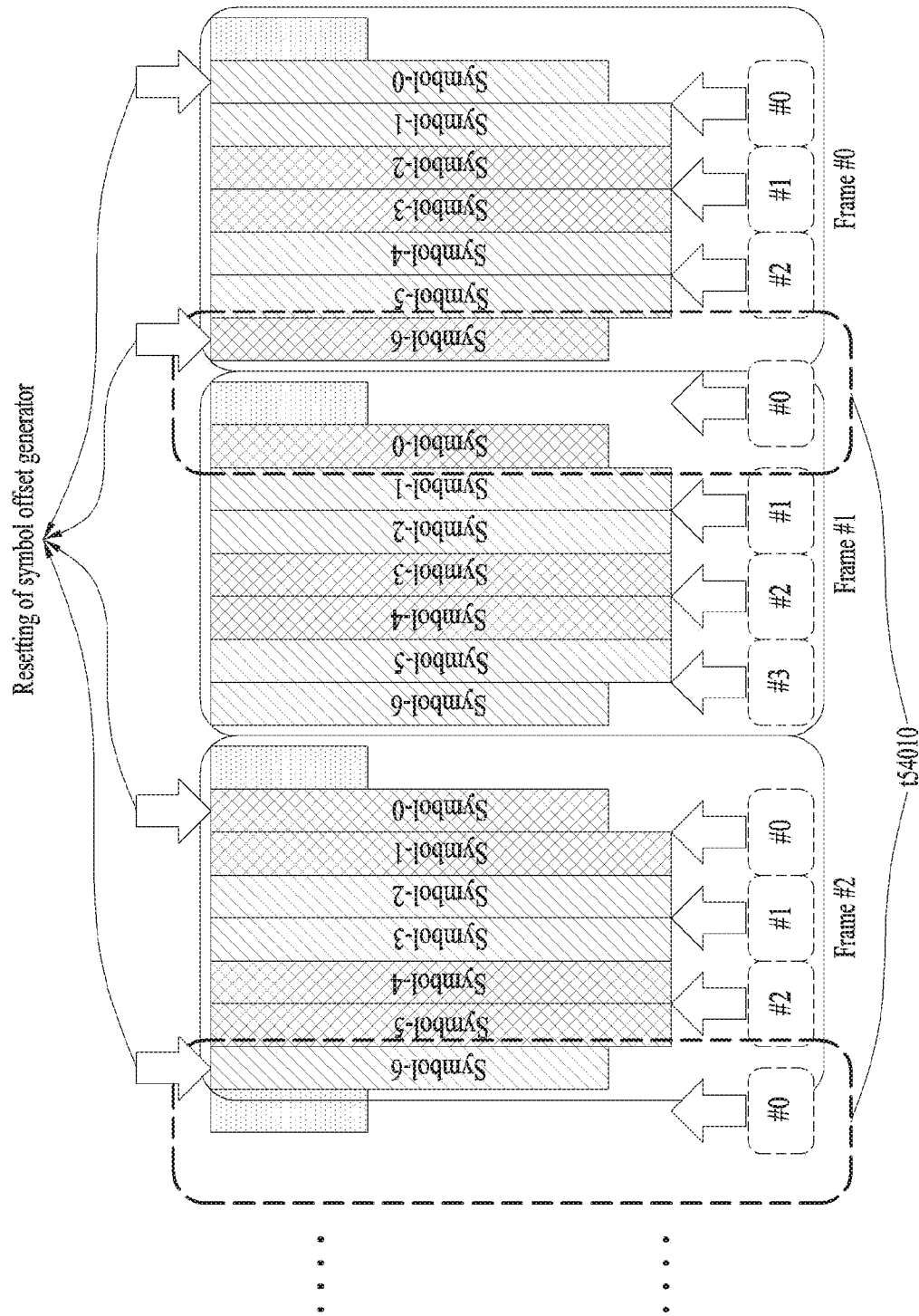
FIG. 32 illustrates an example in which the number of symbols is an odd number in signaling for single-memory deinterleaving irrespective of the number of symbols in a frame according to an embodiment of the present invention.

FIG. 32 illustrates an example in which the number of symbols is an odd number in signaling for single-memory deinterleaving irrespective of the number of symbols in a frame according to an embodiment of the present invention.

In the current embodiment, the N_sym field may indicate that the number of OFDM symbols in one frame is an odd number. The current embodiment assumes that one frame includes one preamble and seven OFDM symbols. According to another embodiment, bootstrap information may be further included in front of the preamble. The bootstrap information is not illustrated.

In the current embodiment, like the case in which the number of symbols is an even number, one frame may include one FSS and one FES. Here, it is assumed that the FSS and the FES have the same length. In addition, since information of the N_sym field is transmitted in the PLS part, the frequency deinterleaver may acquire the corresponding information after decoding the FSS. Furthermore, the current embodiment assumes that the N_sym field is completely decoded before operation on the FES is performed.

In the FSS of each frame, the value of the symbol offset generator may be reset to 0. Furthermore, in the FES of an arbitrary frame, the symbol offset generator may operate in a reset mode based on the values of the FI_mode field and the N_sym field. Accordingly, in the FES of the arbitrary frame, the value of the symbol offset generator may be reset or not reset to 0. These reset operations may be alternately performed on frames.

The symbol offset generator may be reset in the last symbol of the first frame, i.e., the FES. Accordingly, the interleaving sequence may be reset to sequence #0. As such, the frequency interleaver/deinterleaver may process the corresponding FES based on sequence #0 (t54010).

In the FSS of a subsequent frame, the symbol offset generator may be reset again and thus sequence #0 may be used (t54010). The symbol offset generator may not be reset in the FES of the second frame (frame #1), and may be reset again in the FES of the third frame (frame #2).

Figure 33:
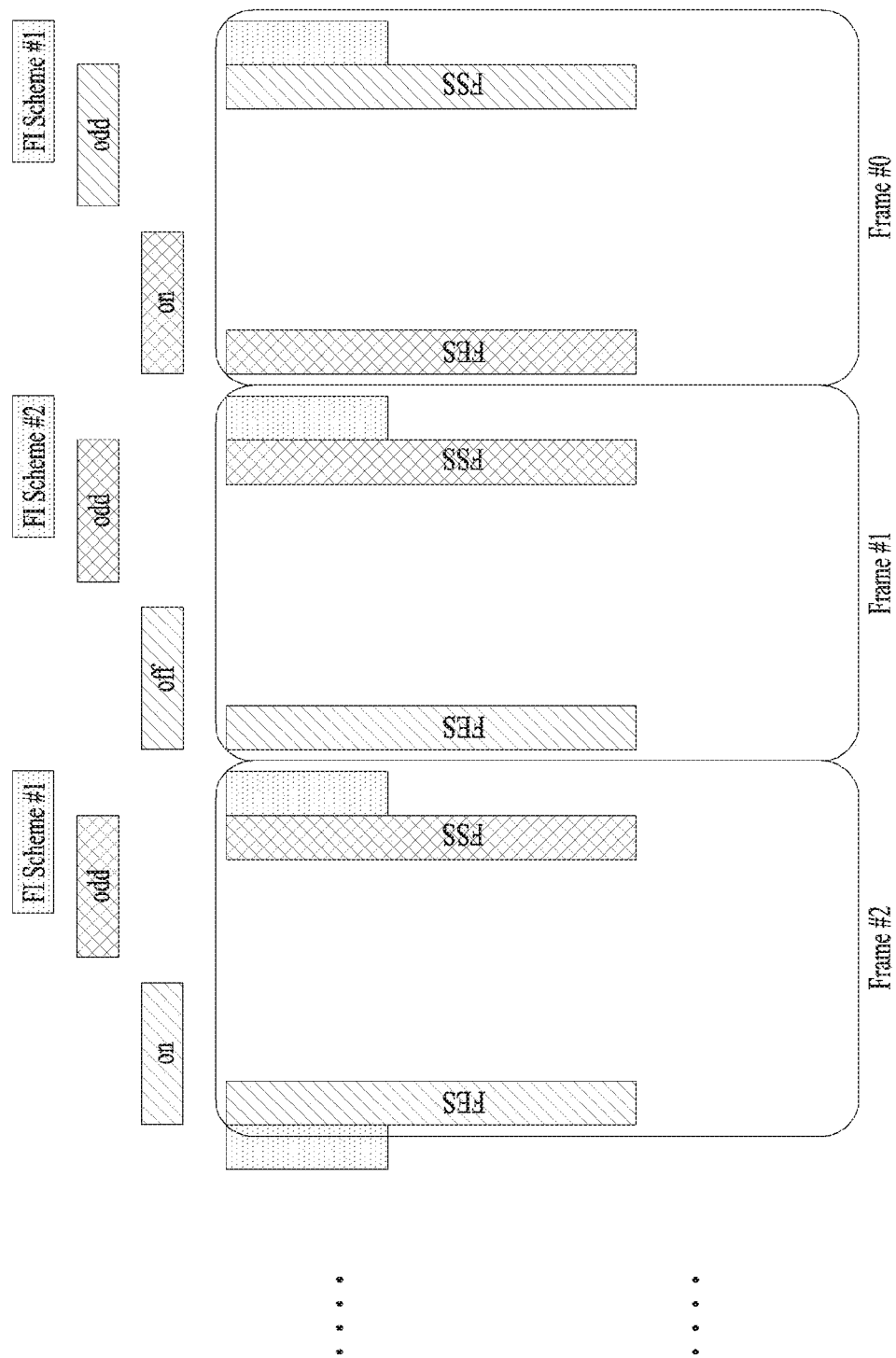
FIG. 33 illustrates an example in which the number of symbols is an odd number in signaling for single-memory deinterleaving irrespective of the number of symbols in a frame according to an embodiment of the present invention.

FIG. 33 illustrates an example in which the number of symbols is an odd number in signaling for single-memory deinterleaving irrespective of the number of symbols in a frame according to an embodiment of the present invention.

In the first frame, information about an interleaving scheme of the FSS may be acquired from the FI_mode field of the preamble. Since the number of OFDM symbols is an odd number, FI scheme #1 and FI scheme #2 may be used. In the current embodiment, FI scheme #1 is used in the first frame.

Then, the FSS may be decoded and thus N_sym information may be acquired. The N_sym information indicates that the number of symbols in the current frame is an odd number. After that, the acquired FI_mode information and the N_sym information may be used when the frequency deinterleaver decodes the FES. Since the number of symbols is an odd number and FI scheme #1 is used, the FI_mode field value is 0. Since the FI_mode is 0, the symbol offset generator may operate in the above-described reset mode. That is, the reset mode may be in an on state.

The symbol offset generator may operate in the reset mode and thus may be reset to 0. Since the FI_mode field value is 1 in the second frame, this indicates that the FSS is processed based on FI scheme #2. The N_sym field indicates that the number of symbols is an odd number. In the second frame, since the FI_mode field value is 1 and the number of symbols is an odd number, the symbol offset generator may not operate in the reset mode.

In this manner, the FI scheme to be used in the FSS may be alternately set to FI schemes #1 and #2. Furthermore, the reset mode to be used in the FES may be alternately set to be on and off. According to another embodiment, the settings may not be changed every frame.

Figure 34:
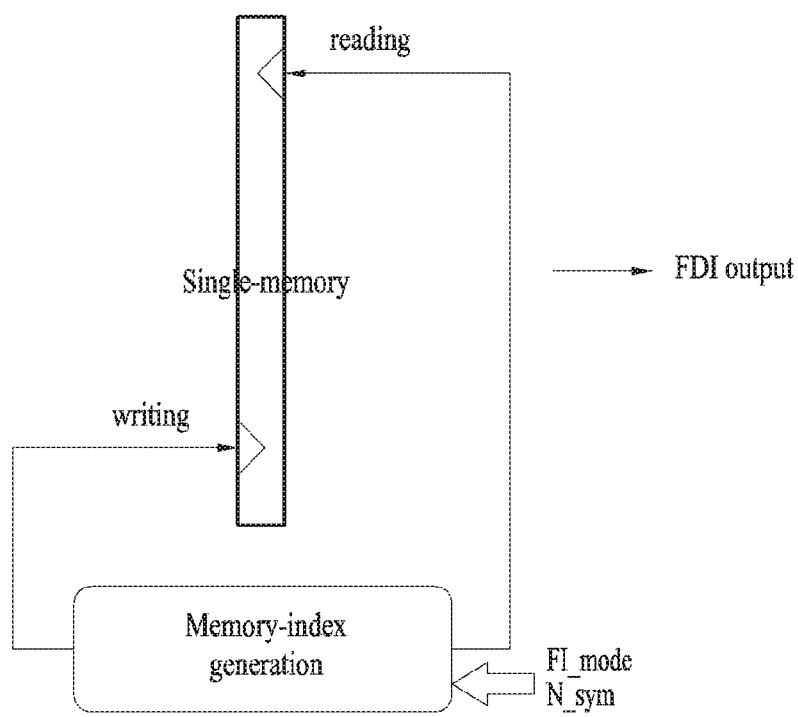
FIG. 34 illustrates operation of the frequency deinterleaver in signaling for single-memory deinterleaving irrespective of the number of symbols in a frame according to an embodiment of the present invention.

FIG. 34 illustrates operation of the frequency deinterleaver in signaling for single-memory deinterleaving irrespective of the number of symbols in a frame according to an embodiment of the present invention.

The frequency deinterleaver may perform frequency deinterleaving using information of the predefined FI_mode field and/or the N_sym field. As described above, the frequency deinterleaver may operate using a single memory. Basically, frequency deinterleaving may be inverse operation of the frequency interleaving operation performed by the transmitter, to restore the order of data.

As described above, frequency deinterleaving on the FSS may be performed based on information about the FI scheme which is acquired from the FI_mode field and the N_sym field of the preamble. Frequency deinterleaving on the FES may be performed based on information indicating whether to the reset mode operates, which is acquired using the FI_mode field and the N_sym field.

That is, on a pair of input OFDM symbols, the frequency deinterleaver may perform inverse operation of the reading/writing operation of the frequency interleaver. One interleaving sequence may be used in this operation.

However, as described above, the frequency interleaver follows the ping pong architecture using double memories, but the frequency deinterleaver may perform deinterleaving using a single memory. This single-memory frequency deinterleaving operation may be performed using information of the FI_mode field and the N_sym field. This information may allow single-memory frequency deinterleaving even on a frame having an odd number of OFDM symbols irrespective of the number of OFDM symbols.

The frequency interleaver according to the present invention may perform frequency interleaving on all data cells of the OFDM symbols. The frequency interleaver may map the data cells to available data carriers of the symbols.

The frequency interleaver according to the present invention may operate in different interleaving modes based on FFT size. For example, when the FFT size is 32K, the frequency interleaver may perform random writing/linear reading operation on an even symbol and perform linear writing/random reading operation on an odd symbol as in FI scheme #1 described above. Alternatively, when the FFT size is 16K or 8K, the frequency interleaver may perform linear reading/random writing operation on all symbols irrespective of an even/odd number.

The FFT size, which determines whether to switch the interleaving modes, may vary according to embodiments. That is, interleaving as in FI scheme #1 may be performed in the case of 32K and 16K, and interleaving irrespective of an even/odd number may be performed in the case of 8K. Alternatively, interleaving as in FI scheme #1 may be performed for all FFT sizes, or interleaving irrespective of an even/odd number may be performed for all FFT sizes. Otherwise, according to another embodiment, interleaving as in FI scheme #2 may be performed for a specific FFT size.

This frequency interleaving operation may be performed using the above-described interleaving sequence (interleaving address). The interleaving sequence may be variously generated using an offset value as described above. Alternatively, address check may be performed to generate various interleaving sequences.

Figure 35:
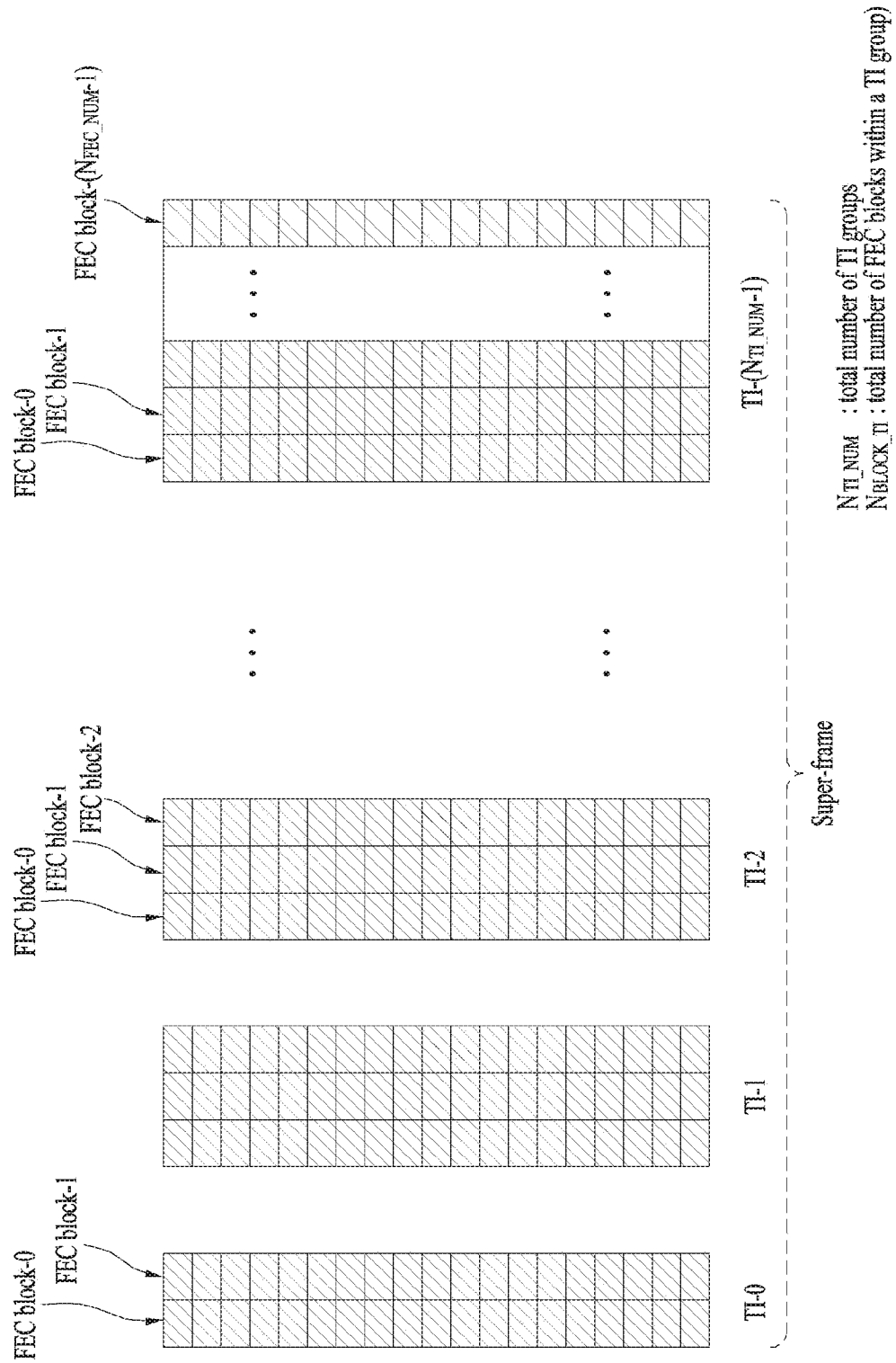
FIG. 35 illustrates the concept of a variable bit-rate system according to an embodiment of the present invention.

FIG. 35 illustrates the concept of a variable bit-rate system according to an embodiment of the present invention.

Specifically, a transport superframe, shown in FIG. 35, is composed of NTI_NUM TI groups and each TI group can include N BLOCK_TI FEC blocks. In this case, TI groups may respectively include different numbers of FEC blocks. The TI group according to an embodiment of the present invention can be defined as a block for performing time interleaving and can be used in the same meaning as the aforementioned TI block or IF. That is, one IF can include at least one TI block and the number of FEC blocks in the TI block is variable.

When TI groups include different numbers of FEC blocks, the present invention performs interleaving on the TI groups using one twisted row-column block interleaving rule in an embodiment. Accordingly, the receiver can perform deinterleaving using a single memory. A description will be given of an input FEC block memory arrangement method and reading operation of the time interleaver in consideration of variable bit-rate (VBR) transmission in which the number of FEC blocks can be changed per TI group.

Figure 36:
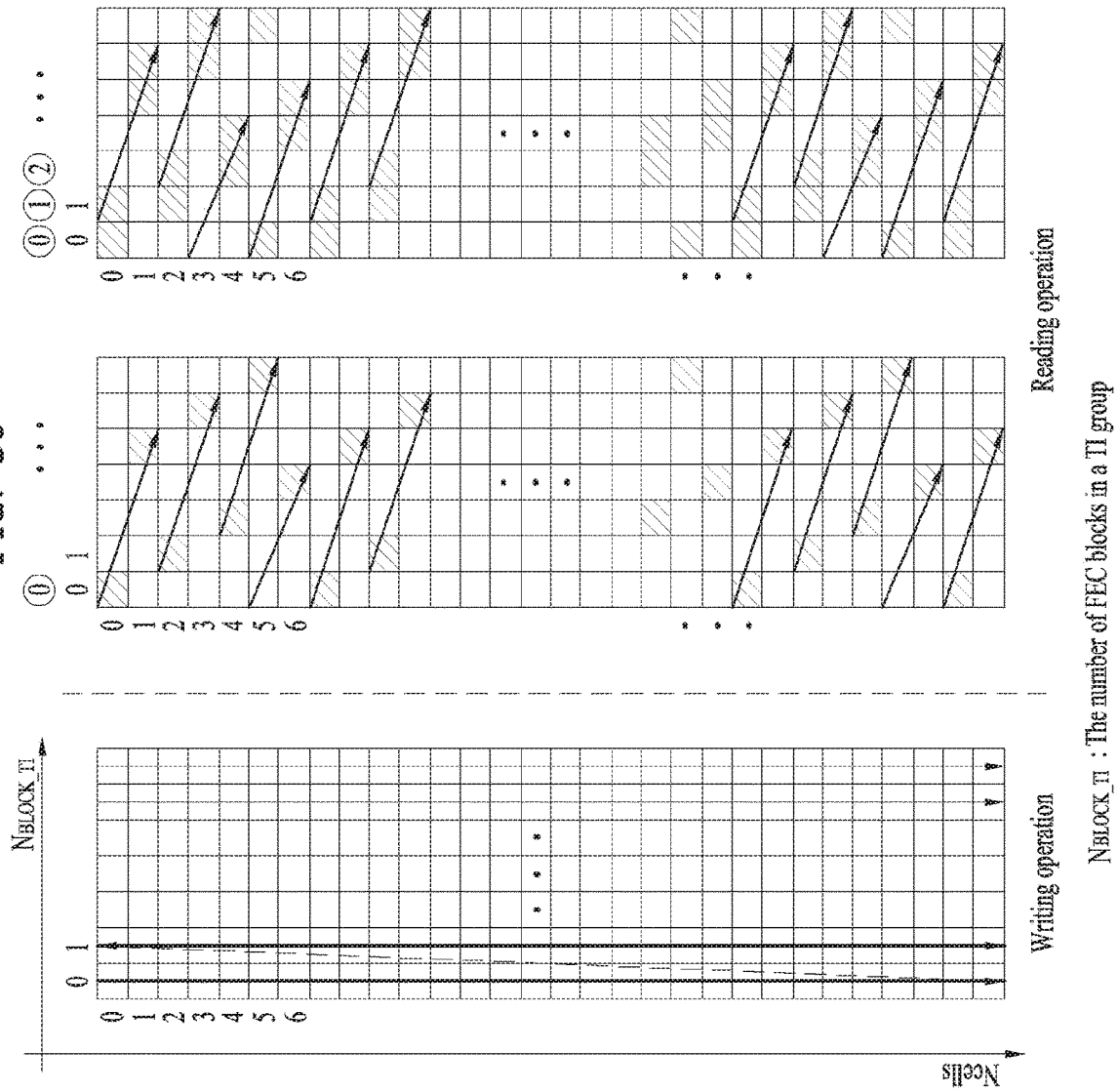
FIG. 36 illustrates writing and reading operations of block interleaving according to an embodiment of the present invention.

FIG. 36 illustrates writing and reading operations of block interleaving according to an embodiment of the present invention. Detailed descriptions about this figure was described before.

FIG. 37 shows equations representing block interleaving according to an embodiment of the present invention.

The equations shown in the figure represent block interleaving applied per TI group. As expressed by the equations, shift values can be respectively calculated in a case in which the number of FEC blocks included in a TI group is an odd number and a case in which the number of FEC blocks included in a TI group is an even number. That is, block interleaving according to an embodiment of the present invention can calculate a shift value after making the number of FEC blocks be an odd-number.

A time interleaver according to an embodiment of the present invention can determine parameters related to interleaving on the basis of a TI group having a maximum number of FEC blocks in the corresponding superframe. Accordingly, the receiver can perform deinterleaving using a single memory. Here, for a TI group having a smaller number of FEC blocks than the maximum number of FEC blocks, virtual FEC blocks corresponding to a difference between the number of FEC blocks and the maximum number of FEC blocks can be added.

Virtual FEC blocks according to an embodiment of the present invention can be inserted before actual FEC blocks. Subsequently, the time interleaver according to an embodiment of the present invention can perform interleaving on the TI groups using one twisted row-column block interleaving rule in consideration of the virtual FEC blocks. In addition, the time interleaver according to an embodiment of the present invention can perform the aforementioned skip operation when a memory-index corresponding to virtual FEC blocks is generated during reading operation. In the following writing operation, the number of FEC blocks of input TI groups is matched to the number of FEC blocks of output TI groups. Consequently, according to time interleaving according to an embodiment of the present invention, loss of data rate of data actually transmitted may be prevented through skip operation even if virtual FEC blocks are inserted in order to perform efficient single-memory deinterleaving in the receiver.

Figure 38:
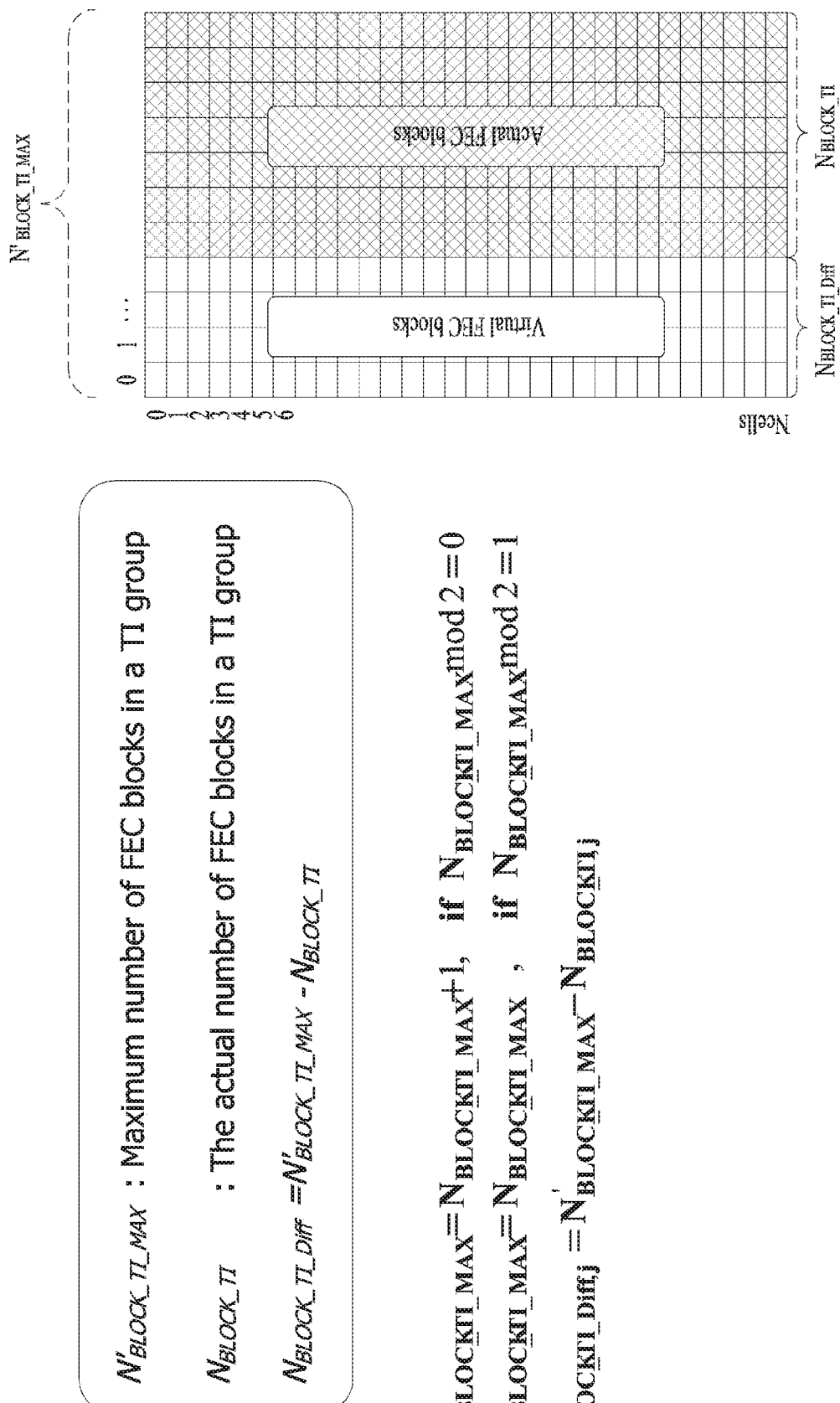
FIG. 38 illustrates virtual FEC blocks according to an embodiment of the present invention.

FIG. 38 illustrates virtual FEC blocks according to an embodiment of the present invention.

The left side of the figure shows parameters indicating a maximum number of FEC blocks in a TI group, the actual number of FEC blocks included in a TI group and a difference between the maximum number of FEC blocks and the actual number of FEC blocks, and equations for deriving the number of virtual FEC blocks.

The right side of the figure shows an embodiment of inserting virtual FEC blocks into a TI group. In this case, the virtual FEC blocks can be inserted before actual FEC blocks, as described above.

FIG. 39 shows equations representing reading operation after insertion of virtual FEC blocks according to an embodiment of the present invention.

Skip operation illustrated in the figure can skip virtual FEC blocks in reading operation.

Figure 40:
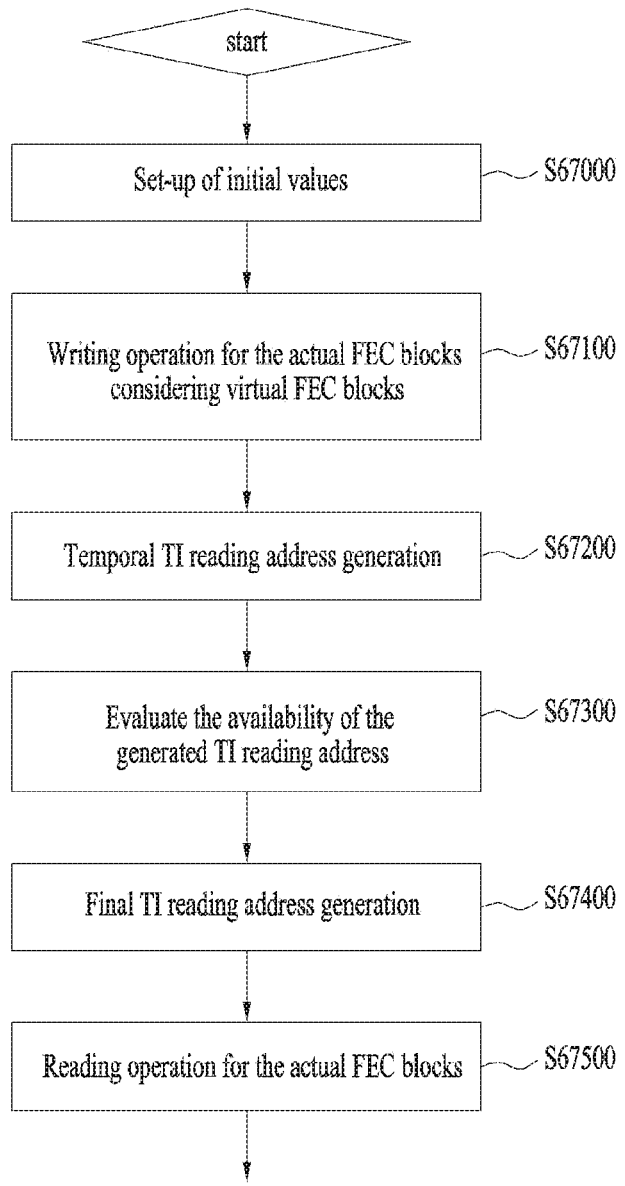
FIG. 40 is a flowchart illustrating a time interleaving process according to an embodiment of the present invention.

FIG. 40 is a flowchart illustrating a time interleaving process according to an embodiment of the present invention.

A time interleaver according to an embodiment of the present invention can setup initial values (S67000).

Then, the time interleaver according to an embodiment of the present invention can perform writing operation on actual FEC blocks in consideration of virtual FEC blocks (S67100).

The time interleaver according to an embodiment of the present invention can generate a temporal TI address (S67200).

Subsequently, the time interleaver according to an embodiment of the present invention can evaluate the availability of the generated TI reading address (S67300). Then, the time interleaver according to an embodiment of the present invention can generate a final TI reading address (S67400).

The time interleaver according to an embodiment of the present invention can read the actual FEC blocks (S67500).

Figure 41:
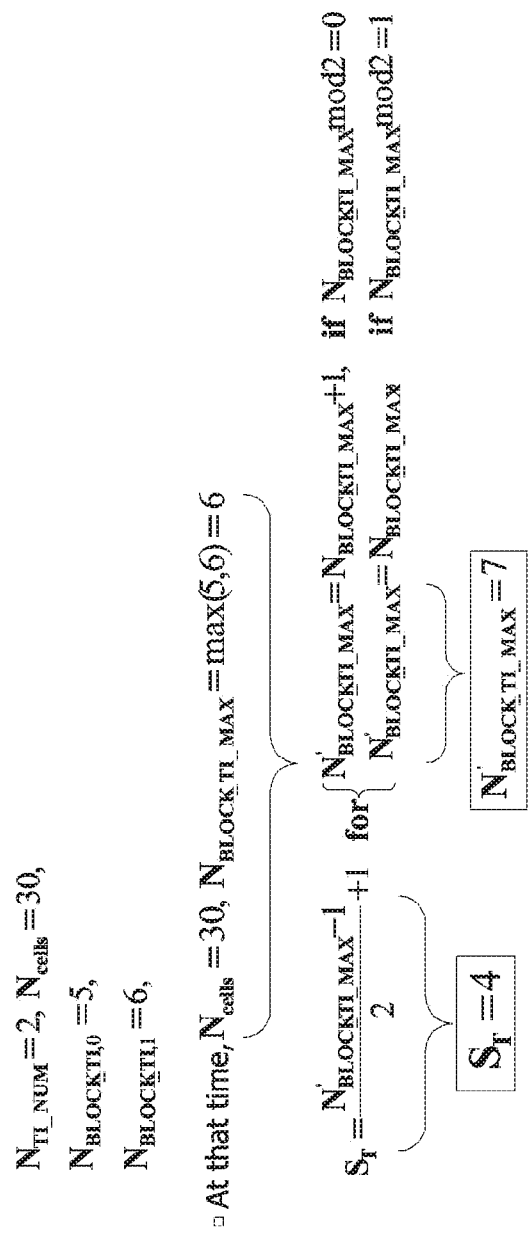
FIG. 41 shows equations representing a process of determining a shift value and a maximum TI block size according to an embodiment of the present invention.

FIG. 41 shows equations representing a process of determining a shift value and a maximum TI block size according to an embodiment of the present invention.

The figure shows an embodiment in which the number of TI groups is 2, the number of cells in a TI group is 30, the number of FEC blocks included in the first TI group is 5 and the number of FEC blocks included in the second TI block is 6. While a maximum number of FEC blocks is 6, 6 is an even number. Accordingly, a maximum number of FEC blocks, which is adjusted in order to obtain the shift value, can be 7 and the shift value can be calculated as 4.

Figure 42:
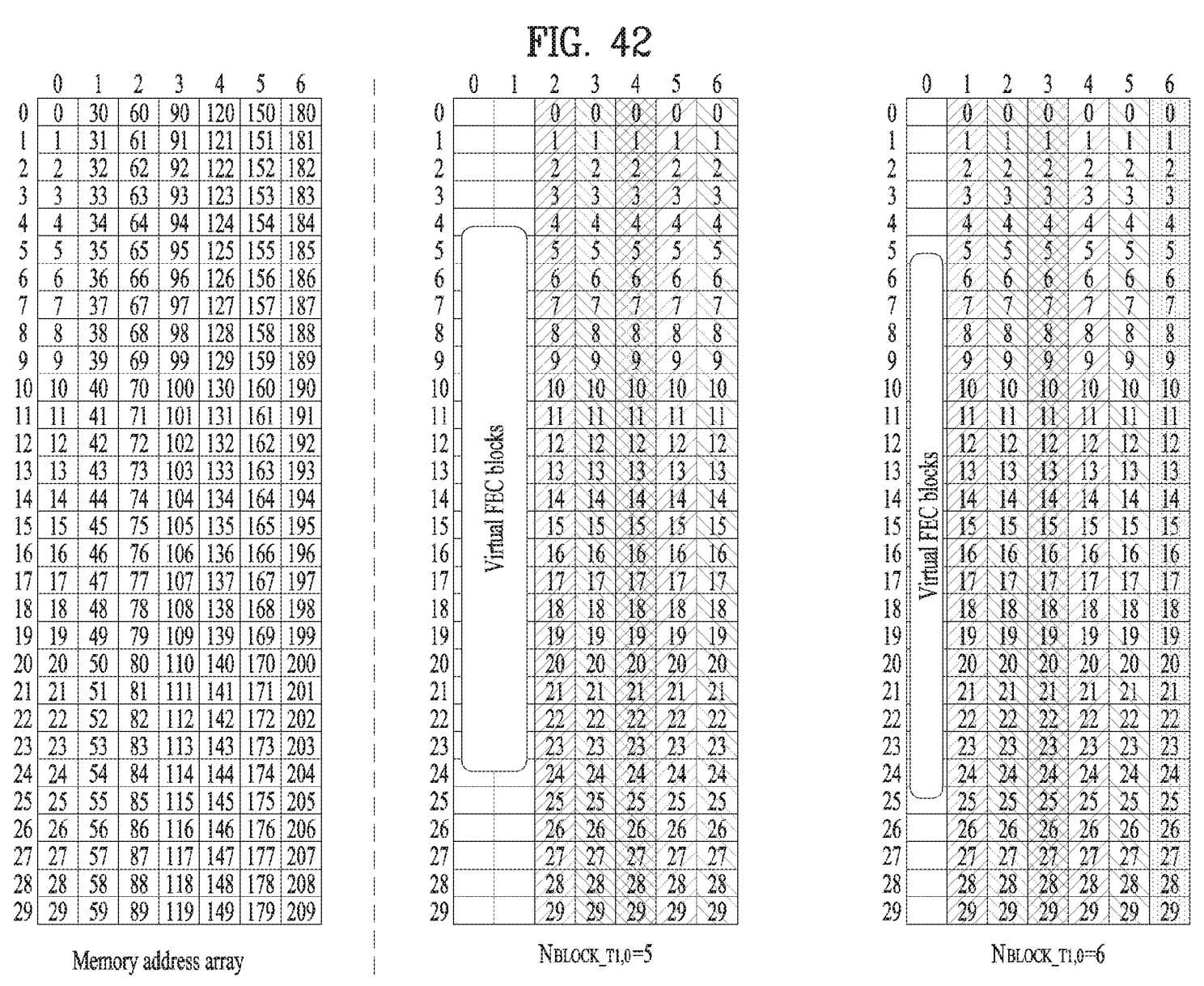
Figure 43:
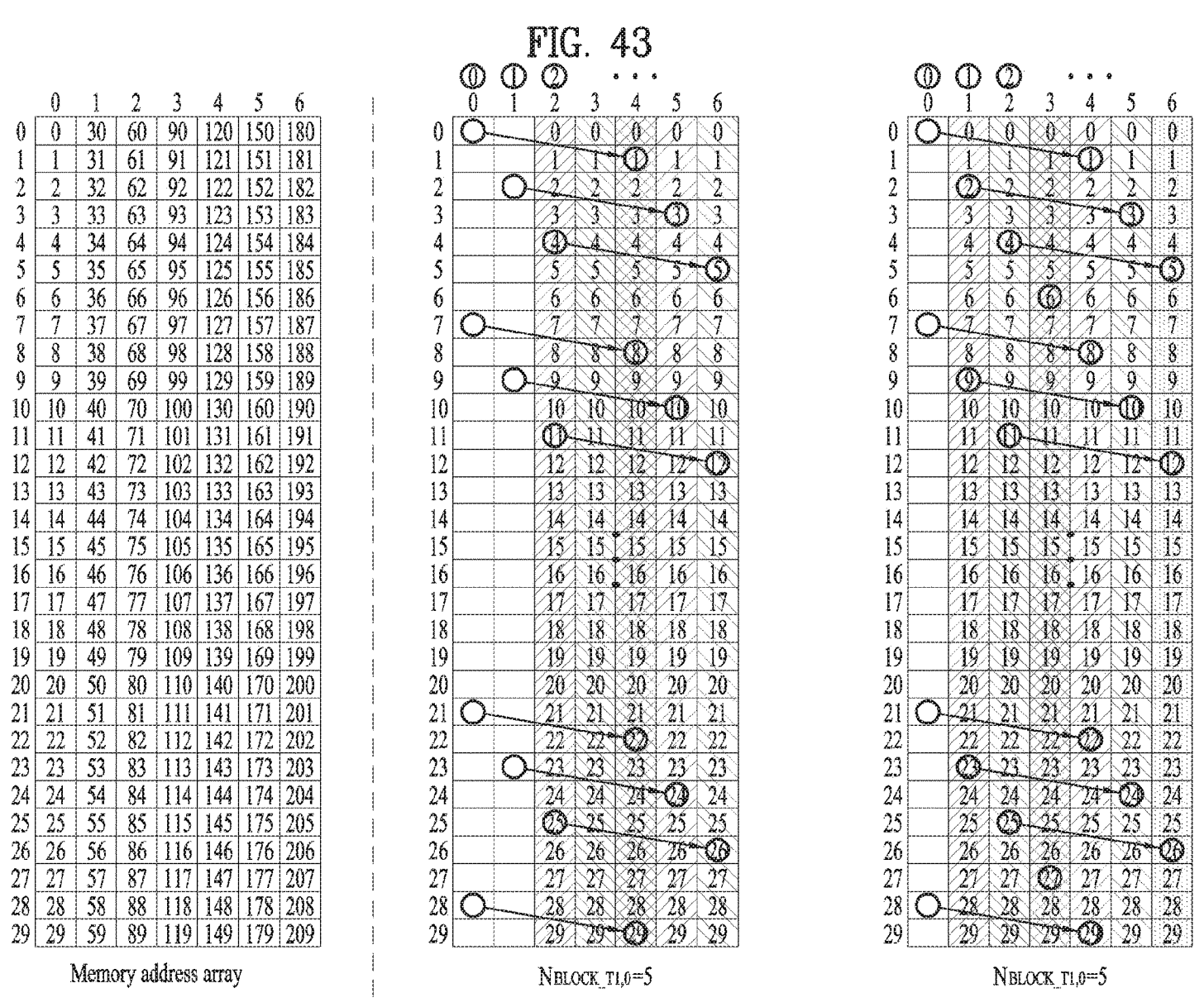

FIGS. 42 to 44 illustrate a TI process of the embodiment described before.

FIG. 42 illustrates writing operation according to an embodiment of the present invention.

FIG. 42 shows writing operation for the two TI groups described before.

A block shown in the left side of the figure represents a TI memory address array and blocks shown in the right side of the figure illustrate writing operation when two virtual FEC blocks and one virtual FEC block are respectively inserted into two continuous TI groups. Since the adjusted maximum number of FEC blocks is 7, as described above, two virtual FEC blocks are inserted into the first TI group and one virtual FEC block is inserted into the second TI group.

FIG. 43 illustrates reading operation according to an embodiment of the present invention.

A block shown in the left side of the figure represents a TI memory address array and blocks shown in the right side of the figure illustrate reading operation when two virtual FEC blocks and one virtual FEC block are respectively inserted into two continuous TI groups. In this case, reading operation can be performed on the virtual FEC blocks in the same manner as the reading operation performed on actual FEC blocks.

FIG. 44 illustrates a result of skip operation in reading operation according to an embodiment of the present invention.

As shown in the figure, virtual FEC blocks can be skipped in two TI groups.

Figure 45:
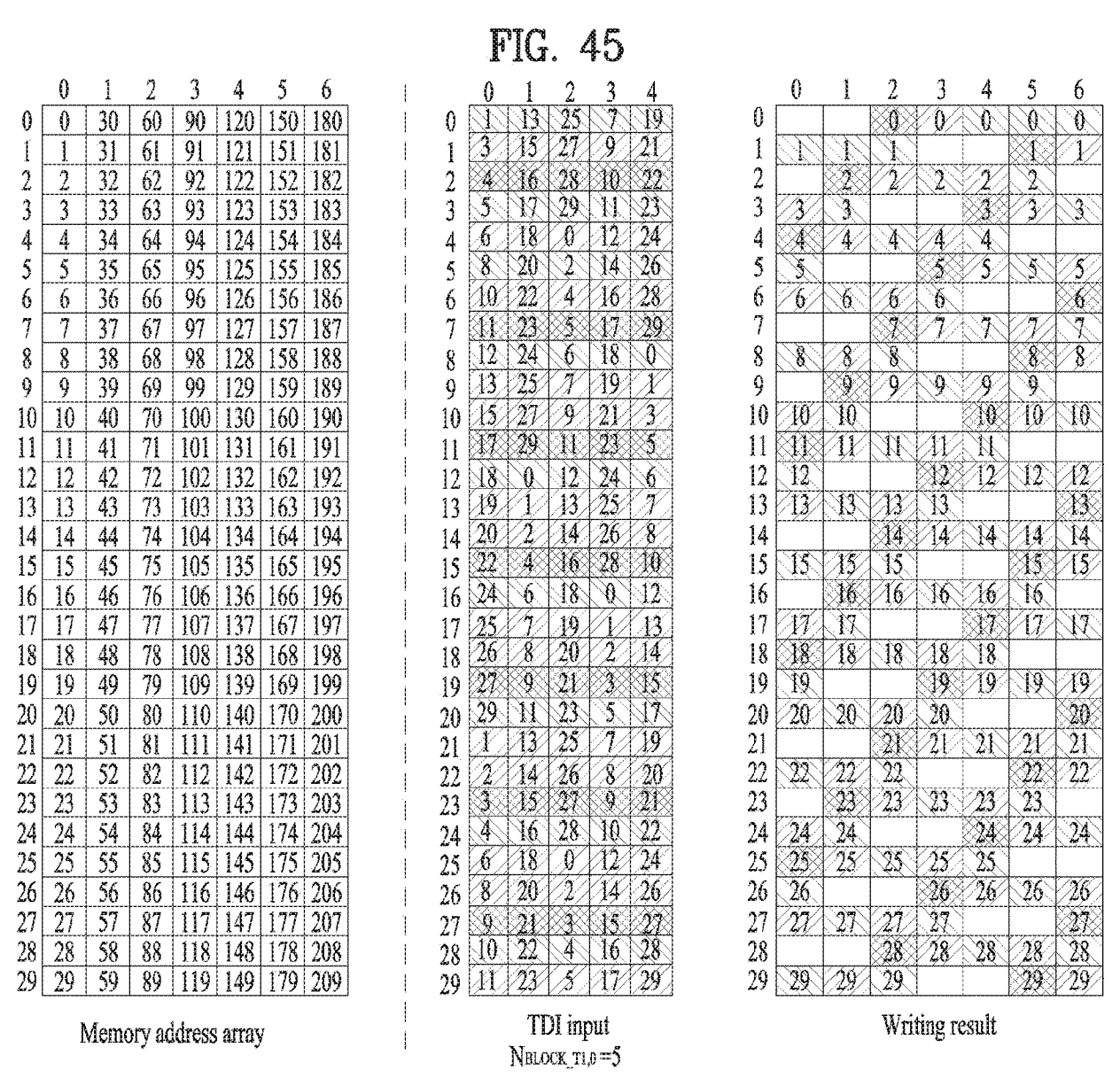
Figure 46:
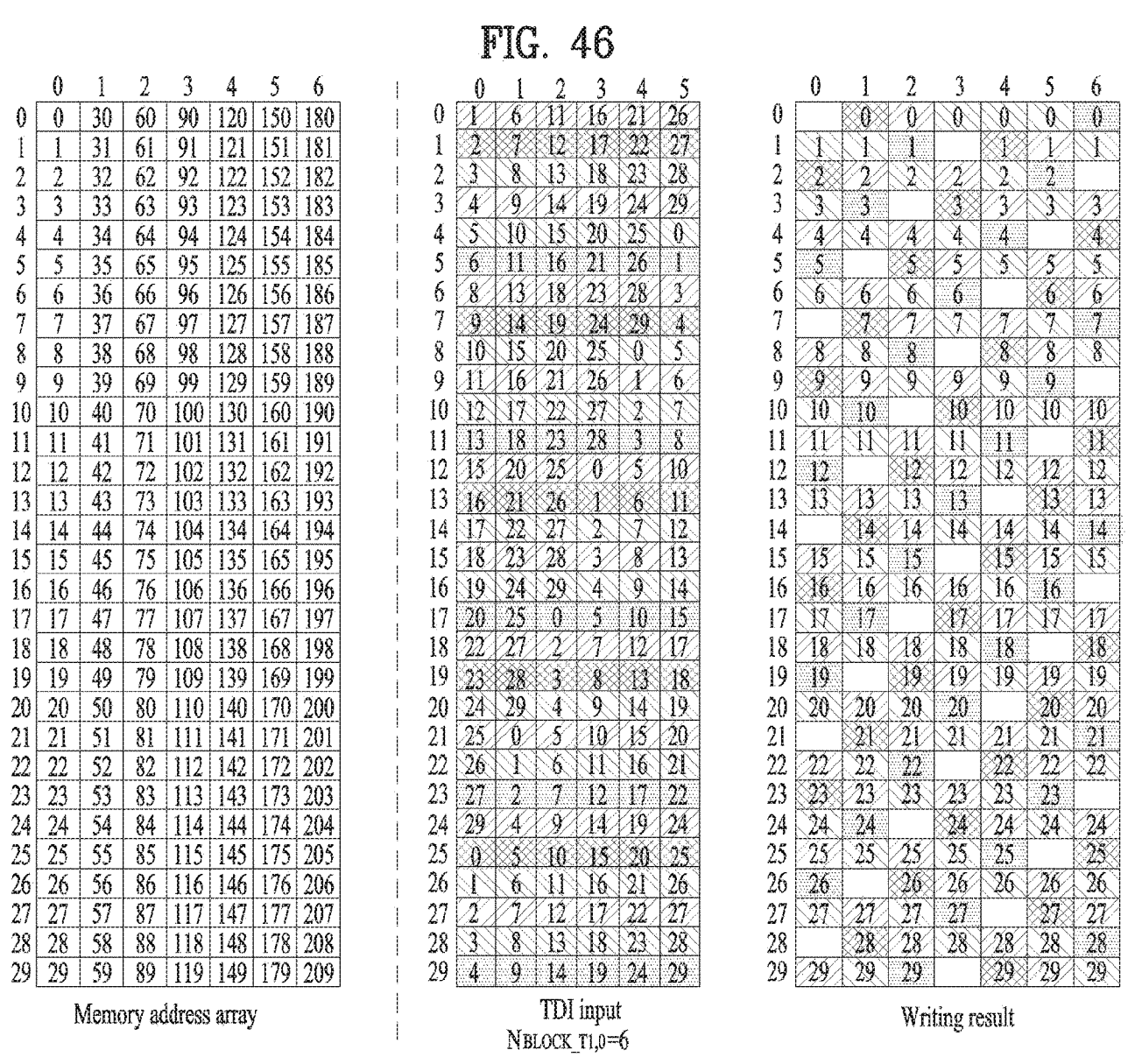

FIGS. 45 and 46 illustrate time deinterleaving corresponding to a reverse of TI described before.

Figure 48:
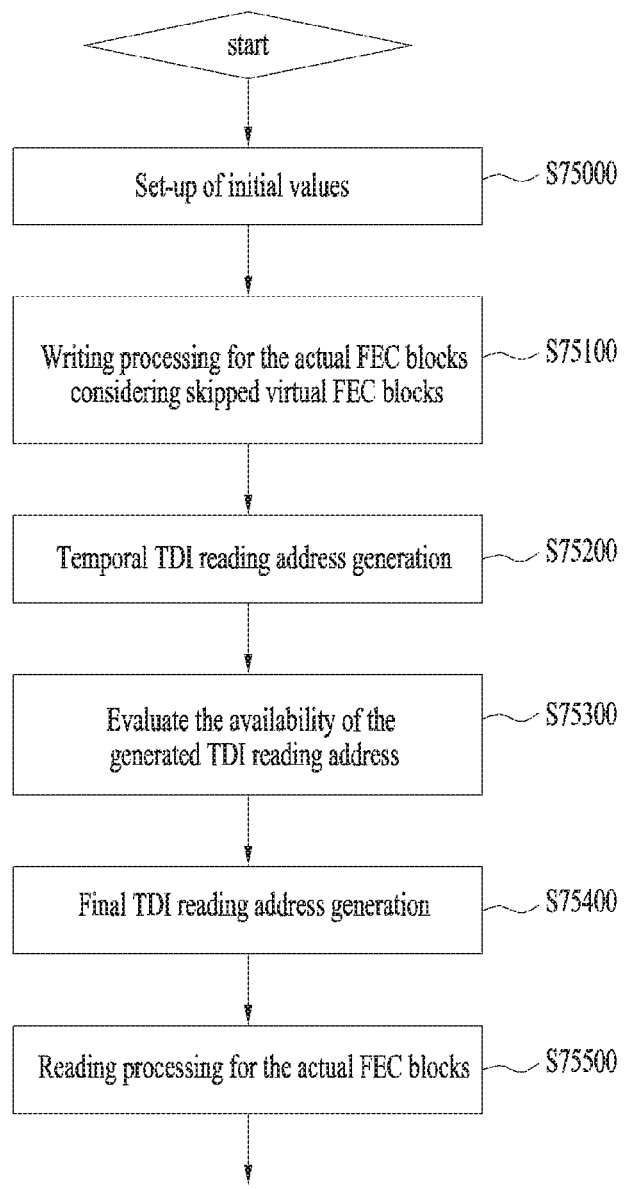
FIG. 48 is a flowchart illustrating a time deinterleaving process according to an embodiment of the present invention.

Specifically, FIG. 47 illustrates time deinterleaving for the first TI group and FIG. 48 illustrates time deinterleaving for the second TI group.

FIG. 45 shows a writing process of time deinterleaving according to an embodiment of the present invention.

A left block in the figure shows a TI memory address array, a middle block shows the first TI group input to a time deinterleaver and a right block shows a writing process performed in consideration of virtual FEC blocks that are skipped with respect to the first TI group.

As shown in the figure, two virtual FEC blocks skipped during TI can be restored for correct reading operation in the writing process. In this case, the positions and quantity of the skipped two virtual FEC blocks can be estimated through an arbitrary algorithm.

FIG. 46 illustrates a writing process of time deinterleaving according to another embodiment of the present invention.

A left block in the figure shows a TI memory address array, a middle block shows the second TI group input to the time deinterleaver and a right block shows a writing process performed in consideration of virtual FEC blocks that are skipped with respect to the second TI group.

As shown in the figure, one virtual FEC block skipped during TI can be restored for correct reading operation in the writing process. In this case, the position and quantity of the skipped one virtual FEC block can be estimated through an arbitrary algorithm.

FIG. 47 shows equations representing reading operation of time deinterleaving according to another embodiment of the present invention.

A TDI shift value used in the receiver can be determined by a shift value used in the transmitter, and skip operation can skip virtual FEC blocks in reading operation, similarly to skip operation performed in the transmitter.

FIG. 48 is a flowchart illustrating a time deinterleaving process according to an embodiment of the present invention.

A time deinterleaver according to an embodiment of the present invention can setup initial values (S75000).

Then, the time deinterleaver according to an embodiment of the present invention can perform writing operation on actual FEC blocks in consideration of virtual FEC blocks (S75100).

Subsequently, the time deinterleaver according to an embodiment of the present invention can generate a temporal TDI reading address (S75200).

The time deinterleaver according to an embodiment of the present invention can evaluate the availability of the generated TDI reading address (S75300). Then, the time deinterleaver according to an embodiment of the present invention can generate a final TDI reading address (S75400).

Subsequently, the time deinterleaver according to an embodiment of the present invention can read the actual FEC blocks (S75500).

Figure 49:
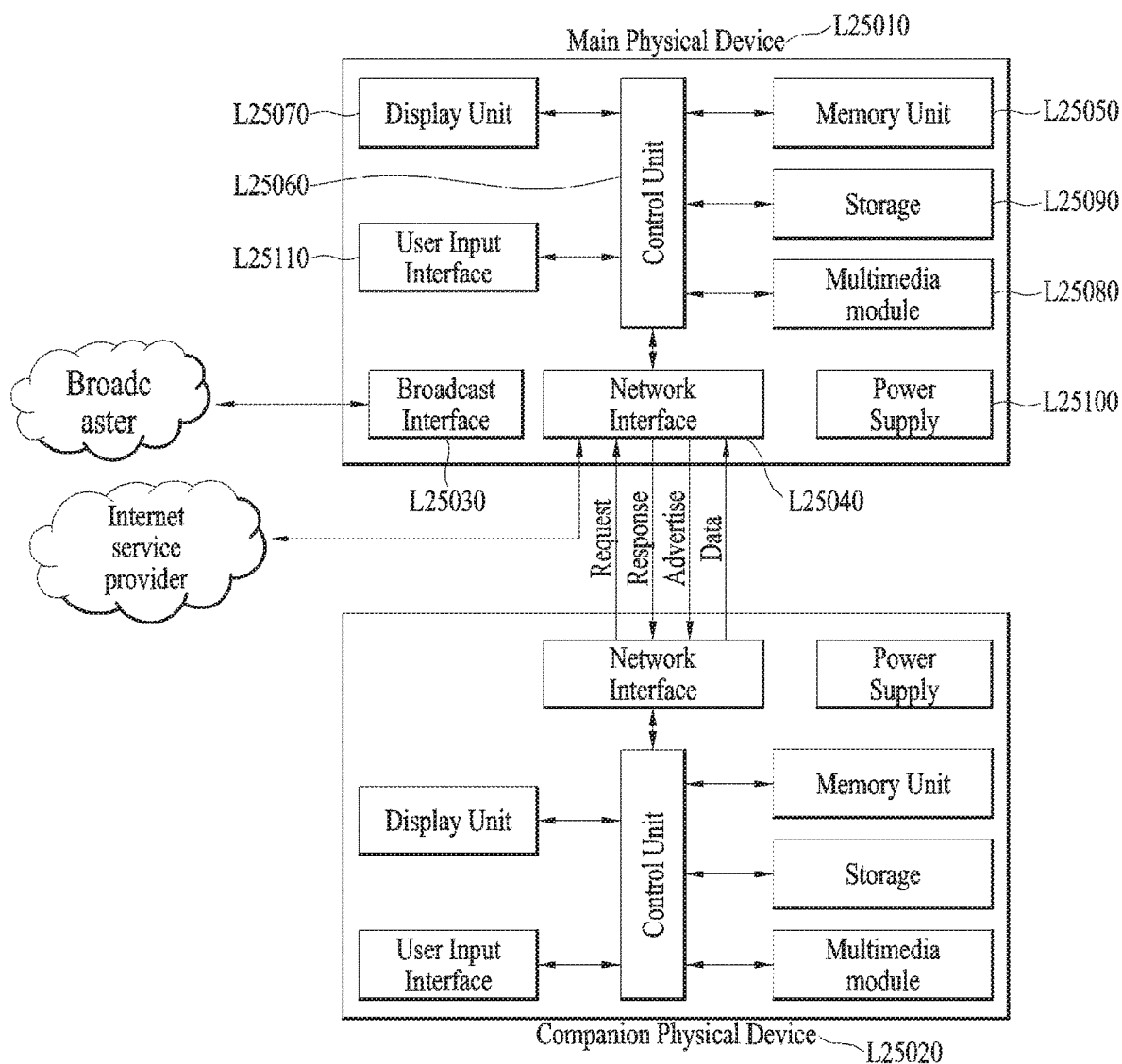
FIG. 49 is a block diagram illustrating a main physical device and a companion physical device according to an embodiment of the present invention.

FIG. 49 is a block diagram illustrating a main physical device and a companion physical device according to an embodiment of the present invention.

The embodiment of the present invention can provide a service guide in a terrestrial broadcast environment or a mobile broadcast environment. In addition, the embodiment of the present invention can provide a service guide regarding services available in the next generation hybrid broadcast environment based on interaction between a terrestrial broadcast network and the Internet.

The embodiment of the present invention can inform users of not only various services available in the next generation hybrid broadcast system, but also constituent content of the services and/or component elements of the services. As a result, the user can easily confirm, select, and view the corresponding service, resulting in increased user convenience.

The embodiment of the present invention may construct a single service, various constituent content of the service, and/or component elements of the service, and may make a cross reference to each other. As a result, the broadcast receiver can easily construct and provide the corresponding service, and can allow the user to easily recognize the corresponding service.

The embodiments of the present invention can extend the reference structure for linking one service to various content and/or component elements of the service, and can allow the broadcast receiver and/or the user to reduce the amount of resources and/or consumption time needed to search for content and/or component elements of the single service.

FIG. 49 is a block diagram illustrating a main physical device and a companion physical device according to an embodiment of the present invention.

The main physical device (L25010) according to an embodiment of the present invention is one of devices for interactive services, and may indicate a target device to be controlled by the companion physical device (L25020). The main physical device may be referred to as a main device, a main reception device, a main display, a main screen, or the like.

The main physical device (L25010) according to one embodiment of the present invention may include a broadcast interface (L25030), a network interface (L25040), a memory unit (L25050), a control unit (L25060), a display unit (L25070), a multimedia module (L25080), a storage unit (L25090), a power-supply unit (L25100), and/or a user input interface (L25110).

The broadcast interface (L25030) may indicate a physical device located between the broadcaster and the device, such that the broadcast interface (L25030) acting as the physical device can transmit various messages (such as the AV stream, service guide, and notification messages) and/or data. The broadcast interface (L25030) may receive broadcast signals, signaling information, data, etc. from the broadcaster.

The network interface (L25040) may indicate a physical device located between various devices (e.g., the main physical device and the companion physical device), such that the network interface (L25040) can transmit various messages (e.g., commands, requests, actions, response messages, etc.), and can perform advertising and/or data transmission. The network interface may receive broadcast services, broadcast content, signaling, information, applications, data, etc. from the Internet service provider.

The memory unit (L25050) may be an optional or selective device implemented in various types of devices, and may indicate a volatile physical device capable of temporarily storing various types of data.

The control unit (L25060) may be configured to control the entire operation of the source device and/or the sink device, and may be implemented by software or hardware. In this case, the source device may indicate a device configured to transmit messages and/or data. The sink device may indicate a device configured to receive messages and/or data. Therefore, the main physical device and the companion physical device according to the embodiment of the present invention may correspond to the source device or the sink device.

The display unit (L25070) may display data received through the network interface or data stored in the storage unit on the screen. In this case, the display unit may be controlled by the control unit.

The multimedia module (L25080) may reproduce various types of multimedia. The multimedia module may be contained in the control unit, and may be located independently of the control unit.

The storage unit (L25090) may indicate a non-volatile physical device capable of storing various types of data therein. For example, the SC card may correspond to the storage unit.

The power-supply unit (L25100) may receive the external power-supply voltage and/or the internal power-supply voltage under control of the control unit, such that the power-supply unit (L25199) can provide a power-supply voltage needed to operate other constituent elements.

The user input interface (L25110) may indicate a device capable of receiving input signals or commands from the user.

The companion physical device (L25020) according to the embodiment of the present invention may be one of devices needed for interactive services, and may indicate a device configured to control the main device. Generally, the companion physical device may directly receive input signals from the user. The companion physical device may be referred to as a companion device, a second device, an additional device, an auxiliary device, a companion reception device, a companion receiver, a companion display, a second screen, or the like.

The physical device (L25020) according to the embodiment of the present invention may include a network interface, a memory unit, a control unit, a display unit, a multimedia module, a storage unit, a power-supply unit, and/or a user input interface.

From among all the constituent elements of the companion physical device according to the embodiment, some constituent elements having the same names as those of the main device may have the same functions as those of the constituent elements of the above-mentioned main device.

Figure 50:
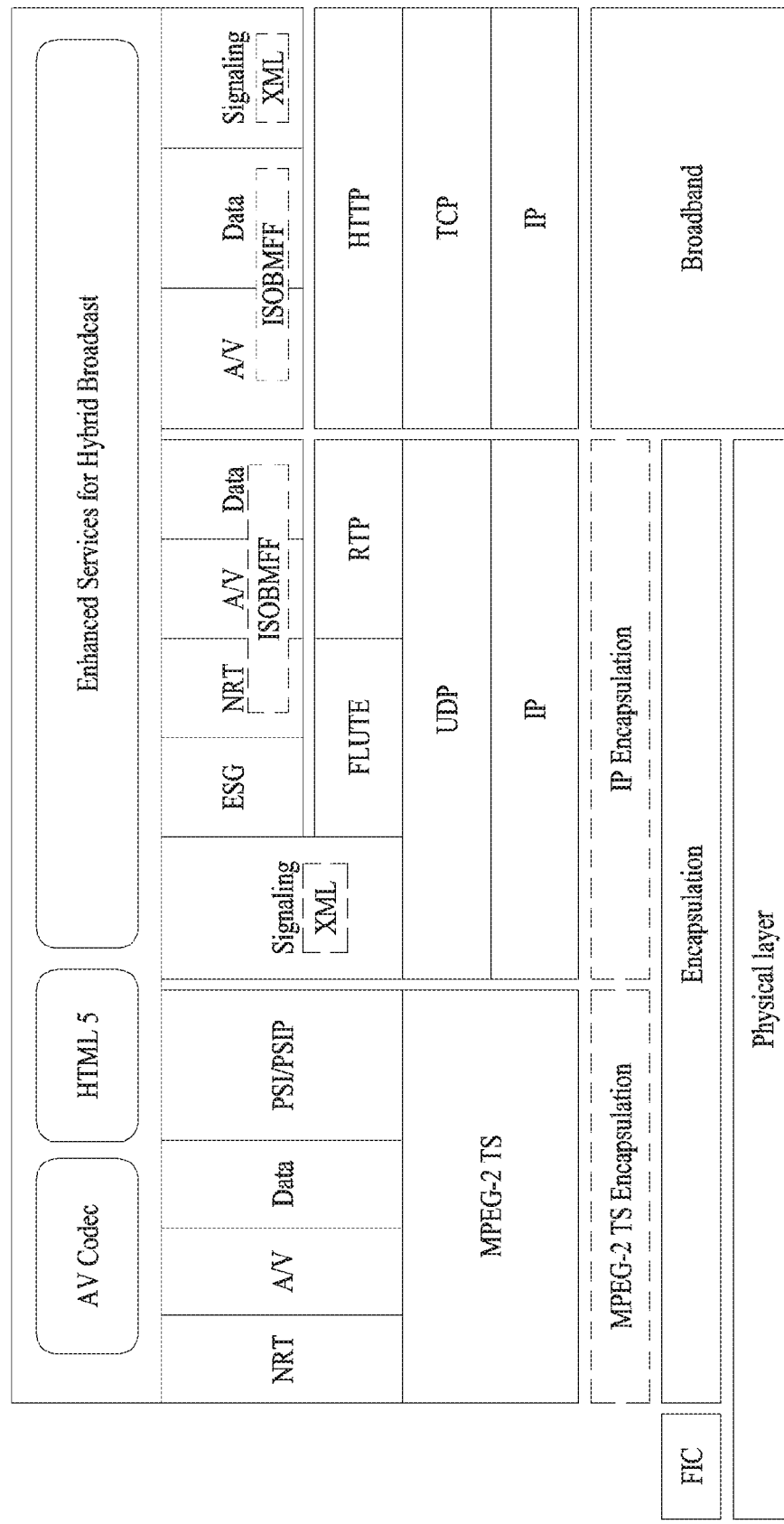
FIG. 50 is a block diagram illustrating a protocol stack to support a hybrid broadcast service according to an embodiment of the present invention.

FIG. 50 is a block diagram illustrating a protocol stack configured to support a hybrid broadcast service according to an embodiment of the present invention.

A physical layer may receive terrestrial broadcast signals, and may properly convert (or transform) the received terrestrial broadcast signals.

IP (Internet Protocol) Encapsulation may acquire an IP datagram using information acquired from the physical layer. In addition, the IP encapsulation may convert (or transform) the acquired IP datagram into a specific frame (e.g., RS Frame, GSE, etc.)

MPEG2 TS Encapsulation may acquire the MPEG2 TS using information acquired from the physical layer. In addition, the MPEG2 TS Encapsulation may convert the acquired MPEG2 TS datagram into a specific frame (e.g., RS Frame. GSE, etc.).

A Fast Information Channel (FIC) may transmit specific information (e.g., mapping information between the service ID and the frame) so as to access the service and/or content.

Signaling may include signaling information to support a hybrid broadcast service according to an embodiment of the present invention. This signaling information may include signaling information to support efficient acquisition of the services and/or content. This signaling information may be denoted in binary and/or XML format, and may be transmitted through the terrestrial broadcast network and/or the broadband network.

Real time A/V (Audio/Video) content and data may be represented by ISO Base Media File Format (ISOBMFF) or the like, and may be transmitted in real time through the terrestrial broadcast network and/or the broadband network. Non-real time content may be transmitted on the basis of IP/UDP/FLUTE. Real-time broadcast A/V (Audio/Video) content, data and/or signaling information may be transmitted in real time through the Internet. In this case, the real-time broadcast A/V (Audio/Video) content, data and/or signaling information may be transmitted by a request message. Alternatively, the real-time broadcast A/V (Audio/Video) content, data and/or signaling information may also be transmitted through real-time streaming.

The embodiment of the present invention may combine data through the above-mentioned protocol stack, and may also provide various enhanced services, for example, an interactive service, a second screen service, etc.

Figure 51:
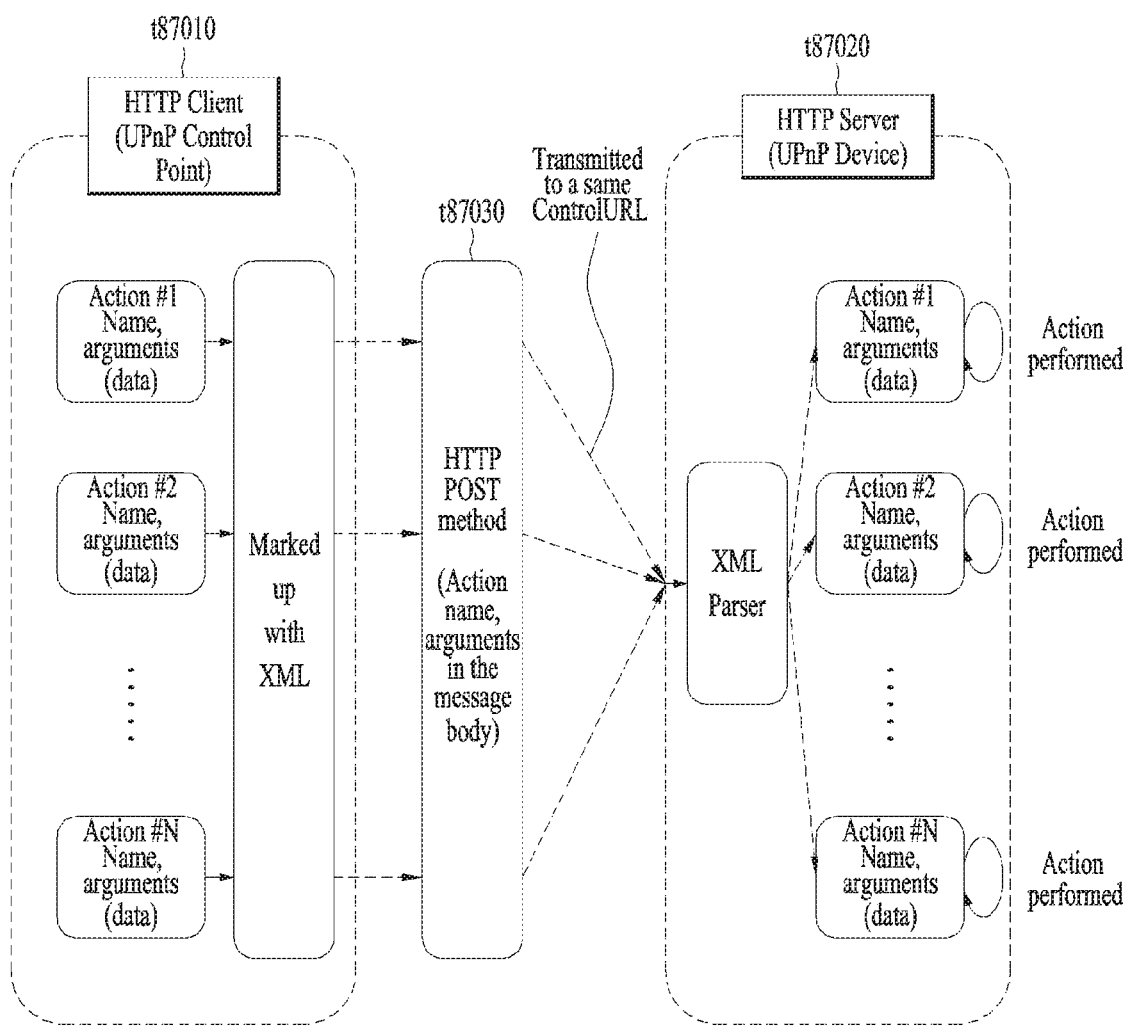
FIG. 51 is a view showing an UPnP type Action mechanism according to an embodiment of the present invention.

FIG. 51 is a view showing an UPnP type Action mechanism according to an embodiment of the present invention.

First, communication between devices in the present invention will be described.

The communication between devices may mean exchange of a message/command/call/action/request/response between the devices.

In order to stably transmit a message between devices to a desired device, various protocols, such as Internet Control Message Protocol (ICMP) and Internet Group Management Protocol (IGMP), as well as Internet Protocol (IP) may be applied. At this time, the present invention is not limited to a specific protocol.

In order to contain various information in a message used for communication between devices, various protocols, such as Hypertext Transfer Protocol (HTTP), Real-time Transport Protocol (RTP), Extensible Messaging and Presence Protocol (XMPP), and File Transfer Protocol (FTP), may be applied. At this time, the present invention is not limited to a specific protocol.

When a message used for communication between devices is transmitted, various components, such as a message header and a message body, defined by each protocol may be utilized. That is, each message component may be transmitted in a state in which data are stored in each message component and the present invention is not limited to a specific message component. In addition, data transmitted by a message may be transmitted various types (string, integer, floating point, boolean, character, array, list, etc.) defined by each protocol. In order to structurally express/transmit/store complex data, a Markup scheme, such as Extensible Markup Language (XML), Hypertext Markup Language (HTML), Extensible Hypertext Markup Language (XHTML), and JavaScript Object Notation (JSON), text, or an image format may be applied. At this time, the present invention is not limited to a specific scheme.

In addition, a message used for communication between devices may be transmitted in a state in which data are compressed. The present invention is not limited to application of a specific compression technology.

In the description of the above-described communication between devices in the present invention, one scheme, e.g. a UPnP scheme, will be described. The UPnP scheme may correspond to a case in which IP-TCP/UDP-IMP protocols are combined in the description of the above-described communication between devices.

The UPnP type Action mechanism according to the embodiment of the present invention shown in the figure may mean a communication mechanism between a UPnP control point and a UPnP device. The UPnP control point t87010 may be an HTTP client and the UPnP device t87020 may be an HTTP server. The UPnP control point t87010 may transmit a kind of message called an action to the UPnP device t87020 such that the UPnP device t87020 can perform a specific action.

The UPnP control point t87010 and the UPnP device t87020 may be paired with each other. Pairing may be performed between the respective devices through a discovery and description transmission procedure. The UPnP control point may acquire a URL through a pairing procedure.

The UPnP control point t87010 may express each action in an XML form. The UPnP control point t87010 may transmit each action to the acquired control URL using a POST method t87030 defined by HTTP. Each action may be data which are to be actually transmitted as a kind of message. This may be transmitted to a HTTP POST message body in an XML form. Each action may include name, arguments, and relevant data. The HTTP POST message body may transmit name and/or arguments of each action.

At this time, each action may be transmitted to the same control URL. The UPnP device t87020 may parse the received action using an XML, parser. The UPnP device t87020 may perform a corresponding operation according to each parsed action.

For the UPnP protocol, each action may be defined by name and used. In addition, since the name of the action is also transmitted to the HTTP POST message body, exchange between infinite kinds of actions may be possible even in a case in which only one URL for a target device exists and only one HTTP POST method is used.

Figure 52:
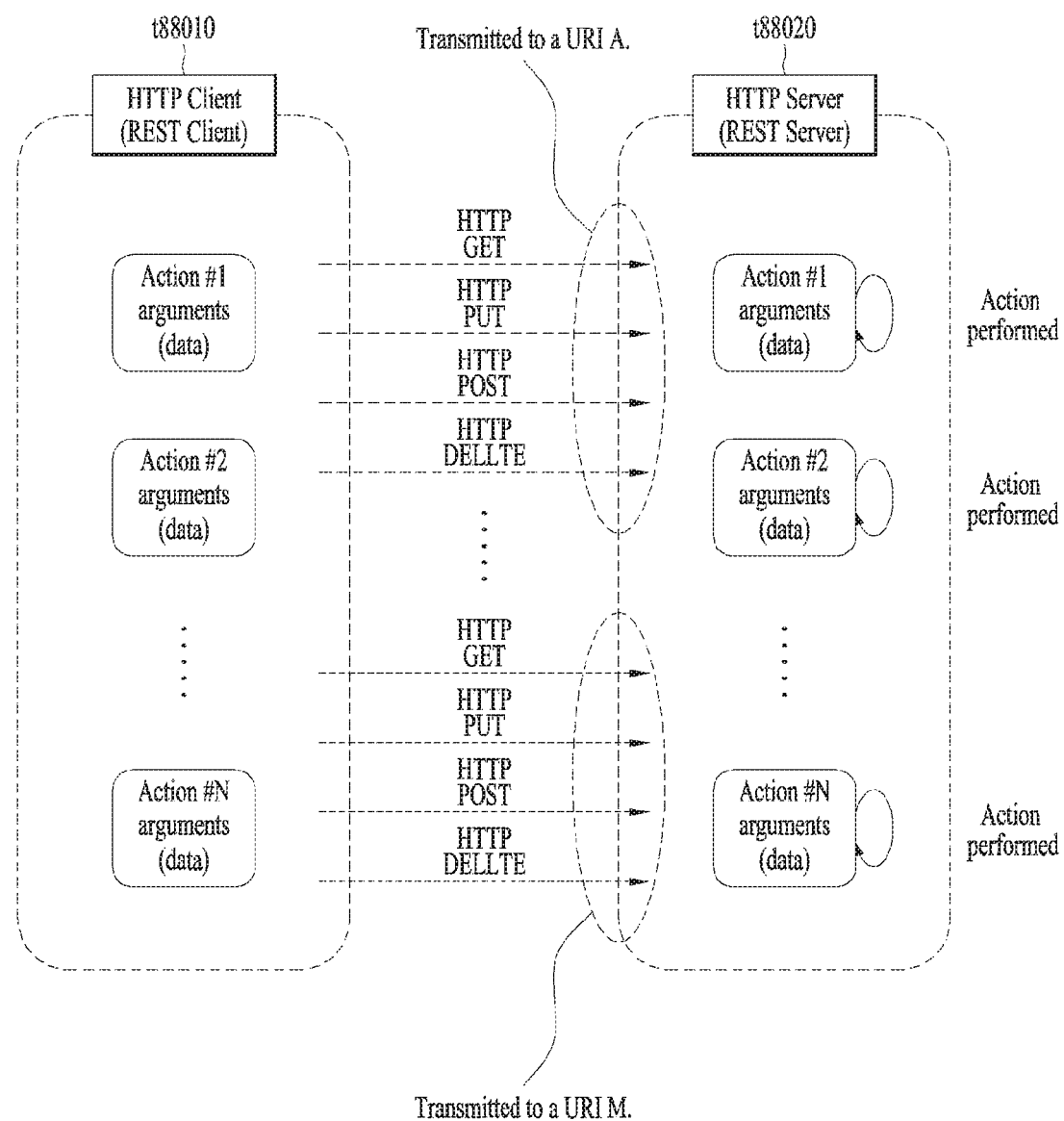
FIG. 52 is a view showing a REST mechanism according to an embodiment of the present invention.

FIG. 52 is a view showing a REST mechanism according to an embodiment of the present invention.

In the description of the above-described communication between devices in the present invention, one scheme, e.g. a REST scheme, will be described.

The REST mechanism according to the embodiment of the present invention shown in the figure may mean a communication mechanism between a REST client t88010 and a REST server t88020. The REST client t88010 may be an HTTP client and the REST server t88020 may be an HTTP server. In the same manner as in the above description, the REST client t88010 may transmit a kind of message called an action to the REST server t88020 such that the REST server t88020 can perform a specific action.

In this embodiment, the REST client t88010 may transmit each action to the REST server t88020 through a URI. Action name is not required for each action. Each action may include only arguments and data.

Among HTTP methods, various methods, such as GET, HEAD, PUT, DELETE, TRACE, OPTIONS, CONNECT, and PATCH, as well as POST may be utilized. In addition, a plurality of URIs that will access a target device for communication may be defined. Due to such characteristics, an action may be transmitted without definition of action name. A plurality of URI values necessary for such a REST scheme may be acquired during a discovery or description transmittance procedure.

Data or arguments necessary to be transmitted may be transmitted while being added to a corresponding URI. Alternatively, data or arguments may be transmitted while being included in the HTTP body in various forms (XML, JSON, HTML, TEXT, IMAGE, etc.

The REST server t88020 may perform a specific operation according to the received action.

The above-described communication between devices is only an embodiment and all of the details proposed by the present invention are not limited to the UPnP scheme.

FIG. 53 is a diagram illustrating a service for exchanging electronic service guide (ESG) between a broadcast receiver and companion devices according to an embodiment of the present invention.

ESG may be a type of channel or information to be transmitted through service guide delivery descriptors in a specific session and may provide service guide of broadcast, radio, or other media applications. ESG may provide service scheduling or program related information items in the form of menu format, etc. to a user. ESG may be provided through a broadcast channel or an Internet channel (broadband).

Users may perform an operation such as service providing schedule, discovery of an entry point of currently available services, and service filtering according to preference, through ESG. Content providers may represent information on a service and/or content that are available, purchase/ subscription related information, and service access information, through ESG. The ESG may also be referred to as service guide, electronic program guide (EPG), or the like.

Conventionally, when service guide such as ESG is executed while a user watches a broadcast program through a broadcast receiver, ESG may be hidden by the watched broadcast program to cause inconvenience.

The present invention proposes a method of executing service guides such as ESG in a companion device to access ESG information without obstructing watch of the currently watched broadcast program. In this case, a user may access ESG while does not experience inconvenience during watching of a broadcast program. The user may protect his or her privacy using a personal companion device for ESG search. In general, ESG may be searched for through a UI of a companion device instead of a UI of a broadcast receiver with degraded convenience, thereby enhancing convenience.

The present invention may overcome the aforementioned problem by defining a protocol for transmitting ESG information to a companion device from a broadcast receiver in a next-generation hybrid broadcast environment based on interaction between a terrestrial broadcast network and the Internet. The present invention proposes a protocol of changing a service of a broadcast receiver by transmitting channel information in a companion device when a user selects a new service through ESG provided by the companion device.

Although the embodiments of the present invention have been described based on UPnP, this is merely for convenience of description and a protocol for communication between a broadcast receiver and a companion device is not limited thereto. Although XML-based ESG has been exemplified according to the embodiments of the present invention, this is merely for convenience of description and format for configuring ESG is not limited thereto.

An example of a service for exchanging the illustrated ESG may be referred to as an ESG service.

The ESG service may be a service for exchanging ESG between a broadcast receiver and a companion device. In some embodiments, a service type of an ESG service may be defined as atsc3.0ESG-1 and a service ID may be defined as urn:atsc.org:serviceId:atsc3.0ESG.

Compatibility between services may be required for an ESG service. In some embodiments, an UPnP device type may be defined. A broadcast receiver may have a device type of urn:atsc.org:device:atsc3.0rcvr and operate as a UPnP controlled device. A companion device may operate as an UPnP control point.

A state variable, an action, etc. for an ESG service will be described below.

FIG. 54 is a diagram illustrating an ESGData state variable according to an embodiment of the present invention.

For the aforementioned ESG service, the ESGData state variable may be defined. The ESGData state variable may be a state variable indicating ESG. The ESGData state variable may store ESG data of ESG received through a broadcast/Internet network. The illustrated ESGData may be written in XML format.

The ESGData state variable may store ESG data items indicating ESG, that is, elements, attributes, and sub elements in ESG.

A Service element t54010 in the ESGData state variable may be an element having information related to a service indicated by ESG among contents included in the ESG. Lower information of the element may include Service@id indicating a service ID, Servicer@version indicating a service version, Service.Name indicating a service name, Service.Description indicating service description, and/or Service.ServiceType indicating a service type. Here, A.B may refer to a B element as a lower element of an A element and A@a may refer to @a as lower attribute of the A element.

Here, Service.ServiceType, that is, a ServiceType element as a lower element of a service may indicate a service type indicated by a corresponding service. In some embodiments, 0 may be unspecified, 1 may refer to Basic TV, 2 may refer to Basic Radio, . . . , 14 may refer to a linear service, 15 may refer to an app based service, and 16 may refer to a companion screen service or the like. A value indicated by the element may be changed in some embodiments.

A Schedule element t54020 in the ESGData state variable may be an element having schedule information of services/programs indicated by ESG among contents included in the ESG. Lower information of the element may include Schedule@in indicating a schedule ID, Schedule@version indicating schedule version, and so on. Lower information of the element may include Schedule.ServiceReference indicating a service related to schedule, Schedule.InteractivityDataReference indicating interactivity data related to schedule, Schedule.ContentReference indicating content related to schedule, and so on.

A Content element t54030 in the ESGData state variable may be an element having content information indicated by ESG among contents included in the ESG. Lower information of the element may include Content@id indicating a content ID, Content@version indicating a content version, Content.Name indicating a content name, Content.Description indicating content description, Content.StartTime indicating presentation start time of content, and/or ContentEndTime indicating presentation end time of content. ComponentReference, as a lower element of the Content element may include information for referencing a component of corresponding content, related to the corresponding content. Thereby, the related component may be recognized and corresponding component related information items in ESG may be referenced.

A Component element t54040 in the ESGData state variable may be an element having component information of content indicated by ESG among contents included in the ESG. Lower information of the element may include Component@id indicating a component ID, Component@version indicating a component version, and so on. Lower information of the element may include Language indicating a component language, Length indicating a component length, ParentalRating indicating component rating. ComponentType indicating a component type, ComponentRole indicating a component role, TargetDevice indicating a device targeted by a component, and so on. According to whether a component is a presentable video, audio, closed caption, or app, information such as PresentableVideoComponent, PresentableAudioComponent, PresentableCCComponent, and PresentableAppComponent may be included in the element, respectively.

In some embodiments, the ESGData state variable may be transmitted to a companion device using an eventing method or an action method.

The aforementioned element, attributes, and so on are merely embodiments of ESGData and element/attributes, etc. in ESGData may be further added, modified, or deleted according to configuration, format, etc. of ESG.

FIG. 55 is a diagram illustrating an ESGData state variable according to another embodiment of the present invention.

The illustrated ESGData state variable is similar to the aforementioned ESGData state variable but is different from the aforementioned ESGData state variable in that the Component element is included as a lower element of the Content element.

A plurality of components are combined to constitute one content and, thus, the Component element may be included as a lower element of the Content element. Capability of devices for supporting each component may be defined as DeviceCapability as a lower element and may be included as a lower element of a Component element.

Figure 56:
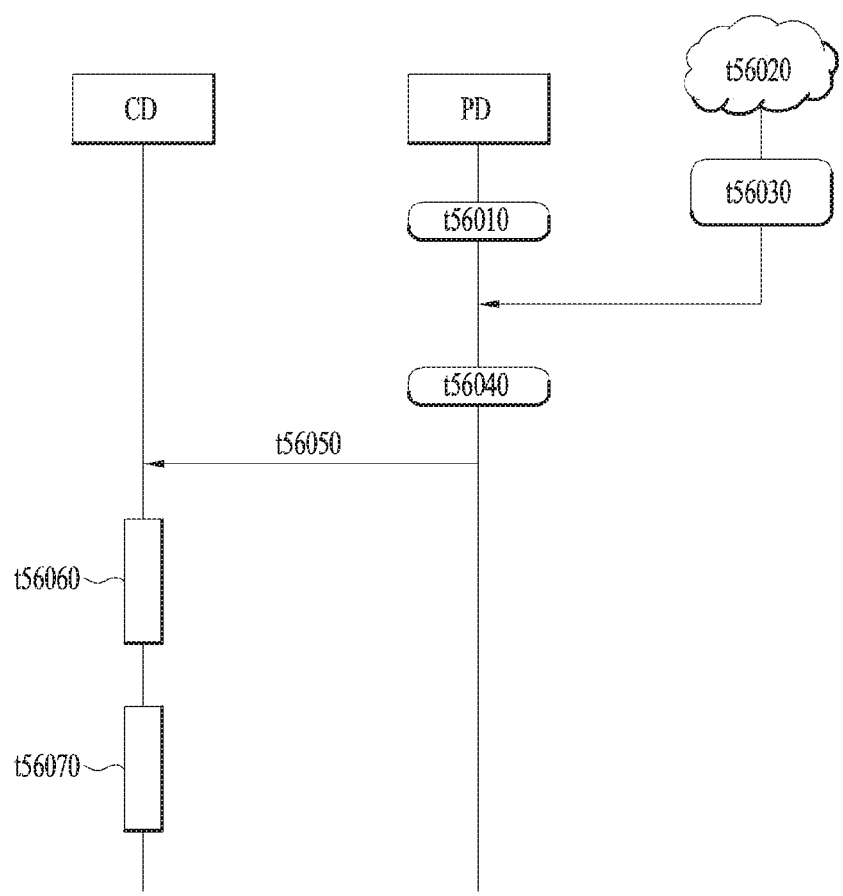
FIG. 56 is a diagram illustrating an operation of transmitting an ESGData state variable to a companion device using an eventing method according to an embodiment of the present invention.

FIG. 56 is a diagram illustrating an operation of transmitting an ESGData state variable to a companion device (CD) using an eventing method according to an embodiment of the present invention.

First, the illustrated DC may refer to a companion device and a primary device (PD) may refer to a receiver or a broadcast receiver. According to the present embodiment, the two devices are assumed to be paired with each other. The companion device is assumed to subscribe to the aforementioned ESG service. In this initial state t56010, the ESGData state variable may not have any value.

A service/content provider may transmit ESG through a broadcast network or a broadband channel (t56020). The ESG may be received through a network interface or a receiving unit of a receiver. Here, the receiving unit may be the aforementioned broadcast interface or tuner.

The receiver may signal the received ESG (t56030). The ESG data may be stored in the ESGData state variable (t56040).

The ESGData may be transmitted to the companion device through eventing (t56050). The companion device that receives the ESGData state variable may parse the ESGData (t56060) and ESG may be exposed to the companion device through a UI according to the parsed value (t56070). In this case, in order to show the ESG to the user, the UI may be represented at a native level of the companion device or represented in an application of the companion device.

There may be various exemplary embodiments of a method of representing ESG by a companion device. In some embodiments, upon receiving ESG, the companion device may immediately expose ESG to the user in any form. According to another embodiment of the present invention, upon receiving ESG the companion device may transmit a notification message to a user, and when the user executes the notification message, ESG may be exposed. According to another embodiment of the present invention, upon receiving the ESG, the companion device owns ESG information in a background and then the user executes an application in which ESG is viewable at a time desired by a user, the ESG may be exposed to the user at last.

FIG. 57 is a diagram illustrating LastChangedESGData state variable according to an embodiment of the present invention.

For the aforementioned ESG service, the LastChangedESGData state variable may be defined. As described above, when an entire portion of ESG is transmitted to a companion device, even if even some ESG data items are modified, it may not be effective that all ESG data items are transmitted. To this end, the LastChangedESGData state variable for storing only the modified ESG data may be defined. The LastChangedESGData state variable may store only ESG data that is added/modified/deleted in newly received ESG compared with previous ESG.

The LastChangedESGData state variable may include an Addition element (t57010). The element may store ESG data added to the newly received ESG compared with existing ESG data. As a sub element of the element, newly added ESG data items, i.e., element/attributes may be stored. For example, when ESG data related to a new service with a new service ID compared with existing ESG data is added to newly received ESG, element/attributes related to the new service may be included in a lower tree of the Addition element. In the illustrated embodiment, a service with an ID of "atsc.org/esg/service/3 is newly added and, thus, it may be seen that a Service element of a corresponding service is included in the Addition element. In addition, a service with an ID of "atsc.org/esg/service/4 and a name of ABC is newly added and, thus, it may be seen that the Service element of the corresponding service is added to the Addition element. In addition, information such as Service, Content, and Schedule may be included in the element.

The LastChangedESGData state variable may include an element Modification (t57020). The element may store ESG data modified in newly received ESG compared with existing ESG data. As a sub element of the element, the modified ESG data items, that is, element/attributes may be stored. For example, when any one of lower information items of schedule with an ID of "atsc.org/esg/schedule/3" is modified, an element Schedule of corresponding schedule may be stored in the element Modification. In addition, information such as Service, Content, and Schedule may be included in the element.

The LastChangedESGData state variable may include an element Deletion (t57030). The element may store ESG data deleted in newly received ESG compared with existing ESG data. As a sub element of the element, the deleted ESG data items, that is, element/attributes may be stored. For example, when the Content element with an ID of "atsc.org/esg/content/1" and "atsc.org/esg/content/2" is deleted in newly received ESG, the Content element of corresponding content may be stored in an element Deletion. In addition, information such as Service, Content, and Schedule may be included in the element.

In some embodiments, the LastChangedESGData state variable may be transmitted to a companion device using an eventing method or an action method. When the state variable is transmitted using the eventing method, if a value of the state variable is modified, the state variable may be transmitted to the companion device. When the state variable is transmitted using the action method, the LastChangedESGData state variable may be configured with respect to mostly recently modified content of ESG data at a time of receiving a request for the value of the state variable and transmitted to the companion device.

The companion device may update only the modified ESG data items compared with pre-stored ESG with respect to the received LastChangedESGData state variable. Thereby, effective transmission may be performed compared with the case in which an entire portion of ESG is transmitted.

The aforementioned element, attributes, and so on are merely embodiments of LastChangedESGData and element/attributes, etc, in LastChangedESGData may be further added, modified, or deleted according to configuration, format, etc. of ESG.

Figure 58:
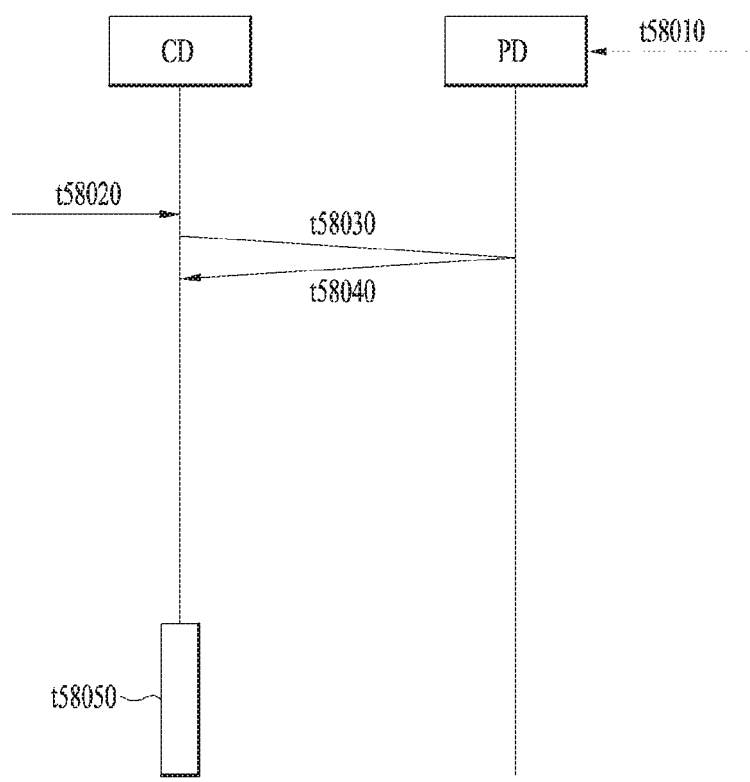
FIG. 58 is an operation of transmitting ESG data to a companion device according to a. GetESGData action according to an embodiment of the present invention.

FIG. 58 is an operation of transmitting ESG data to a companion device according to a GetESGData action according to an embodiment of the present invention.

As described above, an ESGData state variable may be transmitted to the companion device using an eventing method. However, when a receiver transmits ESG data to the companion device using an eventing method whenever ESG is modified, this results in network overload and a burden to the companion device. Accordingly, a GetESGData( ) action may be defined to transmit ESG data only when the companion device wants this.

The GetESGData( )action may be an action for transmitting the ESGData state variable to the companion device using an action method. That is, when the companion device makes a request for ESG data to the receiver through the action, the receiver may transmit the ESGData state variable to companion data. An input argument of the action may be none and an output argument may be the ESGData state variable.

The GetESGData( ) action may be performed when a user wants to see ESG through the companion device and an ESG application, etc. are executed. In this case, ESG data may be received as a result of the corresponding action and the received ESG data may be exposed through the ESG application. In some embodiments, when the GetESGData( ) action is executed using a periodic polling method to store ESG data in the companion device and, then, the ESG application is executed, the stored ESG data may he exposed to the user.

The GetESGData( ) action may also be simultaneously supported when the ESGData state variable supports an eventing method. However, in this case, when ESG data is received using an eventing method and, simultaneously, ESG data is also received using an action whenever ESGData is modified, ESG data may be redundantly received. Accordingly, when the action method and the eventing method are simultaneously supported, a policy of receiving ESG data using an eventing method only when a first ESG service is subscribed and, then, receiving ESG data using the GetESGData( ) action periodically or when an ESG application is executed.

First, in the present embodiment, two devices are assumed to be already paired with each other. In addition, the companion device is assumed to subscribe the aforementioned ESG service.

The receiver may have own ESG data (t58010). The ESG data may be stored in the ESGData state variable. A user may take a specific action of executing an ESG application (t58020). The specific action may be an operation that requires ESG data.

The companion device may perform the GetESGData( ) action to make a request for the ESGData state variable to the receiver (t58030). The receiver may simultaneously output the ESGData state variable as an output argument of the GetESGData( ) action to the companion device while transmitting call back of 200 OK in response to the request (t58040).

The companion device may perform an operation of parsing the received ESGData and exposing the ESGData through an ESG application using the ESG data (t58050). The companion device may perform an operation of immediately exposing ESG data or storing the ESG data once in order to expose the ESG data, like in the aforementioned embodiments.

The illustrated embodiment may be an embodiment of performing, the GetESGData( ) action when the user performs a specific action. However, in some embodiments, as described above, when the GetESGData( ) action is periodically performed (irrespective of whether the specific action is performed) and, then, the user executes the ESG application or the like at a predetermined time, ESG data that has been received and stored through the corresponding action may be exposed.

Figure 59:
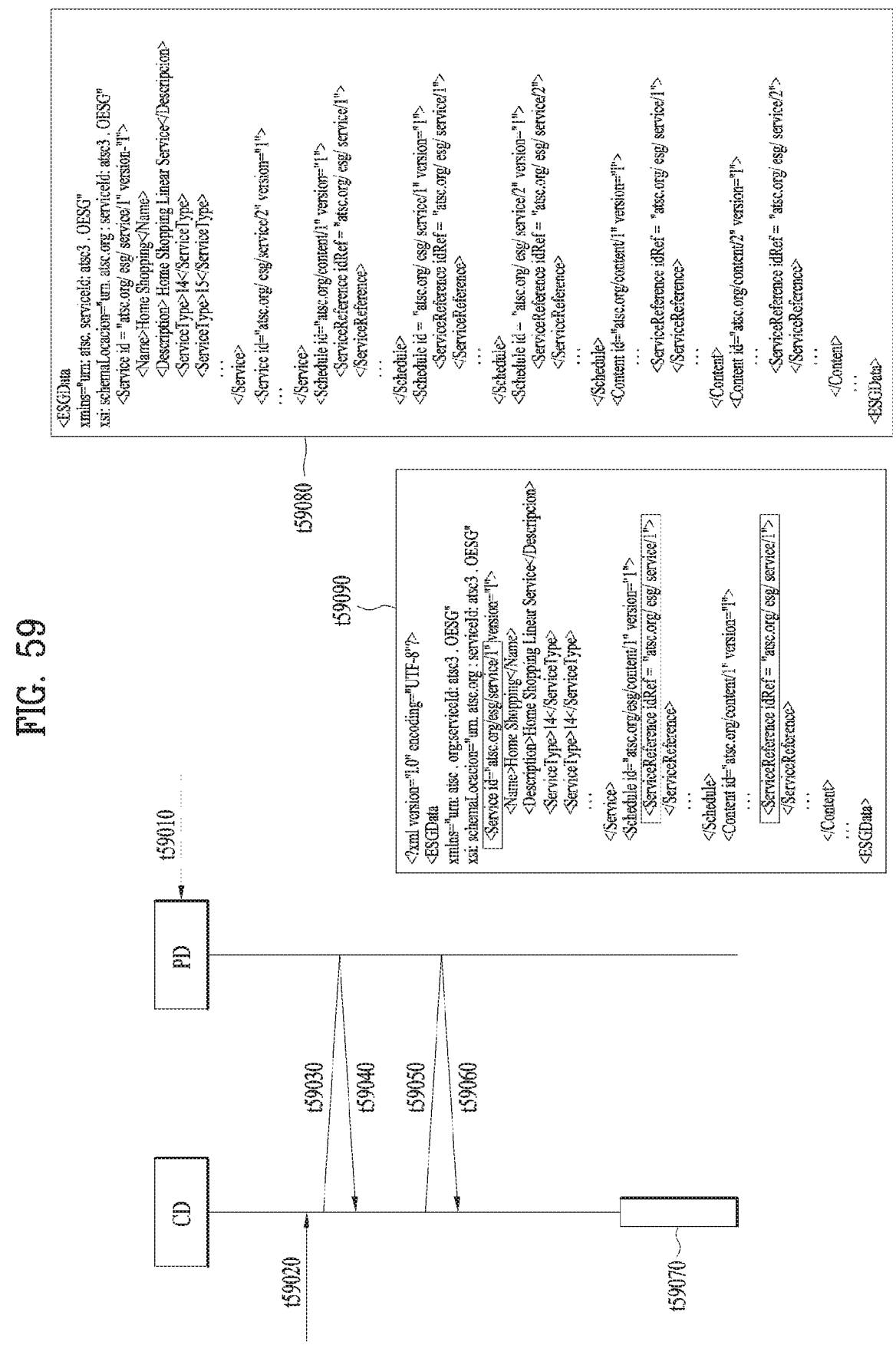
FIG. 59 is a diagram illustrating an operation of transmitting ESG data to a companion device according to a GetServiceIds action or a GetESGbyServiceIds action according to an embodiment of the present invention.

FIG. 59 is a diagram illustrating an operation of transmitting ESG data to a companion device according to a GetServiceIds action or a GetESGbyServiceIds action according to an embodiment of the present invention.

In order to minimize a network burden between a broadcast receiver and a companion device and/or a burden used to process entire ESG data by the companion device, only ESG data related to a specific service may be transmitted to the companion device. To this end, a ServiceIdsList state variable and a A_ARG_TYPE_ESGData_by_ServiceIds state variable may be defined.

The ServiceIdsList state variable may be a state variable for transmitting IDs of services described by ESG to the companion device. That is, the state variable may include service ID information items among ESG data items that have been parsed and stored by the receiver. The state variable may have a type of a list of strings or a list of URIs. Here, any type of URI may be used. In some embodiments, the state variable may be represented in the form of CSV. For example, the state variable may be represented according to atsc.org/esg/service/1, atsc.org/esg/service/2, . . . , etc.

The A_ARG_TYPE_ESGData_by_ServiceIds state variable may be a state variable for storing some ESG data of ESG. The state variable may be defined to transmit only some ESG data to the companion device. The state variable may have a fragment type of a specific form of Markup Language for representing the ESGData state variable. For example, when the ESGData state variable is an XML document, the state variable may have an XML fragment type.

Service IDs of ESG owned by the receiver may be first transmitted to the companion device using the aforementioned state variables and, accordingly, only the requested required ESG data may be transmitted to the companion device. To this end, a GetServiceIds action and a GetESGbyServiceIds action may be defined.

The GetServiceIds action may be an action of receiving IDs of a service from the receiver by the companion device. The receiver may transmit service IDs in the form of a list to the companion device among information items on a service described by ESG owned by the receiver. An input argument of the action may be none and an output argument may be the ServiceIdsList state variable.

The GetServiceIds action may be performed when a user wants to see ESG through the companion device and an ESG application, etc. are executed. In this case, ESG data may be received as a result of the corresponding action and the received ESG data may be exposed through the ESG application. In some embodiments, when the GetServiceIds action is executed using a periodic polling method to store ESG data in the companion device and, then, the ESG application is executed, the stored ESG data may be exposed to the user.

The GetESGbyServiceIds action may be defined to receive only ESG data corresponding to a specific service from the receiver by the companion device. The companion device may select a service ID of a desired service using a list of service IDs received through the GetServiceIds action. Then, the action may be performed using a list of service IDs using an input argument in order to receive ESG data of a desired service. As a result, the companion device may receive ESG data about a desired service. An input argument of the action may be a ServiceIdsList state variable and an output argument may be an A_ART_TYPE_ESG Data_by_ServiceIds state variable.

The GetESGbyServiceIds action may be performed when an ESG application, etc. are executed if a user wants to see ESG through the companion device. In this case, ESG data may be received as a result of the corresponding action and the received ESG data may be exposed through the ESG application. In some embodiments, when the GetESGbyServiceIds action is executed using a periodic polling method to store ESG data in the companion device and, then, the ESG application is executed, the stored ESG data may be exposed to the user.

In some embodiments, when an input argument is set as "*" in the GetESGbyServiceIds action, all ESG data items may be set to be requested irrespective of a service ID. In some embodiments, when an input argument is set as "empty" in the GetESGbyServiceIds action, ESG data about a currently watched service may be set to be requested.

According to the present embodiment, the two devices are assumed to be paired with each other. The companion device is assumed to subscribe to the aforementioned ESG service.

The receiver may own ESG data (t59010). The ESG data may be stored in the ESGData state variable. The ESG data stored in ESGData may be ESG data about two services identified according to "atsc.org/esg/service/1" or "atsc.org/esg/service/2" (t59080). A user may take a specific action of executing an ESG application (t59020). The specific action may be an operation that requires ESG data.

The companion device may make a request for a list of service IDs through the GetServiceIds action (t59030). The receiver may output ServiceIdsList to the companion device along with 200 OK (t59040). According to the present embodiment, a value of ServiceIdsList may be the same as (atsc.org/esg/service/1, atsc.org/esg/service/2).

When a specific service desired by a user or a companion device is a service identified according to "atsc.org/esg/service/1", the GetESGbyServiceIds action may be performed using the service ID as an input argument (t59050). The receiver may output A_ART_TYPE_ESGData_by_ServiceIds to the companion device along with 200 OK (t59060). In the present embodiment, a value of A_ART_TYPE_ESGData_by_ServiceIds may be ESG data related to a service identified according to "atsc.org/esg/service/1" (t59090). As illustrated in the drawing, the output argument may include a Schedule element having atsc.org/esg/service/1 as a reference value and a Content element as well as a Service element having atsc.org/esg/service/1 as a service ID value. Here, the Schedule element and the Content element may be schedule and content information related to a service identified according to atsc.org/esg/service/1.

The companion device may perform an operation of parsing the received ESG data, and exposing the ESG data through an ESG application using the ESG data (t59070). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has been received and stored through the corresponding action may be exposed.

Figure 60:
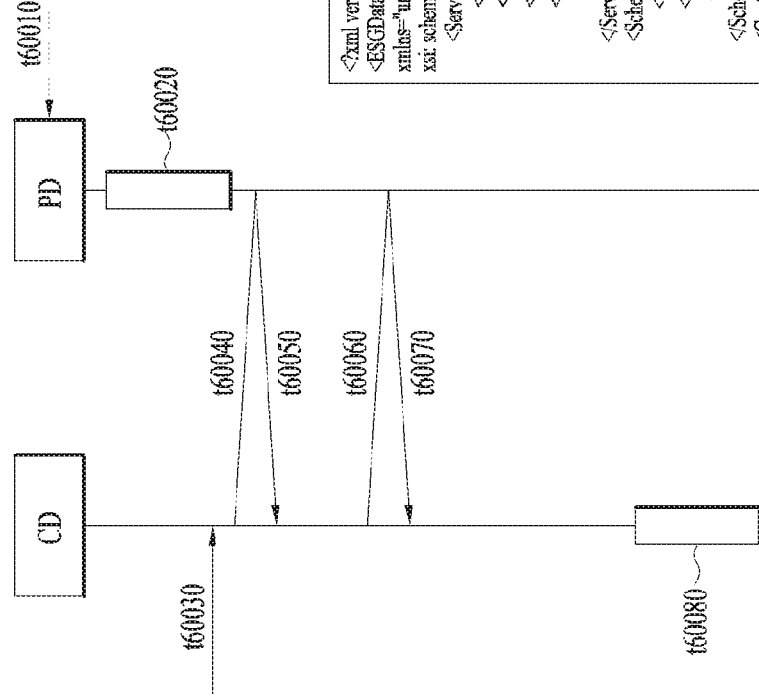
FIG. 60 is a diagram illustrating an operation of transmitting ESG data to a companion device according to a GetCurrentServiceId action according to an embodiment of the present invention.

FIG. 60 is a diagram illustrating an operation of transmitting ESG data to a companion device according to a GetCurrentServiceId action according to an embodiment of the present invention.

It may be needed to transmit ESG data about a currently watched service in a receiver to the companion device. To this end, a service ID of the currently watched service may be transmitted to the companion device. To this end, a CurrentServiceId state variable and a GetCurrentServiceId action may he defined.

The CurrentServiceId state variable may store a service ID of a currently watched service in a receiver among ESG data items of the receiver. The state variable may be a string or specific URI type.

The GetCurrentServiceId action may be an action for receiving a service ID of a currently watched service in a receiver by the companion device. An input argument of the action may be none and an output argument may be the CurrentServiceId state variable.

The GetCurrentServiceId action may be performed when a user wants to see ESG through the companion device and an ESG application, etc. are executed. In this case, ESG data may be received as a result of the corresponding action and the received ESG data may be exposed through the ESG application. In some embodiments, when the GetCurrentServiceId action is executed using a periodic polling method to store ESG data in the companion device and, then, the ESG application is executed, the stored ESG data may be exposed to the user.

According to the present embodiment, the two devices are assumed to be paired with each other. The companion device is assumed to subscribe to the aforementioned ESG service.

The receiver may own ESG data (t60010). The ESG data may be stored in the ESGData state variable. The ESG data stored in ESGData may be ESG data about two services identified according to "atsc.org/esg/service/1" or "atsc.org/esg/service/2" (t60090). The receiver may periodically signal currently watched broadcast and update a service ID of a currently watched service to the CurrentServiceId state variable. The user may take a specific action of executing an ESG application (t60030). The specific action may be an operation that requires ESG data.

The companion device may make a request for an ID of a currently watched service through the GetCurrentServiceId action (t60040). The receiver may output the CurrentServiceId state variable to the companion device along with 200 OK (t60050). According to the present embodiment, a value of the CurrentServiceId state variable may be "atsc.org/esg/service/1".

The companion device may perform the GetESGbyServiceIds action to make a request for ESG data related to a currently watched service (t60060). According to the present embodiment, an input argument of the GetESGbyServiceIds action may be atsc.org/esg/service/1. The receiver may output the A_ART_TYPE_ESGData_by_ServiceIds state variable to the companion device along with 200 OK (t60070). According to the present embodiment, a value of the A_ART_TYPE_ESGData_by_ServiceIds may be ESG data related to a service identified according to "atsc.org/esg/service/1" (t60100). As illustrated in the drawing, an output argument may include a Schedule element having atsc.org/esg/service/1 as a reference value and a Content element as well as a Service element having atsc.org/esg/service/1 as a service ID value. Here, the Schedule element and the Content element may be schedule and content information related to a service identified according to atsc.org/esg/service1.

The companion device may perform an operation of parsing the received ESG data and exposing the ESG data through an ESG application using the ESG data (t60080). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has been pre-received and stored through the corresponding action may be exposed.

Figure 61:
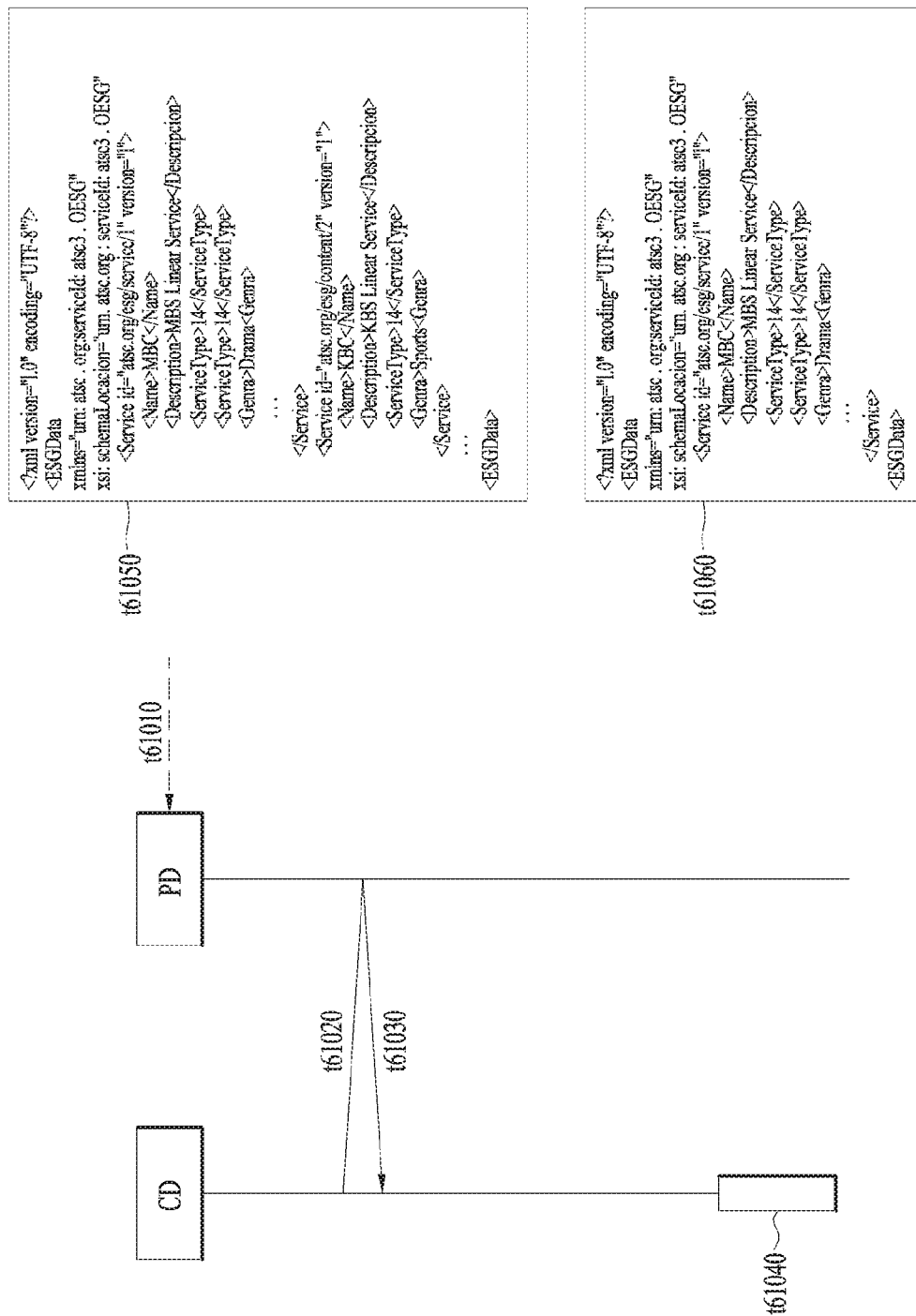
FIG. 61 is a diagram illustrating an operation of transmitting ESG data to a companion device according to a SearchESG action according to an embodiment of the present invention.

FIG. 61 is a diagram illustrating an operation of transmitting ESG data to a companion device according to a SearchESG action according to an embodiment of the present invention.

Upon making a request for ESG data to the receiver, the companion device may make a request for corresponding ESG data only when a specific field of the ESG data has a specific value (target value). To this end, the A_ART_TYPE_SearchField state variable, the A_ART_TYPE_TargetValue state variable, and the SearchESG action may be defined.

The A_ART_TYPE_SearchField state variable may indicate a specific field to be determined by the companion device. That is, the state variable may be a list of names of element/attributes of the ESGData state variable. For example, a value of the Service@id, Service.Genre, etc. may be stored in the state variable. The state variable may have a list type of strings. The state variable may also be referred to as SearchField.

The A_ART_TYPE_TargetValue state variable may store a specific value of a specific field determined by the companion device, that is, a target value. The target value may be used to determine whether the determined specific field has the corresponding target value. ESG data may be searched for using the target value. The state variable may have a list type of strings. The state variable may also be referred to as TargetValue.

The SearchESG action may be an action for searching for and making a request for ESG data in the receiver by the companion device. As an input argument of the action, a specific field (SearchField) and/or a target value (TargetValue) may be defined. The receiver may search for ESG data according to whether the corresponding specific field has a corresponding target value. Upon searching for ESG data that satisfies a corresponding condition, the receiver may output all related ESG data items to the companion device. When any data is not matched, no data may be output. In some embodiments, only some ESG data items are matched, ESG information may also be transmitted.

As an output argument, the A_ART_TYPE_ESGData state variable may be defined and may be a state variable for storing some ESG data items of ESG like the aforementioned A_ART_TYPE_ESGData_by_ServiceIds state variable. The A_ART_TYPE_ESGData state variable may also be referred to as SearchedESGData.

The SearchESG action may be performed when a user wants to see ESG through the companion device and an ESG application, etc. are executed. In this case, ESG data may be received as a result of the corresponding action and the received ESG data may be exposed through the ESG application. In some embodiments, when the SearchESG action is executed using a periodic polling method to store ESG data in the companion device and, then, the ESG application is executed, the stored ESG data may be exposed to the user.

First, in the present embodiment, two devices are assumed to be already paired with each other. In addition, the companion device is assumed to subscribe the aforementioned ESG service.

The receiver may have own ESG data (t61010). The ESG data may be stored in the ESGData state variable. ESG data stored in the ESGData may be ESG data about a service identified according to "atsc.org/esg/service/1" and having a Service.Genre value of Drama and a service identified according to "atsc.org/esg/service/2" and having a Service.Genre value of Sports (t61050).

The companion device may make a request for ESG data using the SearchESG action (t61020). Here, an input argument of the corresponding action may be the same as ("Service@id, Service.Genre", "atsc.org/esg/service/1, Drama"). This is used to search for ESG data with a service ID of atsc.org/esg/service/1 and Drama as a value of sub element Genre of the Service element.

The receiver may search for ESG data matched with a corresponding condition and output the corresponding ESG data to the companion device along with 200 OK (t61030). In the present embodiment, ESG data related to a service identified according to "atsc.org/esg/service/1" matched with the corresponding condition may be output.

The companion device may perform an operation of parsing the received ESG data and exposing the ESG data through an ESG application using the ESG data (t61040). The companion device may perform an operation of immediately exposing ESG data or storing the ESG data once in order to expose the ESG data, like in the aforementioned embodiments.

Figure 62:
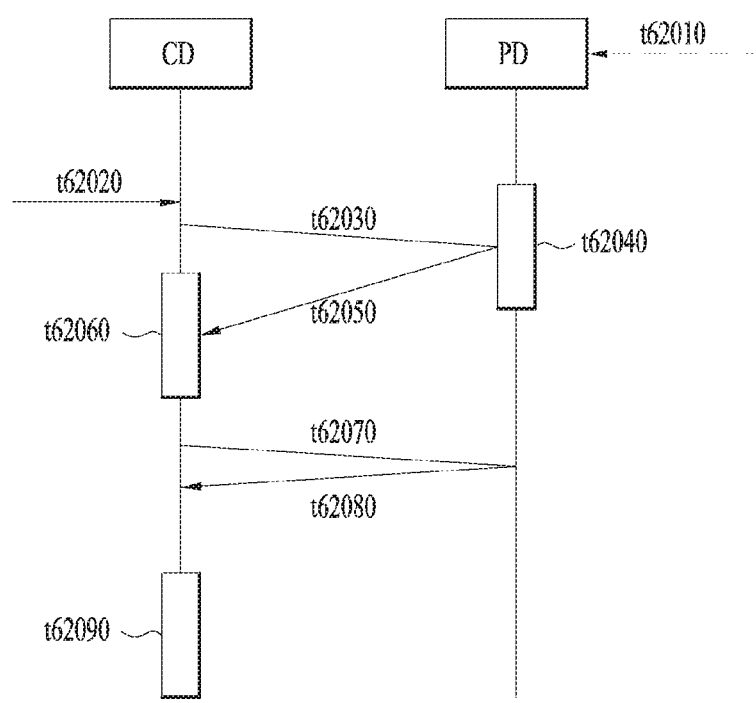
FIG. 62 is a diagram illustrating an authentication procedure of transmitting ESG data according to a DoAuthenticationForESG action according to an embodiment of the present invention.

FIG. 62 is a diagram illustrating an authentication procedure of transmitting ESG data according to a DoAuthenticationForESG action according to an embodiment of the present invention.

During exchange of ESG data between a receiver and a companion device, an unintended application, for example, an application for hacking may make a request for ESG information. In order to prevent this, authentication procedure for security may be required. To this end, a CompanionDeviceId state variable, a CompanionDeviceAppId state variable, a CotnpanionDeviceAppVersion state variable, a PrimaryDeviceId state variable, and a DoAuthenticationForESG action may be defined.

The CompanionDeviceId state variable may be a state variable for storing ID information of the companion device. A unique value for identifying the companion device may be stored in the state variable. As a device ID, a MAC address or the like may be used and may also be encrypted for security (e.g. hashed Mac address). The state variable may be a string or a specific URI type.

The CompanionDeviceAppId state variable may be a state variable for storing ID information of an application to be executed to use ESG by the companion device. Here, the application may be a concept including both a native app of the companion device and a browser-based app. The state variable may be a string or a specific URI type.

The CompanionDeviceAppVersion state variable may be a state variable for storing version information of an application to be executed to use ESG by the companion device. The receiver may determine whether ESG information is provided using the version information. The state variable may be a hexBinary or integer type.

The PrimaryDeviceId state variable may be a state variable for storing device ID information of a receiver, that is, a primary device. The companion device may identify the receiver using the state variable. The companion device may determine whether received information is from an unintended receiver or whether a searched receiver is a specific receiver that has made a request for ESG when a plurality of receivers are searched in a home network, using the state variable. The state variable may be a string or a specific URI type.

The DoAuthenticationForESG action may be an action for performing an authentication procedure for security before the companion device makes a request for ESG data to a receiver. Through the authentication procedure, whether ESG data is permitted to be exchanged may be determined. As an input argument, an ID of the companion device, an app ID of the companion device, and/or app version information of the companion device may be input and transmitted to the receiver. The information items may be referred to as authentication information. Upon receiving the authentication information, the receiver may whether a companion device or an app for ESG makes a request for the authentication information. Upon receiving an app of a normal companion device, the receiver may output a device ID of the receiver to the companion device. The companion device may check whether the receiver is a target to which the companion device makes a request for ESG with reference to the received ID of the receiver. After the authentication procedure is terminated, actual ESG data may be receive according to a mechanism such as action/eventing proposed according to the present invention. An input argument of the action may be states variables of CompanionDeviceId, CompanionDeviceAppId, and CompanionDeviceAppVersion and an output argument of the action may be a PrimaryDeviceId state variable.

The DoAuthenticationForESG action may be performed when a user wants to see ESG through the companion device and an ESG application, etc. are executed. In some embodiments, the DoAuthenticationForESG action may be performed using a periodic polling method and an authentication procedure may be performed.

According to the present embodiment, the two devices are assumed to be paired with each other. The companion device is assumed to subscribe to the aforementioned ESG service.

The receiver may own ESG data (t62010). The ESG data may be stored in the state variable ESGData. The user may take a specific action of executing an ESG application (t62020). The specific action may be an operation that requires ESG data.

The companion device may perform the DoAuthenticationForESG action (t62030). Thereby, authentication information may be transmitted to the receiver. The receiver may determine whether a corresponding companion device is authenticated using the received authentication information (t62040). When the companion device is authenticated, the receiver may output a device ID of the receiver to the companion device along with 200 OK (t62050). The companion device may determine whether the companion device is a receiver that is permitted to make a request for ESG data using the received ID of the receiver (t62060).

Then, in some embodiments, the companion device may make a request for and receive ESG data (t62070 and t62080). The companion device may perform an operation of parsing the received ESG data and exposing the ESG data through an ESG application using the ESG data (t62070). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, the authentication procedure is already terminated and, thus, operations of transmitting ESG data may be immediately performed.

Figure 63:
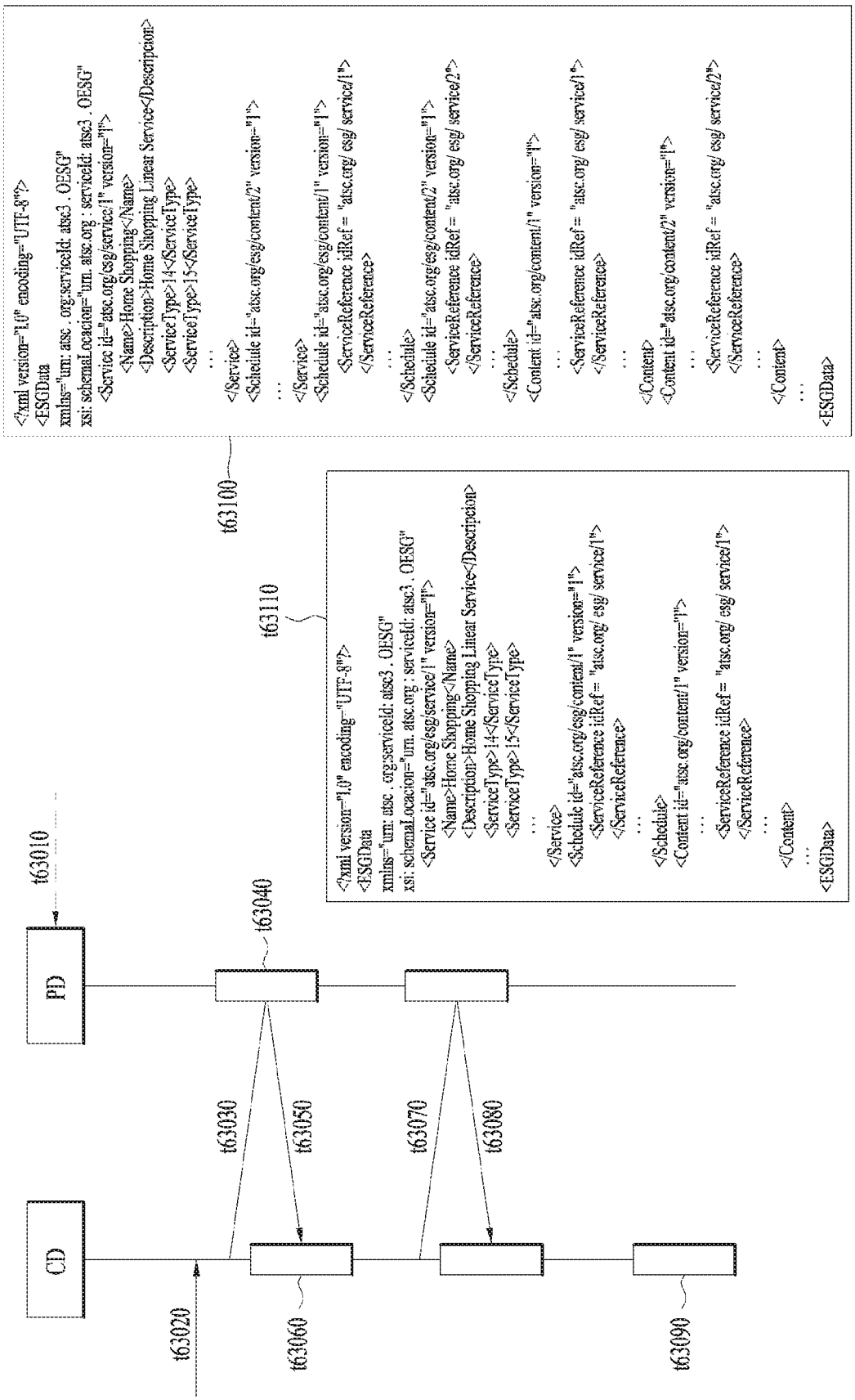
FIG. 63 is a diagram illustrating an operation of transmitting ESG data to a companion device simultaneously with device authentication according to GetServiceIds and GetESGbyServiceIds actions according to another embodiment of the present invention.

FIG. 63 is a diagram illustrating an operation of transmitting ESG data to a companion device simultaneously with device authentication according to GetServiceIds and GetESGbyServiceIds actions according to another embodiment of the present invention.

As described above, a separate action may be defined for authentication. In the present embodiment, existing actions may be extended and authentication may be performed without definition of a separate action and, simultaneously, original purpose of the existing actions may be performed. Here, actions as an extension target may be the all actions stated in the present invention. With regard to the actions as an extension target, as well as the existing defined an input/output argument, CompanionDeviceId, CompanionDeviceAppId, and CompanionDeviceAppVersion state variables may be added as an input argument and a PrimaryDeviceId state variable may be added as an output argument.

According to the present embodiment, the GetServiceIds action and the GetESGbyServiceIds action may be extended. The present invention may not be limited only to extension of the corresponding action.

The GetServiceIds action may be extended to have CompanionDeviceId, CompanionDeviceAppId, and CompanionDeviceAppVersion state variables as an input argument and to have a PrimaryDeviceId state variable as well as an existing ServiceIdsList state variable as an output argument. Upon receiving authentication information and determining that transmission is permitted according to the action, the receiver may transmit IDs of services along with a device ID of the receiver to the companion device. The companion device may determine whether the received service IDs are available with reference to the received device ID of the receiver.

The GetESGbyServiceIds action may be extended to have CompanionDeviceId, CompanionDeviceAppId, and CompanionDeviceAppVersion state variables as well as an existing ServiceIdsList state variable as an input argument and to have an existing A_ART_TYPE_ESGData_by_ServiceIds state variable as an output argument. Upon receiving authentication information and service IDs and determining that transmission is permitted according to the action, the receiver may transmit ESG data of a related service along with a device ID of the receiver to the companion device. The companion device may determine whether the received ESG data is available with reference to the received device ID of the receiver.

The extended actions may be performed when a user wants to see ESG through the companion device and an ESG application, etc. are executed. In this case, ESG data may be received as a result of the corresponding action and the received ESG data may be exposed through the ESG application. In some embodiments, the extended actions are executed using a periodic polling method to store ESG data in the companion device and, then, the ESG application is executed, the stored ESG data may be exposed to the user.

First, in the present embodiment, two devices are assumed to be already paired with each other. In addition, the companion device is assumed to subscribe the aforementioned ESG service.

The receiver may have own ESG data (t63010). The ESG data may be stored in the ESGData state variable. The ESG data stored in ESGData may be ESG data about two services identified according to "atsc.org/esg/service/1" and "atsc.org/esg/service/2" (t63100). A user may take a specific action of executing an ESG application (t63020). The specific action may be an operation that requires ESG data.

The companion device may make a request for a list of service IDs through the GetServiceIds action (t63030). In this case, authentication information may also be transmitted to the receiver. The receiver may determine whether the companion device is authenticated using the authentication information (t63040). When the companion device is authenticated, the receiver may output ServiceIdsList along with 200 OK to the companion device (t63050). According to the present embodiment, a value of ServiceIdsList may be the same as (atsc.org/esg/service/1, atsc.org/esg/service/2). In this case, a device ID of the receiver may also be transmitted. The companion device may determine whether the companion device is a receiver that is permitted to make a request for ESG data using the received ID of the receiver (t63060).

When a specific service desired by a user or a companion device is identified according to "atsc.org/esg/service/1", the GetESGbyServiceIds action may be performed using this as an input argument (t63070). In this case, authentication information may also be transmitted to a receiver. In some embodiments, the authentication procedure may be considered to be redundant and, thus, may be omitted. When the authentication procedure is omitted, an existing general GetESGbyServiceIds action may be performed. When the receiver is authenticated, the receiver may output A_ART_TYPE_ESGData_by_ServiceIds along with 200 OK to the companion device (t63080). According to the present embodiment, a value of A_ART_TYPE_ESGData_by_ServiceIds may be ESG data related to a service identified according to "atsc.org/esg/service/1" (t63110). As illustrated in the drawing, the output argument may include a Schedule element with atsc.org/esg/service/1 as a reference value and a Content element as well as a Service element with atsc.org/esg/service/1 as a service ID value. Here, the Schedule element and the Content element may be schedule and content information related to a serviced identified according to atsc.org/esg/service/1.

The companion device may perform an operation of parsing the received ESG data and exposing the ESG data through an ESG application using the ESG data (t63090). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has pre-received and stored through the corresponding action may be exposed.

Figure 64:
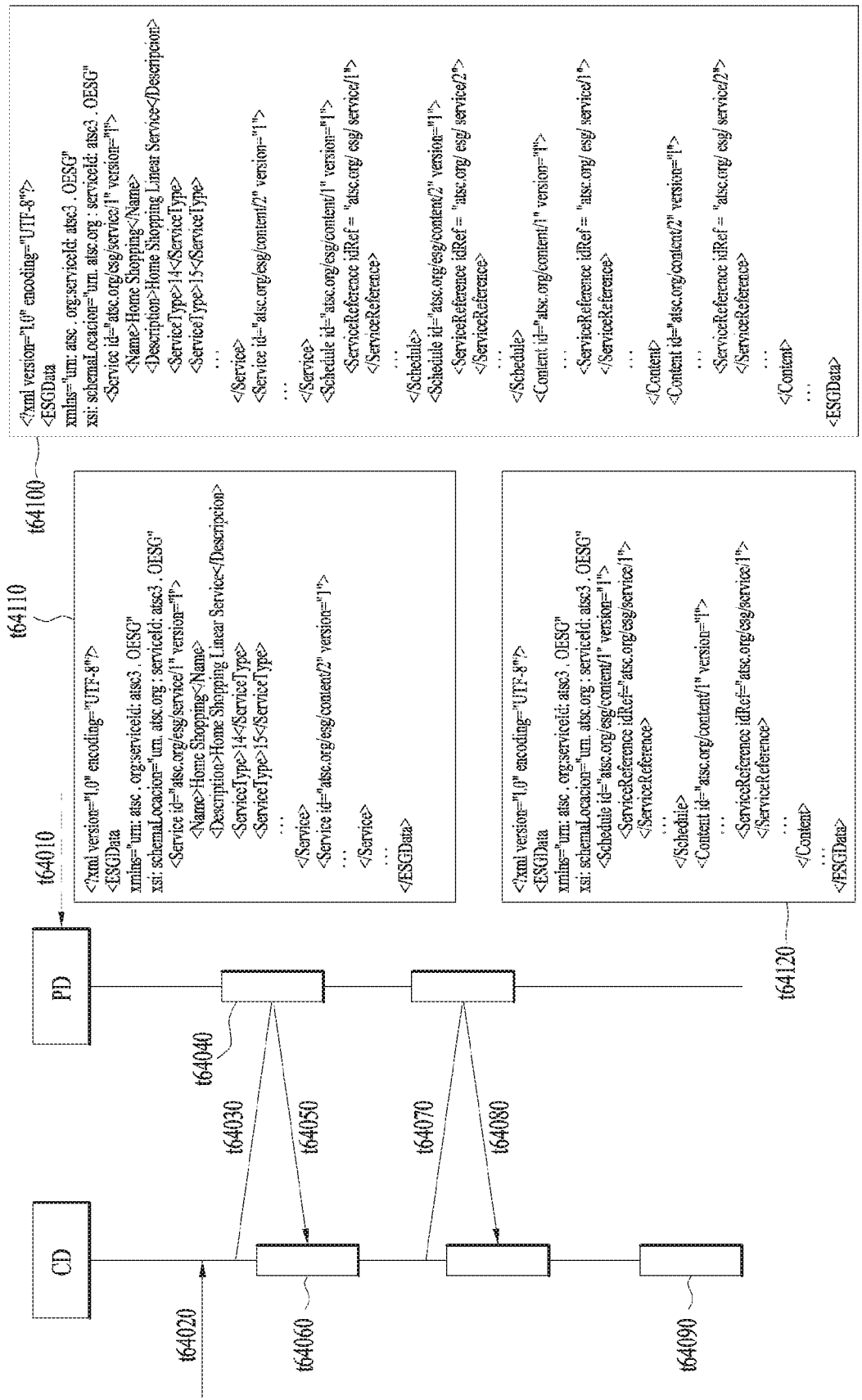
FIG. 64 is a diagram illustrating an operation of transmitting ESG data to a companion device according to a GetService action according to an embodiment of the present invention.

FIG. 64 is a diagram illustrating an operation of transmitting ESG data to a companion device according to a GetService action according to an embodiment of the present invention.

In the case of a service of ESG data, an updating frequency of adding a new service or deleting a service may be low. Accordingly, when ESG data about a service is continuously requested/transmitted, unnecessary network overload may be caused. To overcome this, a NumOfServices state variable, an A_ARG_TYPE_ESGData_Service state variable, and a GetService action may be defined. In addition, another embodiment of the aforementioned GetESGbyServiceIds action may be defined.

The NumOfServices state variable may be a state variable for storing the total number of services described by ESG of the receiver. A value of the state variable may be referred to configure a service list. For example, a value of the state variable may be used to check validation during configuration of a service list. The state variable may be a type of an integer.

The A_ARG_TYPE_ESGData_Service state variable may be a state variable for storing only ESG data corresponding to a Service element of ESG of the receiver. The state variable may have a fragment type of a specific form of Markup Language for representing the ESGData state variable. For example, when the ESGData state variable is an XML document, the state variable may have an XML fragment type.

The GetService action may be an action for receiving ESG data related to a service among ESG information items from the receiver by the companion device. The companion device may receive ESG data (ESG data items except for Service element) related to a specific service using ESG data (Service elements) received through the action. The companion device may compare the total number of services indicated by a NumOfServices state variable and the number of the received Service elements to refer the result to configure a service list. During this procedure, the aforementioned authentication procedure may be used. That is, the GetService action may be extended form including additional input/output argument for authentication. In some embodiments, a GetService action without additional variable for authentication may be used.

An input argument of the action may be state variables corresponding to the aforementioned authentication input argument. An output argument may be a PrimaryDeviceId state variable, a NumOfServices state variable, or an A_ARG_TYPE_ESGData_Service state variable.

Another embodiment of the aforementioned GetESGbyServiceIds action may be defined. The GetESGbyServiceIds action according to another embodiment may be an action for receiving the remaining ESG data related to a specific service using service IDs of a specific service as input by the companion device. Here, the remaining ESG data may be ESG data except for the corresponding Service element, that is, ESG data corresponding to Content and Schedule elements related to the corresponding service. Similarly, the action may also be defined in an extended form including additional variables for the aforementioned authentication.

The GetService and GetESGbyServiceIds actions may be performed when a user wants to see ESG through the companion device and an ESG application, etc. are executed. In this case, ESG data may he received as a result of the corresponding action and the received ESG data may be exposed through the ESG application. In some embodiments, when the GetService and GetESGbyServiceIds actions are executed using a periodic polling method to store ESG data in the companion device and, then, the ESG application is executed, the stored ESG data may be exposed to the user.

According to the present embodiment, the two devices are assumed to be paired with each other. The companion device is assumed to subscribe to the aforementioned ESG service.

The receiver may own ESG data (t64010). The ESG data may be stored in the ESGData state variable. The ESG data stored in ESGData may be ESG data about two services identified according to "atsc.org/esg/service/1" or "atsc.org/esg/service/2" (t64100). A user may take a specific action of executing an ESG application (t64020). The specific action may be an operation that requires ESG data.

The companion device may perform the GetService action to make a request for ESG data about a service (t64030). Upon determining that the companion and/or app are authenticated (t64040), the receiver may output the A_ARG_TYPE_ESGData_Service state variable along with 200 OK to the companion device (t64050). Here, the A_ARG_TYPE_ESGData_Service state variable may include only ESG data about a Service element of ESG data of the receiver (t64110). The companion device may perform authentication using the received device ID of the receiver to determine whether the data is reliable information (t64060).

The companion device may perform the GetESGbyServiceIds action to make a request for the remaining ESG data related to a specific service (t64070). In the present embodiment, a ServiceIdsList input argument value of the GetESGbyServiceIds action may be atsc.org/esg/service/1. Upon determining that the companion and/or app are authenticated, the receiver may output the A_ARG_TYPE_ESGData_by_ServiceIds state variable along with 200 OK (t64080). According to the present embodiment, the output A_ARG_TYPE_ESGData by ServiceIds state variable may be ESG data related to a service identified according to atsc.org/esg/service/1 (t64120). As illustrated in the drawing, the output argument may include a Schedule element having atsc.org/esg/service/1 as a reference value and a Content element. The output argument may not include a Service element identified according to atsc.org/esg/service/1.

The companion device may perform an operation of parsing the received ESG data and exposing the ESG data through an ESG application using the ESG data (t64090). The companion device may perform an operation of immediately exposing ESG data or storing the ESG data once in order to expose the ESG data, like in the aforementioned embodiments.

The illustrated embodiment may be a case in which a user performs the specific action but, as described above, when the action may be first performed (irrespective of whether the specific action is performed) and, then, the user executes the ESG application, etc. at a predetermined time, ESG data that has been pre-received and stored through the corresponding action may be exposed.

Figure 65:
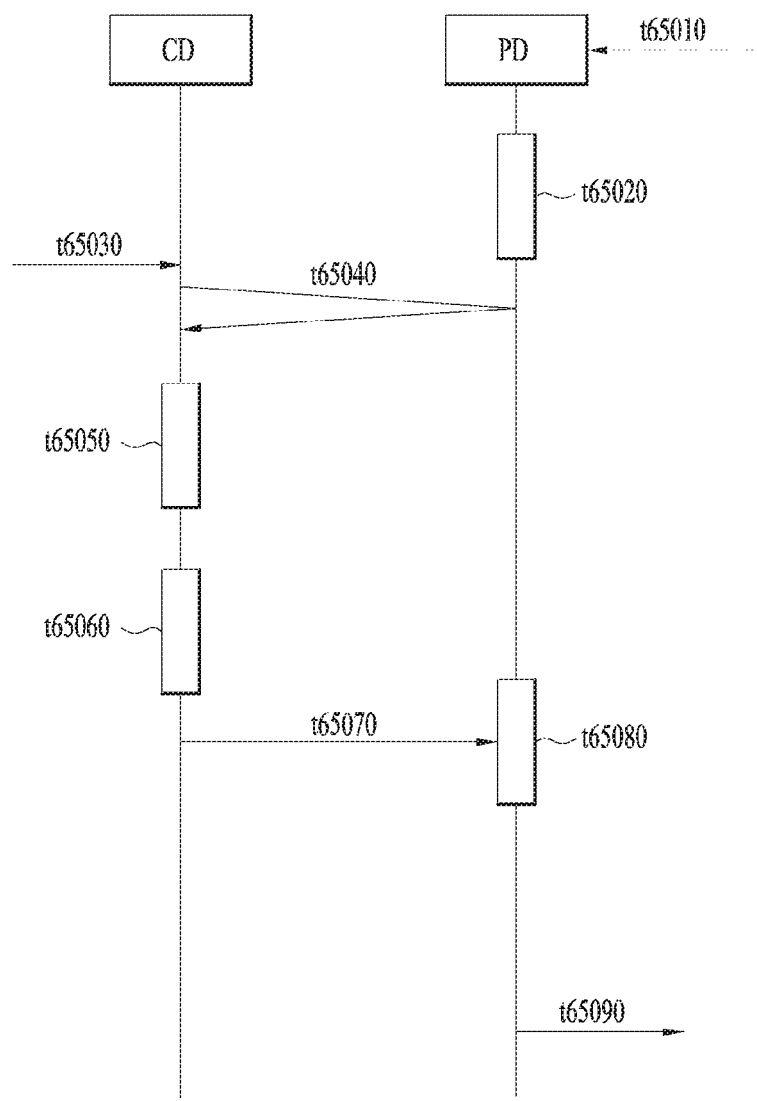
FIG. 65 is a diagram illustrating a procedure of changing a service of a broadcast receiver by a companion device according to a SetChangeChannel action according to an embodiment of the present invention.

FIG. 65 is a diagram illustrating a procedure of changing a service of a broadcast receiver by a companion device according to a SetChangeChannel action according to an embodiment of the present invention.

ESG information transmitted to the companion device may be exposed to the user through a user interface (UI). A service indicated by the ESG may be checked and selected by a user. In this case, a device to which a service is actually provided is a receiver and, thus, information for changing a service needs to be transmitted to the receiver to change a service. To this end, the A_ARG_TYPE_SelectedServiceId state variable and the SetChangeChannel action may be defined.

The A_ARG_TYPE_SelectedServiceId state variable may be a state variable for storing a service ID of the service that is selected through ESG data by a user in a companion device. The state variable may be a string or a specific URI type.

The SetChangeChannel action may be an action for changing a service provided to a receiver by a companion device. The input argument may be an A_ARG_TYPE_SelectedServiceId state variable. The user may select a specific service while seeing ESG through the companion device. In this case, an ID of a corresponding service may be stored as an input argument. When the corresponding action is performed, the receiver may change a channel to a service with a corresponding service ID according to a value of the input argument. The output argument may be none.

According to the present embodiment, the two devices are assumed to be paired with each other. The companion device is assumed to subscribe to the aforementioned ESG service.

The receiver may own ESG data (t65010). The ESG data may be stored in the ESGData state variable. The user may take a specific action of executing an ESG application (t65030). The specific action may be an operation that requires ESG data.

The companion device may make a request for ESG data through the aforementioned GetESGData action and receive ESG data (t65040). The The illustrated embodiment may be a case in which a user performs the specific action but, as described above, when the action may be first performed (irrespective of whether the specific action is performed) and, then, the user executes the ESG application, etc. at a predetermined time, ESG data that has been pre-received and stored through the corresponding action may be exposed.

The companion device may perform an operation of parsing the received ESG data and exposing the ESG data through an ESG application using the ESG data (t65050). The companion device may perform an operation of immediately exposing ESG data or storing the ESG data once in order to expose the ESG data, like in the aforementioned embodiments.

The user may select a service through the UI of the companion device while seeing ESG (t65060). For example, the user may attempt to change a current channel to an NBCU channel. The companion device may perform the SetChangeChannel action (t65070). A service ID corresponding to the NBCU channel may be transmitted to the receiver through the action.

The receiver may change a channel to a corresponding service using the received service ID (t65080). The service may be changed to NBCU and provided to the user (t65090).

Figure 66:
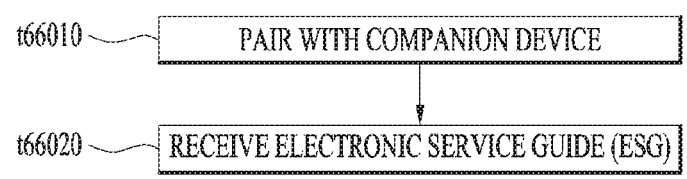
FIG. 66 is a diagram illustrating a method of providing a broadcast service according to an embodiment of the present invention.

FIG. 66 is a diagram illustrating a method of providing a broadcast service according to an embodiment of the present invention.

The method of providing a broadcast service by a broadcast receiver according to an embodiment of the present invention may include paring the broadcast receiver with a companion device and/or receiving electronic service guide (ESG).

A network interface unit of the broadcast receiver may be paired with the companion device (t66010). Here, the network interface unit may correspond to a network interface of the aforementioned broadcast receiver. For pairing, technology such as UPnP may be used but technology for pairing may not be limited thereto.

A receiving unit of the broadcast receiver may receive ESG and specific service guide. Here, the receiving unit may be a broadcast interface or a network interface of the aforementioned broadcast receiver. When ESG is received through a broadcast network, the receiving unit may correspond to a broadcast interface and when ESG is received through the Internet, the receiving unit may correspond to a network interface. That is, in some embodiments, the network interface unit and the receiving unit may be the same block/module.

According to the present embodiment, ESG may include ESG data about at least one broadcast service. Here, the ESG data may refer to data included in the ESG or element/attributes in the ESG. The broadcast service may correspond to the aforementioned service or channel.

The method of providing a broadcast service according to an embodiment of the present invention, the ESG data may be service type information, schedule information, related content information, or related component information of the aforementioned at least one broadcast service. The ESG data may be each of the aforementioned type attributes of the Service element, the Schedule element, the Content element, or the Component element. Here, related content and related components may refer to content related to a service described by the ESG and a component related thereto.

The method of providing a broadcast service according to an embodiment of the present invention may further include transmitting information on modified content of the received ESG to the companion device. The operation may be performed by the aforementioned network interface unit. Here, the information on modified content may include added, modified, or deleted ESG data of the received ESG compared with pre-stored ESG data. Here, the information on modified content may be the aforementioned LastChangedESGData state variable. The added, modified, and deleted ESG data may be Addition, Modification, and Deletion elements, respectively.

The method of providing a broadcast service according to an embodiment of the present invention may further include transmitting an ID list of broadcast services included in the received ESG to the companion device, receiving a request for ESG data related to specific broadcast services identified according to at least one ID of an ID list from the companion device, and transmitting ESG data related to the requested specific broadcast service to the companion device. The service ID list may be transmitted through the aforementioned GetServiceIds action. The request and transmission of the ESG data according to an ID may be performed through the aforementioned GetESGbyServiceIds action.

The method of providing a broadcast service according to an embodiment of the present invention may further include receiving a request for an of a currently watched broadcast service from the companion device and transmitting the ID of the currently watched broadcast service to the companion device, receiving a request for ESG data related to the currently watched broadcast service, and transmitting the requested ESG data related to the currently watched broadcast service to the companion device. The ID of the currently watched service may be transmitted through the aforementioned GetCurrentServiceId action. The request and transmission of the ESG data according to an ID may be performed through the aforementioned GetESGbyServiceIds action.

The method of providing a broadcast service according to an embodiment of the present invention may further include receiving a target value of a search field indicating a specific field of ESG data and a target value of a specific field from the companion device, selecting ESG data having the target value of the specific field indicated by the search field by a control unit, and transmitting the selected ESG data to the companion device. The search field and the target value of the specific field may correpodn to the aforementioned A_ART_TYPE_SearchField state variable and A_ART_TYPE_TargetValue state variable, respectively. Selection and transmission of ESG data may be performed through the aforementioned SearchESG action. Here, the control unit may correspond to a control unit of a main physical device of the aforementioned broadcast receiver.

The method of providing a broadcast service according to an embodiment of the present invention may further include receiving authentication information of a companion device from a companion device, the authentication information including device ID information of the companion device, checking whether the companion device is authenticated using the authentication information by an authentication module, and when the companion device is checked to be authenticated, transmitting device ID information of the broadcast receiver to the companion device. Here, the authentication information may correspond to the aforementioned CompanionDeviceId, CompanionDeviceAppId, and/or CompanionDeviceAppVersion state variables. The device ID of the broadcast receiver may correspond to the aforementioned. PrimaryDeviceId state variable. An operation of transmitting the authentication information, checking authentication, and transmitting a receiver device ID may be performed through the aforementioned DoAuthenticationForESG action. Here, the authentication module may be a block/module that is positioned inside/outside the broadcast receiver and performs the aforementioned operations related to authentication. In some embodiments, the authentication module may be integrated with the aforementioned control or network interface.

In the method of providing a broadcast service according to an embodiment of the present invention, the transmitting of the ID list to the companion device may include receiving a request for the ID list from the companion device, the request for the ID list including authentication information of the companion device, checking whether the companion device is authenticated using the authentication information by an authentication module; and when the companion device is checked to be authenticated, transmitting the ID list and device ID information of a broadcast receiver to the companion device. The present embodiment may be obtained by extending the aforementioned embodiment of transmission of ESG through a service ID list to the case in which the GetServiceIds action performs authentication.

The method of providing a broadcast service according to an embodiment of the present invention may further include receiving a request for change in a currently watched broadcast service from the companion device, the request for change in the currently watched broadcast service being based on the received ESG data, and changing a broadcast service watched in a broadcast receiver according to the request for change in the broadcast service by a control unit. The receiving of the request for broadcast and the changing of the service based on the request may be performed by the aforementioned SetChangeChannel action.

The aforementioned method of providing a broadcast service may be described in terms of a companion device. The present invention also includes the case in which the aforementioned embodiments are performed in terms of the companion device. For example, the companion device may receive information of modified content of ESG or may request an ID list of a service and receive related ESG data using the ID. The companion device may make a request for an ID of a currently watched service and receive related ESG data using the ID. The companion device may transmit a search field indicting a specific field and a specific value to a receiver and receive matched ESG data and may transmit authentication information to the receiver and perform authentication. The companion device may make a request for change in a currently watched service. Communication with the receiver may be performed by the aforementioned network interface inside/outside the companion device. Overall operations such as a search field related operation, a service change request related operation, and an ESG data related processing operation may be performed by the aforementioned control unit inside/outside the companion device. The companion device may include an authentication module that performs an authentication related operation.

Each of the aforementioned operations may be omitted or replaced with another operation with the same or similar function.

Figure 67:
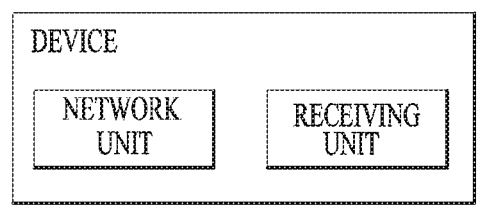
FIG. 67 is a diagram of a broadcast receiver according to an embodiment of the present invention.

FIG. 67 is a diagram of a broadcast receiver according to an embodiment of the present invention.

The broadcast receiver according to an embodiment of the present invention may include a network interface unit and/or a receiving unit. The broadcast receiver according to another embodiment of the present invention may further include a control unit and/or an authentication module. Each block, module, and unit are the same as the aforementioned description.

According to an embodiment of the present invention, the broadcast receiver and module/block/units therein may perform embodiments of providing the aforementioned method of providing a broadcast service by a broadcast receiver.

According to an embodiment of the present invention, the companion device may include a network interface unit and/or a receiving unit. According to another embodiment of the present invention, the companion device may further include a control unit and/or an authentication module. Each block, module, and unit are the same as the aforementioned description.

According to an embodiment of the present invention, the companion device and module/block/units therein may perform the aforementioned embodiments of providing a broadcast service by the companion device.

The aforementioned broadcast receiver, the block/module/unit, etc. in the companion device may be processors that perform consecutive procedures stored in a memory or, in some embodiments, may be hardware elements positioned inside/outside a device.

Each of the aforementioned block/module/units may be omitted or replaced with another block/module with the same or similar function.

The module or unit may be one or more processors designed to execute a series of execution steps stored in the memory (or the storage unit). Each step described in the above-mentioned embodiments may be implemented by hardware and/or processors. Each module, each block, and/or each unit described in the above-mentioned embodiments may be realized by hardware or processor. In addition, the above-mentioned methods of the present invention may be realized by codes written in recoding media configured to be read by a processor so that the codes can be read by the processor supplied from the apparatus.

Although the description of the present invention is explained with reference to each of the accompanying drawings for clarity, it is possible to design new embodiment(s) by merging the embodiments shown in the accompanying drawings with each other. And, if a recording medium readable by a computer, in which programs for executing the embodiments mentioned in the foregoing description are recorded, is designed in necessity of those skilled in the art, it may belong to the scope of the appended claims and their equivalents.

An apparatus and method according to the present invention may be non-limited by the configurations and methods of the embodiments mentioned in the foregoing description. And, the embodiments mentioned in the foregoing description can be configured in a manner of being selectively combined with one another entirely or in part to enable various modifications.

In addition, a method according to the present invention can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both the product invention and the process invention are described in the specification and the description of both inventions may be supplementarily applied as needed.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

Both apparatus and method inventions are mentioned in this specification and descriptions of both of the apparatus and method inventions may be complementarily applicable to each other.

Various embodiments have been described in the best mode for carrying out the invention.

The embodiments of the present invention are available in a series of broadcast signal provision fields.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of transmitting broadcast data by a broadcast receiver that is connected to a companion device, the method comprising:

receiving a broadcast signal including service data and Electronic Service Guide (ESG) information for the service data;

time deinterleaving the service data and the ESG information;

decoding the service data and the ESG information; and transmitting the ESG information to the companion device, the ESG information is related to:

a content fragment including an extension element including a component element, and the component element including at least one of a video component element describing a role of a video component, an audio component element describing a role of an audio component, a closed caption component element describing a role of a closed caption component, or an application component element describing a role of an application component, the extension element further including a capability element for the at least one of the video component or the audio component.

2. The method according to claim 1, wherein the ESG information is service type information, schedule information, related content information, or related component information of the broadcast service.

3. The method according to claim 1, further comprising transmitting information on modified content of the ESG information to the companion device,
wherein the information on the modified content comprises added, modified, or deleted ESG information.

4. The method according to claim 1, further comprising:
transmitting an ID list of broadcast services included in the ESG information to the companion device;
receiving a request for ESG information related to specific broadcast services identified according to at least one ID of the ID list, from the companion device; and
transmitting the requested ESG information related to specific broadcast services to the companion device.

5. The method according to claim 1, further comprising:
receiving a request for an ID of a currently watched broadcast service from the companion device;
transmitting the requested ID of the currently watched broadcast service to the companion device;
receiving a request for ESG information related to the currently watched service; and
transmitting the requested ESG information related to the currently watched service to the companion device.

6. The method according to claim 1, further comprising:
receiving a search field indicating a specific field of the ESG information and a target value of the specific field, from the companion device;
selecting ESG information having the target value of the specific field indicated by the search field; and
transmitting the selected ESG information to the companion device.

7. The method according to claim 1, further comprising:
receiving authentication information of the companion device from the companion device, the authentication information comprising device ID information of the companion device;
checking whether the companion device is authenticated using the authentication information by an authentication module; and
when the companion device is checked to be authenticated, transmitting device ID information of the broadcast receiver to the companion device.

8. The method according to claim 4, wherein the transmitting of the ID list to the companion device comprises:
receiving a request for the ID list from the companion device, the request for the ID list comprising authentication information of the companion device;
checking whether the companion device is authenticated using the authentication information by an authentication module; and
when the companion device is checked to be authenticated, transmitting the ID list and device ID information of the broadcast receiver to the companion device.

9. The method according to claim 1, wherein the time deinterleaving is performed based on one or more virtual Forward Error Correction (FEC) blocks.

10. A broadcast receiver for receiving broadcast data, the broadcast receiver connected to a companion device, and comprising:
a communicator configured to connect the broadcast receiver with the companion device;
a tuner configured to receive a broadcast signal including service data and Electronic Service Guide (ESG) information for the service data;
a time deinterleaver configured to time deinterleave the service data and the ESG information;
a decoder configured to decode the service data and the ESG information; and
a transmitter configured to transmit the ESG information to the companion device,
the ESG information is related to:
a content fragment including an extension element including a component element, and
the component element including at least one of a video component element describing a role of a video component, an audio component element describing a role of an audio component, a closed caption component element describing a role of a closed caption component, or an application component element describing a role of an application component,
the extension element further including a capability element for the at least one of the video component or the audio component.

11. The broadcast receiver according to claim 10, wherein the ESG information is service type information, schedule information, related content information, or related component information of the broadcast service.

12. The broadcast receiver according to claim 10, wherein:
the controller controls the communicator to transmit information on modified content of the ESG information to the companion device, and
the information on the modified content comprises added, modified, or deleted ESG information.

13. The broadcast receiver according to claim 10, wherein the controller:
controls the communicator to transmit an ID list of broadcast services included in the ESG information to the companion device,
controls the communicator to receive a request for ESG information related to specific broadcast services identified according to at least one ID of the ID list, from the companion device, and
controls the communicator to transmit the requested ESG information related to specific broadcast services to the companion device.

14. The broadcast receiver according to claim 10, wherein the controller:
controls the communicator to receive a request for an ID of a currently watched broadcast service from the companion device,
controls the communicator to transmit the requested ID of the currently watched broadcast service to the companion device,
controls the communicator to receive a request for ESG information related to the currently watched service, and
controls the communicator to transmit the requested ESG information related to the currently watched service to the companion device.

15. The broadcast receiver according to claim 10, wherein the controller:
controls the communicator to transmit a search field indicating a specific field of the ESG information and a target value of the specific field, from the companion device,
selects ESG information having the target value of the specific field indicated by the search field, and
controls the communicator to transmit the selected ESG information to the companion device.

16. The broadcast receiver according to claim 10, wherein the controller:
- controls the communicator to receive authentication information of the companion device from the companion device, the authentication information comprising device ID information of the companion device, and
- checks whether the companion device is authenticated using the authentication information, and controls the communicator to transmit device ID information of the broadcast receiver to the companion device when the companion device is checked to be authenticated.

17. The broadcast receiver according to claim 13, wherein the controller:
- controls the communicator to receive a request for the ID list from the companion device, the request for the ID list comprising authentication information of the companion device, and
- checks whether the companion device is authenticated using the authentication information, and controls the communicator to transmit the ID list and device ID information of the broadcast receiver to the companion device when the companion device is checked to be authenticated.

18. The broadcast receiver according to claim 10, wherein the time deinterleaver performs time deinterleaving operation based on one or more virtual Forward Error Correction (FEC) blocks.

\* \* \* \* \*